(12) United States Patent
Nix

(10) Patent No.: US 11,748,500 B2
(45) Date of Patent: *Sep. 5, 2023

(54) CRYPTOGRAPHIC UNIT FOR PUBLIC KEY INFRASTRUCTURE (PKI) OPERATIONS

(71) Applicant: Huawei Device Co., Ltd., Guangdong (CN)

(72) Inventor: John A. Nix, Evanston, IL (US)

(73) Assignee: Huawei Device Co., Ltd., Dongguan (CN)

( * ) Notice: Subject to any disclaimer, the term of this patent is extended or adjusted under 35 U.S.C. 154(b) by 72 days.

This patent is subject to a terminal disclaimer.

(21) Appl. No.: 17/373,205

(22) Filed: Jul. 12, 2021

(65) Prior Publication Data

US 2021/0342462 A1  Nov. 4, 2021

Related U.S. Application Data

(63) Continuation of application No. 15/575,908, filed as application No. PCT/US2016/033096 on May 18, 2016, now Pat. No. 11,080,414.

(Continued)

(51) Int. Cl.
*G06F 21/62* (2013.01)
*G06F 21/60* (2013.01)
(Continued)

(52) U.S. Cl.
CPC ............ *G06F 21/62* (2013.01); *G06F 21/606* (2013.01); *H04L 9/006* (2013.01); *H04L 9/0869* (2013.01);
(Continued)

(58) Field of Classification Search
None
See application file for complete search history.

(56) References Cited

U.S. PATENT DOCUMENTS 8,391,841 B2  3/2013  Semple et al.
8,707,022 B2  4/2014  Haggerty et al.
(Continued)

FOREIGN PATENT DOCUMENTS

CA  3018526 A1  12/2016
CN  103974250 A  8/2014
(Continued)

OTHER PUBLICATIONS

"GlobalPlatform Card Specification Version 2.2.1 Public Release," pp. 1-303, GlobalPlatform Inc. (Jan. 2011).
(Continued)

*Primary Examiner* — Sanchit K Sarker
(74) *Attorney, Agent, or Firm* — Leydig, Voit & Mayer, Ltd.

(57) ABSTRACT

A module such as an M2M device or a mobile phone can include a removable data storage unit. The removable data storage unit can include a nonvolatile memory, a noise amplifying memory, and a cryptographic unit. The nonvolatile memory can include (i) shared memory for access by both the module and the cryptographic unit, and (ii) protected memory accessible only by the cryptographic unit. The cryptographic unit can use a noise memory interface and noise amplifying operations in order to increase and distribute bit errors recorded in the noise amplifying memory. The cryptographic unit can (i) generate a random number using the noise amplifying memory and (ii) input the random number into a set of cryptographic algorithms in (Continued)

order to internally derive a PKI key pair. The private key can be recorded in protected memory and the public key signed by a certificate authority.

14 Claims, 13 Drawing Sheets

Related U.S. Application Data

(60) Provisional application No. 62/165,317, filed on May 22, 2015.

(51) Int. Cl.
*H04L 9/08* (2006.01)
*H04L 9/32* (2006.01)
*H04W 4/60* (2018.01)
*H04W 4/70* (2018.01)
*H04W 12/04* (2021.01)
*H04W 12/30* (2021.01)
*H04L 9/00* (2022.01)
*H04L 9/40* (2022.01)

(52) U.S. Cl.
CPC ............. *H04L 9/3247* (2013.01); *H04W 4/60* (2018.02); *H04W 4/70* (2018.02); *H04W 12/04* (2013.01); *H04W 12/35* (2021.01); *H04L 63/0823* (2013.01)

(56) References Cited

U.S. PATENT DOCUMENTS

| | | | |
|---|---|---|---|
| 8,812,836 B2 | 8/2014 | Meyerstein et al. | |
| 8,843,179 B2 | 9/2014 | Li et al. | |
| 8,868,041 B2 | 10/2014 | O'Leary | |
| 9,009,475 B2 | 4/2015 | Hauck et al. | |
| 9,100,175 B2 | 8/2015 | Nix | |
| 9,264,419 B1 | 2/2016 | Johansson et al. | |
| 9,319,223 B2 | 4/2016 | Nix | |
| 9,351,162 B2 | 5/2016 | Nix | |
| 9,485,092 B2 | 11/2016 | Smets et al. | |
| 9,571,465 B1 | 2/2017 | Sharifi Mehr et al. | |
| 9,652,604 B1 | 5/2017 | Johansson et al. | |
| 9,722,975 B2 | 8/2017 | Yang et al. | |
| 9,742,562 B2 | 8/2017 | Nix | |
| 9,775,024 B2 | 9/2017 | Park et al. | |
| 9,871,772 B1 | 1/2018 | Weinstein et al. | |
| 9,893,883 B1 | 2/2018 | Chaubey et al. | |
| 9,961,060 B2 | 5/2018 | Nix | |
| 10,313,314 B1 | 6/2019 | Weinstein et al. | |
| 2008/0072040 A1 | 3/2008 | Asano et al. | |
| 2008/0301459 A1 | 12/2008 | Ebeid | |
| 2009/0116642 A1* | 5/2009 | Yang ....................... H04L 9/083 380/44 |
| 2010/0293370 A1 | 11/2010 | Xiao et al. | |
| 2011/0010540 A1 | 1/2011 | Davis et al. | |
| 2012/0100833 A1 | 4/2012 | Gao | |
| 2013/0080768 A1 | 3/2013 | Lagerway et al. | |
| 2013/0091556 A1 | 4/2013 | Horn et al. | |
| 2013/0205390 A1 | 8/2013 | Hauck et al. | |
| 2013/0227646 A1 | 8/2013 | Haggerty et al. | |
| 2013/0344864 A1 | 12/2013 | Park et al. | |
| 2014/0003604 A1* | 1/2014 | Campagna .......... H04W 12/069 380/247 |
| 2014/0004827 A1 | 1/2014 | O'Leary | |
| 2014/0031012 A1 | 1/2014 | Park et al. | |
| 2014/0082358 A1 | 3/2014 | Nakhjiri et al. | |
| 2014/0082359 A1* | 3/2014 | Nakhjiri ................ H04L 9/3066 713/168 |
| 2014/0195811 A1 | 7/2014 | Braams | |
| 2014/0235210 A1 | 8/2014 | Park et al. | |
| 2014/0237101 A1 | 8/2014 | Park | |
| 2014/0329502 A1 | 11/2014 | Lee et al. | |
| 2015/0106616 A1 | 4/2015 | Nix | |
| 2015/0121066 A1 | 4/2015 | Nix | |
| 2015/0143125 A1 | 5/2015 | Nix | |
| 2015/0213433 A1 | 7/2015 | Khan | |
| 2015/0319151 A1* | 11/2015 | Chastain ................. H04L 9/083 713/171 |
| 2015/0341791 A1* | 11/2015 | Yang ....................... G06F 21/33 713/159 |
| 2016/0006729 A1* | 1/2016 | Yang ................. H04W 12/0433 713/156 |
| 2016/0043870 A1 | 2/2016 | Avanzi | |
| 2016/0057114 A1 | 2/2016 | Unagami et al. | |
| 2016/0063785 A1 | 3/2016 | Benkert et al. | |
| 2016/0269386 A1 | 9/2016 | Nix | |
| 2016/0301529 A1 | 10/2016 | Park et al. | |
| 2017/0085557 A1 | 3/2017 | Hu | |
| 2017/0373845 A1 | 12/2017 | Nix | |
| 2018/0084415 A1 | 3/2018 | Babbage | |
| 2018/0123803 A1* | 5/2018 | Park ....................... H04W 12/04 |
| 2018/0144147 A1* | 5/2018 | Nix ........................ H04W 12/35 |
| 2018/0205542 A1 | 7/2018 | Bone et al. | |

FOREIGN PATENT DOCUMENTS

| | | |
|---|---|---|
| EP | 3374923 A1 | 9/2018 |
| WO | 2015036773 A2 | 3/2015 |
| WO | 2015036776 A1 | 3/2015 |
| WO | 2015/052422 A1 | 4/2015 |
| WO | 2016/191176 A1 | 12/2016 |

OTHER PUBLICATIONS

"GSM Association Official Document SGP.21—RSP Architecture RSP Architecture Version 1.0," pp. 1-52, GlobalPlatform Inc. (Dec. 2015).
"GSM Association Official Document SGP.22—RSP Technical Specification, RSP Technical Specification Version 1.0," pp. 1-114, GlobalPlatform Inc. (Jan. 2016).
Extended European Search Report for EP App. No. 16800509.8 dated Dec. 13, 2018.
Smith, I., "Embedded SIM Remote Provisioning Architecture," Retrieved from the Internet: http://gsma.com/newsroom/wp-contenl/uploads//SGP.01-v1.12.pdf[retrieved on Sep. 17, 2018], Jan. 30, 2014, XP055507564.
ANSI: "Working Draft—Version 2.0 ANSI X9.63 Public key Cryptography for the Financial Services Industry: Elliptic Curve Key Agreement and Key Treansport Schemes Contents," Retrieved from the Internet: URL:ftp://ftp.iks-jena.de/mitarb/lutz/standards/ansi/X9/x963-7-5-98.pdf[retrieved on Dec. 3, 2018], Jul. 5, 1998, XP055529345.
GSMA, Embedded SIM Remote Provisioning Architecture Version 1.1, Dec. 17, 2013, pp. 1-84.
GSMA, Remote Provisioning Architecture for Embedded UICC Technical Specification Version 2.0, Oct. 13, 2014, pp 1-293.
ETSI, Smart Cards; Embedded UICC; Requirements Specification (Release 12), Jun. 2013, pp. 1-20.
International Standards Organization—9594-8, Public-key and Attribute Certificate Frameworks, Aug. 1, 2001, pp. 1-19.
IETF, RFC 6090, Fundamental Elliptic Curve Cryptography Algorithms, Feb. 2011, pp. 1-41.
Wikipedia, Elliptic Curve Diffie-Hellman, http://en.wikipedia.org/wiki/Elliptic_curve_Diffie%E2%80%93Hellman, Sep. 24, 2013, pp. 1-2.
Park et al., Secure Profile Provisioning Architecture for Embedded UICC, 2013 IEEE, pp. 297-303.
Wikipedia, Elliptic Curve Cryptography, http://en.wikipedia.org/wiki/Elliptic_curve_cryptography, Sep. 9, 2013, pp. 1-8.
Wikipedia, Digital Signature, http://en.wikipedia.org/wiki/Digital_Signature, Sep. 9, 2013, pp. 1-10.
Search Report and Written Opinion for PCT/US2016/033096 (15-836-WO). pp. 1-6.
International Search Report, Intl. Appl. No. PCT/US2016/033096, dated Oct. 13, 2016 (2 pages).
Written Opinion of the International Searching Authority, Intl. Appl. No. PCT/US2016/033096, dated Oct. 13, 2016 (4 pages).

(56) References Cited

OTHER PUBLICATIONS

U.S. Appl. No. 15/575,908, filed Nov. 21, 2017.
U.S. Appl. No. 16/041,397, filed Jul. 20, 2018.
U.S. Appl. No. 16/194,842, filed Nov. 19, 2018.
U.S. Appl. No. 16/362,631, filed Mar. 23, 2019.
"Smart Cards; Embedded UICC; Requirements Specification (Release 12)," ETSI TS 103 383 V12.1.0, total 10 pages (Jun. 2013).
Kerry, "Digital Signature Standard (DSS)," FIPS PUB 186-4, Federal Information Processing Standards Publication, total 130 pages (Jul. 2013).
"Federal Information Processing Standards Publication 197, Announcing the Advanced Encryption Standard (AES)," total 51 pages (Nov. 26, 2001).
Barker et al., "Recommendation for the Triple Data Encryption Algorithm (TDEA) Block Cipher," total 35 pages (Revised Jan. 2012).
J. Jonsson et al.,"Public-Key Cryptography Standards (PKCS) #1: RSA Cryptography Specifications Version 2.1," Request for Comments: 3447, total 72 pages (Feb. 2003).
S. Blake-Wilson et al.,"Elliptic Curve Cryptography (ECC) Cipher Suites for Transport Layer Security (TLS)," Request for Comments: 4492, total 35 pages (May 2006).
Cooper et al.,"Internet X.509 Public Key Infrastructure Certificate and Certificate Revocation List (CRL) Profile," Request for Comments: 5280, total 151 pages (May 2008).
M. Lochter et al., "Elliptic Curve Cryptography (ECC) Brainpool Standard Curves and Curve Generation," Request for Comments: 5639, total 27 pages (Mar. 2010).
T. Pornin, "Deterministic Usage of the Digital Signature Algorithm (DSA) and Elliptic Curve Digital Signature Algorithm (ECDSA)," Request for Comments: 6979, total 79 pages (Aug. 2013).
"Smart cards; Vocabulary for Smart Card Platform specifications," ETSI TR 102 216 V3.0.0, total 19 pages (Sep. 2003).
"Smart Cards; UICC-Terminal interface; Physical and logical characteristics (Release 11)," ETSI TS 102 221 V11.0.0 total 181 pages (Jun. 2012).
"Universal Mobile Telelecommunications System (UMTS);LTE;Characteristics of the Universal Subscriber Identity Module (USIM) application (3GPP TS 31.102 version 12.7.0 Release 12)," ETSI TS 131 102 V12.7.0, total 261 pages (Apr. 2015).
Smith, "Embedded SIM Remote Provisioning Architecture," Version 1.1, XP055507564, Retrieved from the Internet: URL:http://www.gsma.com/newsroom/wpcontent/uploads//SGP.01-v1.12.pdf, total 85 pages (Jan. 30, 2014).

* cited by examiner

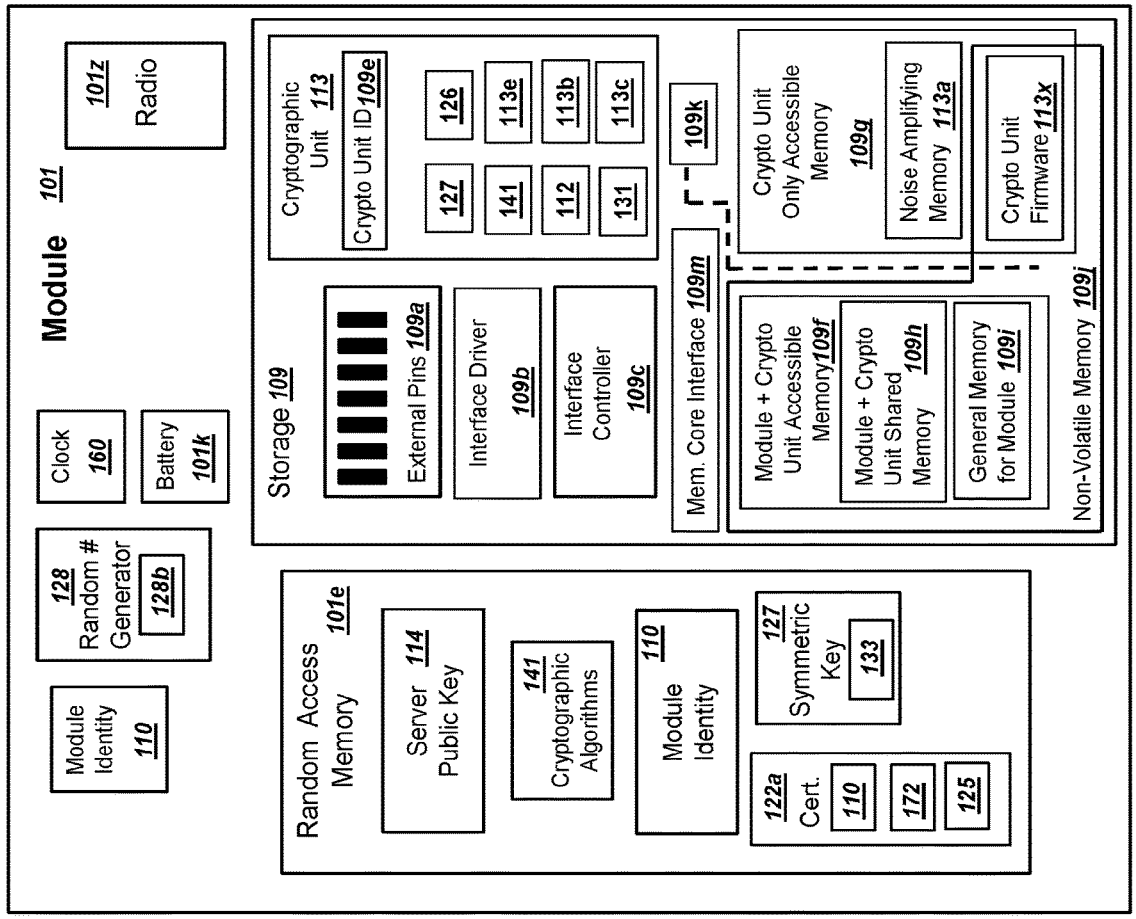
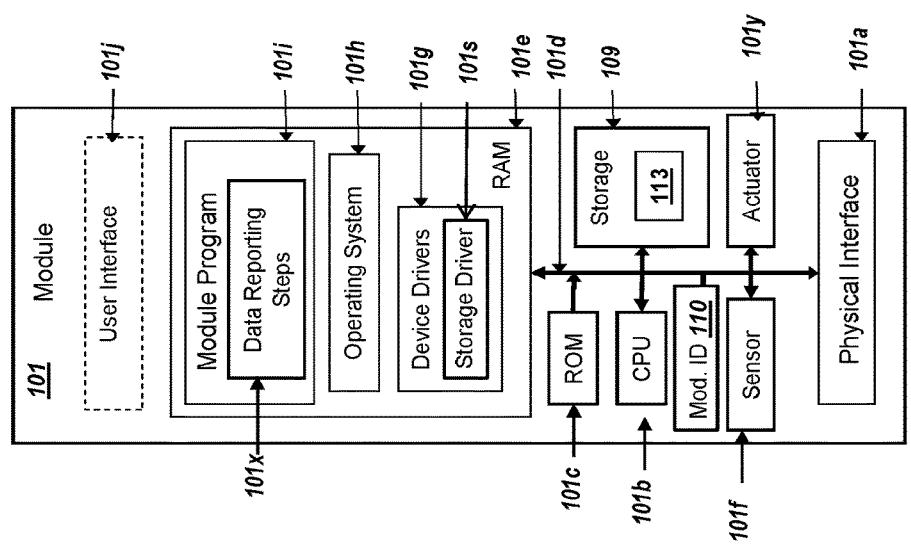

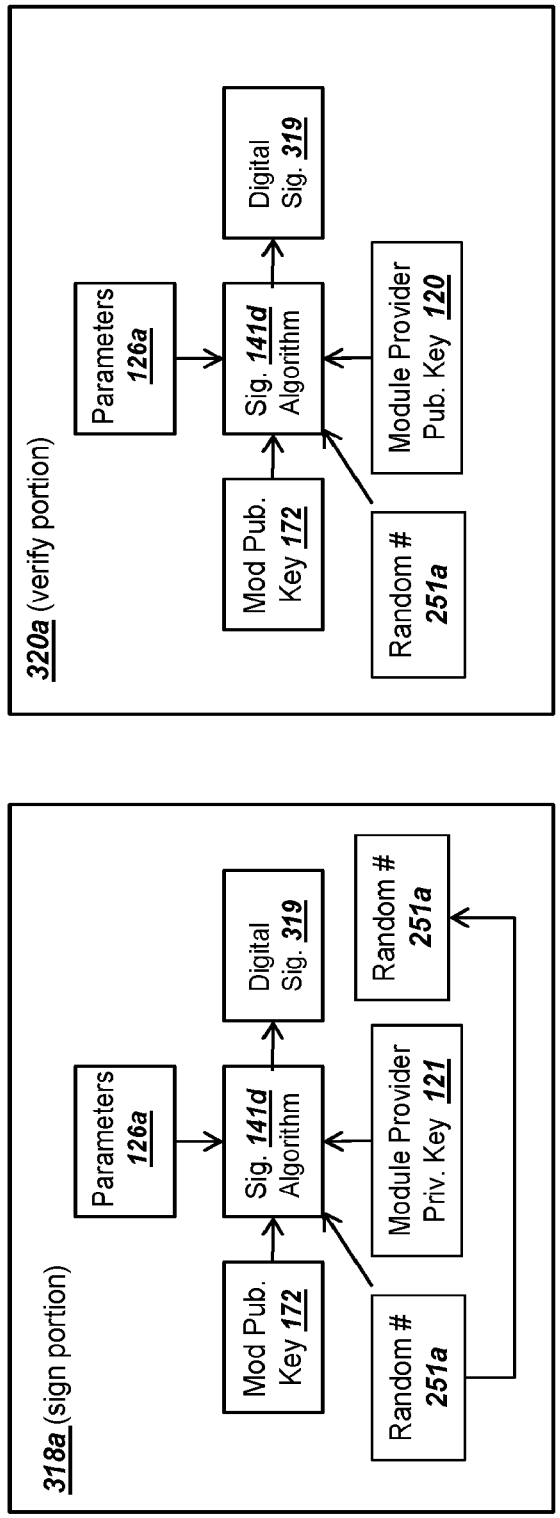

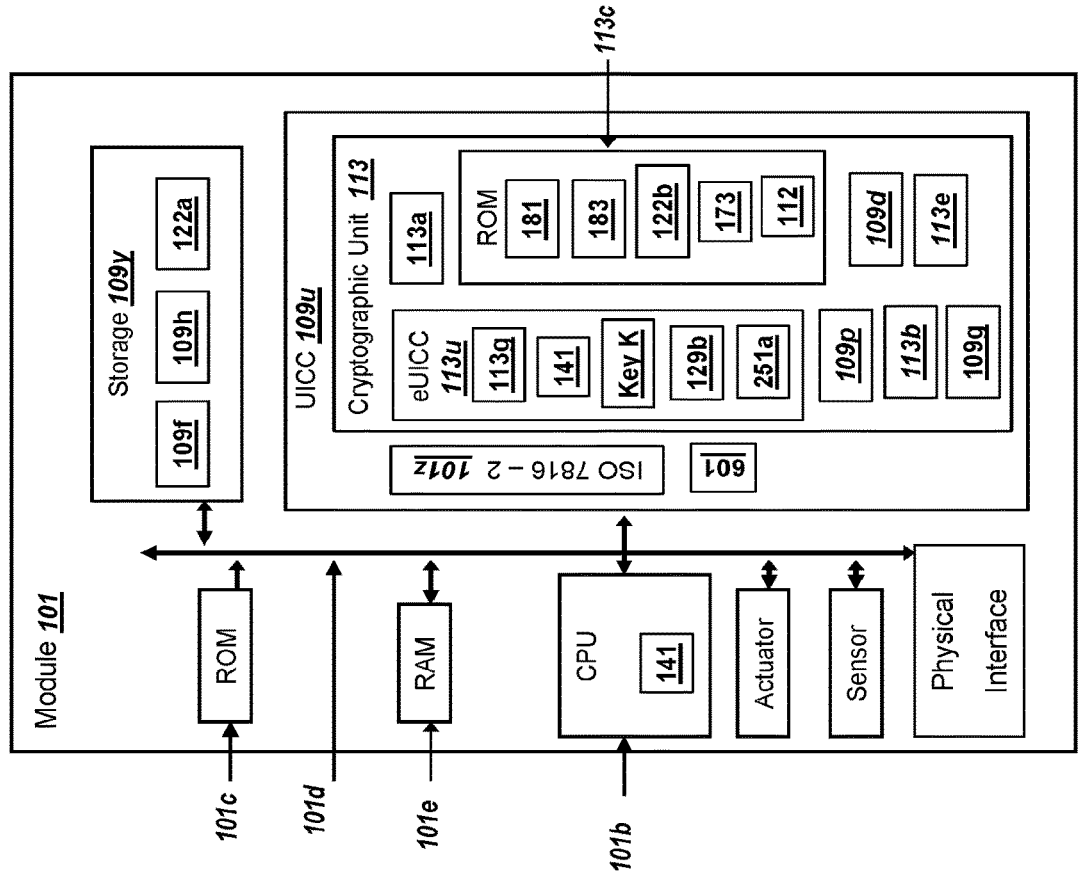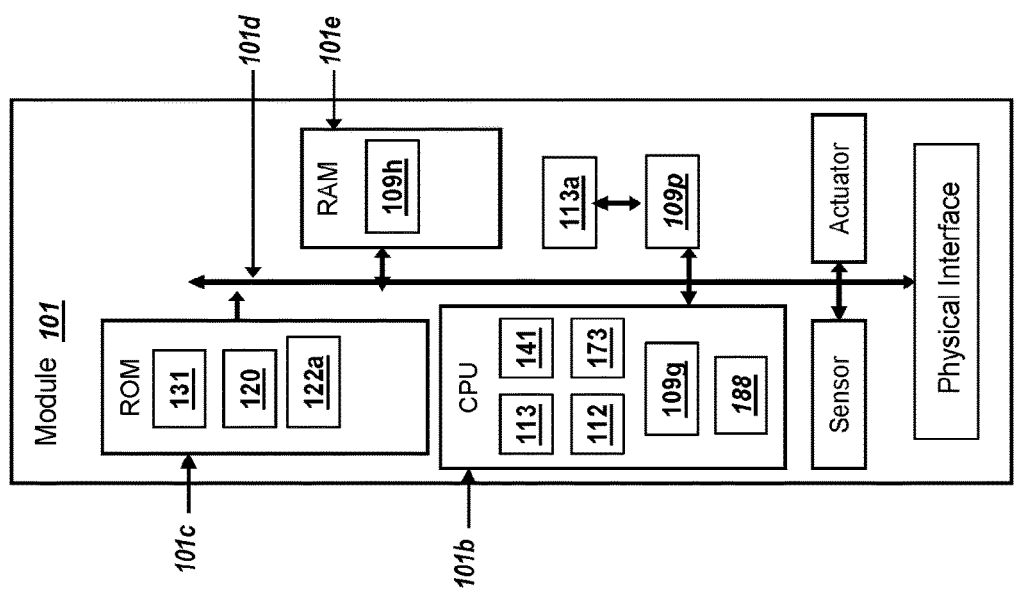

Figure 7a

Module Certificate *122a*

256 bit Elliptic Curve Key with SHA 256 Signature ( "..." is long text removed)

```
Certificate:
    Data:
        Version: 3 (0x2)
        Serial Number: 1234931064 (0x499c6c20)
        Signature Algorithm: SHA-256 ECDSA-256.          110
        Issuer: OU=JNIX, CN=server01
        Validity
            Not Before: Feb 01 20:15:24 2015 GMT
  133 →     Not After : Jul 01 20:15:24 2016 GMT
        Subject: C=US, ST=Illinois, L=Chicago, O=Module Provider, OU=1122AABBFF00
  170 →      CN=1122AABBFF00-102
        Subject Public Key Info:
            Public Key Algorithm: id-ecPublicKey
            EC Public Key:
                pub:
                    a7:a0:8a:0e:27:8f:8f:67:7f:05:36:0c:7e:f4:18:
  172            ...
                    67:60:2d:57:87:8d:cd:0b:e1:f5:3f:ac:aa:81:ea:
  126a →     ASN1 OID: sect256r1
        X509v3 extensions:
            X509v3 Subject Key Identifier:
                8D:F4:51:AB:B9:41:1F:FC:73:B3:DB:77:45:96:15:54:1A:52:85:25
            X509v3 Authority Key Identifier:
                keyid:FC:99:74:45:56:10:F1:87:AD:EA:56:70:67:A2:26:0E:3D:9E:D6:66
                DirName:/OU=JNIX/CN=server41
                serial:49:9C:6A:ED
            X509v3 CRL Distribution Points:
                Full Name:
                    URI:URI:http://www.inchargesys.com/ca/crl/ics_module_OS_ca.crl
            X509v3 Key Usage:
                Digital Signature
    Signature Algorithm: ECDSA with SHA256
        83:08:20:2a:79:e3:c3:60:b0:2f:c2:89:d4:a2:b7:57:3e:b6:
  125        ...
            05:ce:d3:e4:34:cf:d2:e1:e3:c3:60:b0:2f:c2:25
-----BEGIN CERTIFICATE-----
BggqgRzXYwzjCCAYKgAwIBAgIESZxsIDKnnjw2CwL8KJ1K
...
EBAQUAMCIxDTALMIIBegwggK3Vz62JQ==
-----END CERTIFICATE-----
```

Cryptographic Unit Certificate *122b*

283 bit Elliptic Curve Key with SHA 256 Signature ( "..." is long text removed)

```
Certificate:
    Data:
        Version: 3 (0x2)
        Serial Number: 1234931064 (0x499c6c20)
        Signature Algorithm: SHA-256 ECDSA-256.                    109e
        Issuer: OU=JNIX, CN=server01
        Validity
133 →       Not Before: Feb 01 20:15:24 2015 GMT
            Not After : Jul 01 20:15:24 2035 GMT
        Subject: C=US, ST=Illinois, L=Chicago, O=Crypto Unit Provider, OU=012778455
702 →       CN=155
        Subject Public Key Info:
            Public Key Algorithm: id-ecPublicKey
                EC Public Key:
                    pub:
                        7f:05:36:0c:7e:f4:18:a7:a0:8a:0e:27:8f:8f:67:
111                     ...
                        0b:e1:f5:3f:ac:aa:81:ea:67:60:2d:57:87:8d:cd
126b →          ASN1 OID: sect283k1
        X509v3 extensions:
            X509v3 Subject Key Identifier:
                8D:F4:51:AB:B9:41:1F:FC:73:B3:DB:77:45:96:15:54:1A:52:85:25
            X509v3 Authority Key Identifier:
                keyid:FC:99:74:45:56:10:F1:87:AD:EA:56:70:67:A2:26:0E:3D:9E:D6:66
                DirName:/OU=JNIX/CN=server41
                serial:49:9C:6A:ED
            X509v3 CRL Distribution Points:
                Full Name:
                    URI:URI:http://www.inchargesys.com/ca/crl/ics_crypto-unit_ca.crl
            X509v3 Key Usage:
                Digital Signature
        Signature Algorithm: ECDSA with SHA256
            40:fc:e4:79:e3:c3:60:b0:2f:c2:89:d4:a2:b7:57:3e:b6:
184             ...
            e4:ce:d3:13:34:cf:d2:e1:e3:c3:60:b0:2f:c2:25
-----BEGIN CERTIFICATE-----
KgAwIBAgIESZxsIDKnnjw2CwL8KJ1KBggqgRzXYwzjCCAY
...
gwggK3Vz62JQ==EBAQUAMCIxDTALMIIBe
-----END CERTIFICATE-----
```

*122b*

CRYPTOGRAPHIC UNIT FOR PUBLIC KEY INFRASTRUCTURE (PKI) OPERATIONS

CROSS-REFERENCE TO RELATED APPLICATION

This application is a continuation of U.S. patent application Ser. No. 15/575,908, filed on Nov. 21, 2017, which is a U.S. National Phase Application under 35 U.S.C. § 371 of International Patent Application No. PCT/US2016/033096, filed on May 18, 2016, which claims the benefit of U.S. Provisional Patent Application No. 62/165,317, filed May 22, 2015. The aforementioned patent applications are incorporated herein by reference in their entireties.

BACKGROUND

Technical Field

The present methods and systems relate to securing communications between a module and a network, and more particularly, to embedding a cryptographic unit within the module, where the module can use the cryptographic unit to securely derive and record private keys and perform public key infrastructure (PKI) operations.

Description of Related Art

The combination of "machine-to-machine" (M2M) communications and low-cost sensors, Internet connections, and processors is a promising and growing field. Among many potential benefits, M2M technologies allow the remote monitoring of people, assets, or a location where manual monitoring may not be economical. Many M2M applications significantly reduce costs by using automated monitoring instead of manual techniques. Prominent examples of M2M applications today include monitoring with vending machines, automobiles, alarm systems, and remote sensors. Fast growing markets for M2M applications today include tracking devices for shipping containers or pallets, health applications such as the remote monitoring of a person's glucose levels or heartbeat, monitoring of industrial equipment deployed in the field, and also security systems. Many M2M applications leverage either wired Internet connections or wireless connections, and both types of connections continue to grow rapidly. M2M communications may also be referred to as "the Internet of things" (IoT).

M2M communications can provide remote control over actuators that may be connected to a M2M device, such as turning on or off a power switch, locking or unlocking a door, adjusting a speed of a motor, or similar remote control. A decision to change or adjust an actuator associated with an M2M device can utilize one or a series of sensor measurements. An M2M device may also be referred to as a "wireless module" or also simply a module. As one example, a M2M device connected to an automobile can periodically report engine status to a remote server, and if the engine is operating outside specifications such as being too hot, including potentially an "alarm" condition, then temperature and an alarm code can be reported to a central server by the M2M device. The server can subsequently instruct the driver and/or a specified mechanic to investigate the engine for potential mechanical malfunctions or other causes. The previous example is just one of many possible applications for M2M technology, and as the costs for computer and networking hardware continue to decline, together with the growing ease of obtaining either wired or wireless Internet access for small form-factor devices, the number of economically favorable applications for M2M communications grows.

Many M2M applications can leverage wireless networking technologies. Wireless technologies such as wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include 3rd Generation Partnership Project's (3GPP) $3^{rd}$ Generation (3G) Universal Mobile Telecommunications System (UMTS) and 4th Generation (4G) Long-term Evolution (LTE), LTE Advanced, and the Institute of Electrical and Electronics Engineers' (IEEE) 802.16 standard, also known as WiMax. The use of wireless technologies with "machine-to-machine" communications creates new opportunities for the deployment of M2M modules in locations without fixed-wire Internet access, but also creates several new classes of problems that need to be solved.

Many of these problems relate to establishing security and trust between modules and a network in a manner that is both scalable and supportable over a relatively long operating lifetime of a module such as potentially 10 years or longer. Existing solutions to the problem of establishing security, such as installing a SIM card in the module or mobile phone (where the SIM card can include network access credentials), may not be efficient or feasible for M2M applications. Since M2M modules may be either (i) unattended, (ii) operating remotely, and/or (iii) traveling geographically or globally, consequently an end user or a module provider may not be able to feasibly or cost-effectively change a SIM card after the module initiates operation. A need exists in the art to allow for a deployed module to securely and automatically begin using either (i) new private and public keys (i.e. without human intervention such as swapping out a SIM card), or (ii) new network access credentials such as a new subscriber identity and shared secret key K.

Since the packets transmitted and received by a wireless module will likely traverse the public Internet for many applications, a need exists in the art to (i) prevent eavesdropping at intermediate points along the path of packets transmitted and received, (ii) allow endpoints to verify the identity of the source of packets received. A need exists in the art for a module and a server to leverage established public key infrastructure (PKI) techniques and algorithms. A need exists in the art for a module to securely derive and record PKI private keys in a manner that prevents exposure of the private key to third parties, including potentially software or firmware operating in a module or mobile phone. A need exists in the art for the private key to be securely recorded in a trusted environment protected by hardware, where the hardware recording a private key and associated cryptographic algorithms is compatible with existing and commonly deployed modules and form factors, such that new industry standards for hardware interfaces are not necessarily required. A need exists in the art for the trusted environment protected by hardware to be in a portable format, such that the portable format can readily be transported between entities such as a manufacturer, a module provider, separately from a module in which it can operate.

Multiple entities associated with a module may prefer for the module to have a certificate both (i) from a trusted certificate authority and (ii) recorded for a module public key and module identity used by the module. Consequently, a need exists in the art for a certificate authority to reliably trust that a public key submitted to the certificate authority for signature is genuine and trusted. In other words, third parties may only be able to trust a certificate from the certificate authority to the extent the certificate authority can trust that the private key associated with the public key remains secure. Therefore, a need exists in the art for a certificate authority to trust that private keys for modules with its certificates remain reasonably secure. Further, entities associated with a module, such as an end user or a module provider, may prefer that the private key for the module is not recorded by any other entity besides a trusted environment in the module, in order to maintain full control and accountability for the private key. Therefore, a need exists in the art for methods and systems such that a private key can be recorded solely within a trusted environment, where the trusted environment can comprise a cryptographic unit.

The wide variety of operating systems and versions of operating systems for modules without a UICC creates significant challenges for a manufacturer of a storage unit to easily enable communication between a module and a cryptographic unit, given the wide diversity of modules that are desired to be supported. Therefore, a need exists in the art for the a module and a cryptographic unit to communicate with each other via established and widely deployed standards, such that new software drivers do not need to be distributed in order to enable communication with a cryptographic unit. There exists a related need in the art, for modules that lack (i) a UICC or SIM card interface, but support (ii) removable storage media such as SD cards, to easily communicate with a cryptographic unit without requiring firmware updates.

In addition, the utilization of PKI technologies in modules can increase security, but a number of technical challenges must be addressed. These challenges increase if (A) a deployed module requires updated private/public key pairs after (B) operation begins for a module deployed into the field. The typical paradigm of "swapping out a SIM card" (which also depend on a pre-shared secret key Ki embedded in the card) with mobile phones may not be applicable or cost effective with modules, where swapping out the SIM card could be burdensome. Newer PKI technologies may offer a wide variety of algorithms for ciphering with public keys, and a need exists in the art for the utilization of new public and private keys to support the wide variety of algorithms, even after a module has been installed. In other words, a system should preferably both be highly secure and also flexible enough to adopt new security keys and standards. A need exists in the art for a scalable and secure method of associating a module identity with a module public key, when the module begins utilizing a new public key. A need exists in the art for a module to efficiently be able to utilize multiple public/private key pairs at the same time, such as with different service providers or different applications simultaneously.

Although securing communications between a module and a network can be accomplished through the use of cryptographic algorithms and private keys, the use of cryptographic algorithms including key derivation or key generation can required the use of random numbers with a high degree of information entropy. In other words, a system of security may only be as strong as the "randomness" of random numbers used to generate keys to secure the system. However, a trusted environment used by a computer or a module, such as on relatively small cards such as a UICC, SD card, or in an embedded integrated circuit on a circuit board may operate in an environment desirably relatively closed in order to enhance security. However, the relatively closed environment can reduce the available level of information entropy or randomness desired for the generation of random numbers. Therefore, a need exists in the art for methods and systems to provide a trusted environment with access to components in the trusted environment with a high level of information entropy or randomness for the generation of keys to secure communications. A need also exists in the art for the components used in the trusted environment to generate random numbers to leverage existing and widely deployed manufacturing techniques such that the components can readily be included and integrated into in the trusted environment in a small form factor such as a UICC, SD card, or embedded within an integrated circuit.

Sources of information entropy or randomness within a trusted environment, such as within an integrated circuit, for the creation of random numbers have encountered resistance in market acceptance. An example is the use of the RDSEED instruction in an Intel family of processors, where thermal noise in silicon is used in the generation of random numbers. A primary source of resistance for users of the trusted environment is that the source of information entropy is often highly dynamic and changing, such as measuring thermal noise within silicon for an integrated circuit. Externally auditing the values and source of the thermal noise or other sensors can be difficult because the values may constantly change. Consequently, it may not be feasible to reproduce the exact various noise levels at the time a random number is generated at a subsequent time after the random number is generated.

A need exists in the art such that a source of information entropy or noise used to generate a random number can optionally remain relatively static or fully and entirely re-created for auditing and analysis purposes. Thus, a need exists in the art for an option in a cryptographic unit where the complete state of the source of information entropy can be recorded, thereby allowing with the option for verification of the input state to support an audit or analysis of the system used to generate a random number. In this manner, users evaluating the source and "randomness" of the random numbers output can gain confidence in the system and thereby support market adoption. A need exists in the art for the same source of information entropy to also optionally and simply be continually changed, such as during normal operation and not during a period of external audit or analysis, such that random numbers output using the source of information entropy or noise can be trusted.

And other needs exist in the art as well, as the list recited above is not meant to be exhaustive but rather illustrative.

SUMMARY

Methods and systems are provided for (i) using a set of cryptographic unit for recoding private keys and (ii) using the keys in support of operations with the set of cryptographic algorithms The cryptographic unit and associated components for recording private keys can operated in any of (i) a removable storage unit such as a "secure digital" (SD) card, (ii) a universal integrated circuit card (UICC), including a UICC that contains an embedded UICC (eUICC) operating with the UICC, and (iii) an integrated circuit soldered to a circuit board. A module, such as a device for supporting "Machine to Machine" (M2M) communications, a mobile phone, or a general purpose computer such as a laptop can include the cryptographic unit and associated components. An objective of various embodiments of the invention is to address the needs in the art described above.

An exemplary embodiment may take the form of methods and systems for a removable storage unit to include a cryptographic unit, a nonvolatile memory, and a noise amplifying memory. The nonvolatile memory can include (i) shared memory for access by both the module and the cryptographic unit, (ii) protected memory accessible only by the cryptographic unit, and (iii) general memory for use by a module or mobile phone where the removable storage unit has been inserted. By providing access to the general memory for the mobile phone or module, the removable storage unit can operate as a traditional, commercially widespread removable storage media such as a "secure digital" (SD) card commonly found in electronic retailers in 2015.

By including the cryptographic unit and shared memory, the removable storage unit can provide useful capabilities of securely supporting PKI operations such as recording a private key within the cryptographic unit in addition to providing access to general memory. The private key can be recorded in a manner such that the private key cannot be feasibly directly read by a module or other entity in physical possession of the storage unit. In other words, only output of algorithms using the private key can be ready by a module where the storage unit has been inserted, thereby allowing the private key to be kept reasonably secure. The private key can be associated with a public key, and the public key can be optionally freely distributed.

The cryptographic unit can include components for operating a set of cryptographic algorithms, including a processor, random access memory, read only memory (after an initial write of data such as boot firmware and a cryptographic unit identity), and a data bus. The cryptographic unit can use a noise memory interface and noise amplifying operations in order to increase and distribute bit errors recorded in the noise amplifying memory. The noise amplifying memory can be connected to the data bus and comprise a non-volatile memory similar to the general memory, with the exceptions that (i) the use of error correction codes is omitted to promote bit errors and, (ii) overall bit errors or memory noise are desirable in the noise amplifying memory. The noise amplifying memory may also optionally have physical specifications or characteristics, such as different layer thicknesses within cells compared to cells used for general memory, in order to enhance or promote the occurrence of bit errors.

A noise memory interface can further enhance the generation of bit errors by applying voltage pulses for setting, reading, and erasing cells in a noise amplifying memory in a manner that increases bit errors, compared to a traditional memory core interface in the storage unit which operates on nonvolatile memory such as the general memory or shared memory, where bit errors are preferably minimized. Noise-inducing operations, such as reads, write, and erase operations performed by (A) the cryptographic unit through the noise memory interface on the noise amplifying memory can induce (B) a desired level or range of bit errors or memory noise in the noise amplifying memory.

The cryptographic unit can use a set of cryptographic parameters, a key generation algorithm, and a random number in order to internally derive a private key and a public key. By deriving the private key internally in the cryptographic unit, the private key can remain solely within the cryptographic unit and not be recorded by any other entity, including the manufacturer of the cryptographic unit, a module provider, or other locations with potential physical possession of the storage unit before being inserted into a module. In this manner, the security of the private key can be enhanced, since the private key does not need to be (A) generated and recorded outside the cryptographic unit by any entity with possession of the storage unit during distribution, and then (B) subsequently written to the cryptographic unit.

The cryptographic unit can generate a random number using the noise amplifying memory. The cryptographic unit can read data from the noise amplifying memory, which includes bit errors or memory noise that have been induced in the noise amplifying memory in a random nature. The data read can be processed and used as a random number seed for input into a random number generator within the cryptographic unit, and the random number generator can output a random number. The random number and cryptographic parameters can be subsequently input into a key generation algorithm to derive a PKI key pair comprising a private key and a public key. The private key can be recorded in protected memory accessible only to the cryptographic unit, and the public key along with an identity transmitted by the cryptographic unit through an external electrical interface of the storage unit.

A certificate authority can subsequently receive the public key and identity, while also recording the cryptographic parameters used to generate the PKI keys, and issue a certificate for the public key. A module with the storage unit can use (i) the private key recorded in protected memory and (ii) the cryptographic unit to perform digital signature operations with the private key in order to authenticate with other nodes such as a server the module connects with via a network.

In an exemplary embodiment, the module and the cryptographic unit can communicate through a shared file system, where the shared file system resides in shared nonvolatile memory. The shared nonvolatile memory and cryptographic unit can be included in a removable storage unit. The shared nonvolatile memory can be configured with a standard file system supported by the module, and the cryptographic unit can read and write to the shared memory. The cryptographic unit can include firmware to support a wide variety of standard file systems for modules, and consequently after a module or module provider configures the shared memory and general memory in a storage unit with a file system, both the module and the cryptographic unit can read and write to the shared file system.

Continuing with this exemplary embodiment, a cryptographic unit can periodically poll for changes or updates in files written by a module, such as a file containing input into a digital signature algorithm within the cryptographic unit. A module can periodically poll for changes or updates in files written by a cryptographic unit, such as a file containing output from a digital signature algorithm within the cryptographic unit. In this manner, existing low-level file system drivers and physical interface drivers for removable storage such as an SD card can be utilized by a module, and primarily application level changes or programming can be required to access the functions of the cryptographic unit, thereby simplifying deployment and support of existing module firmware.

In another exemplary embodiment, a cryptographic unit and protected memory can be integrated within a processor operating within a module, and the removable storage unit can be omitted for this case. A noise amplifying memory can be connected to a data bus in the module via a noise memory controller. The processor can operate in a manner such that only the cryptographic unit is allowed routine or normal access to the noise amplifying memory. The noise amplifying memory and noise memory controller can operate in a manner for these elements described above. The physical integrated circuit of the processor can contain the logic and components for the cryptographic unit, where the cryptographic unit includes support for both (i) the operation of cryptographic algorithms according to specified cryptographic parameters, and (ii) the recording of a private key processed by the cryptographic unit in the protected memory. A random number can be derived from the noise amplifying memory and subsequently input into key generation algorithms to derive a private key.

In another exemplary embodiment, the cryptographic unit can operate within a UICC, where the UICC can also include or function as an embedded UICC (eUICC). The UICC with the cryptographic unit and the eUICC can be inserted inside a module or a mobile phone. The cryptographic unit operating with the eUICC can generate a private key and a public key using a noise amplifying memory to obtain random numbers with a high level of information entropy. The UICC can forward the public key to a subscription manager. The UICC can subsequently receive an encrypted profile from the subscription manager, where the profile was encrypted using a public key associated with the private key. The encryption of the profile could be performed with a symmetric key, where the symmetric key is derived or communicated using the private key. The eUICC can decrypt the profile using the private key and record network access credentials for a wireless network, such values for an international mobile subscriber identity (IMSI) and a shared secret key K. In this manner a cryptographic unit within a UICC can support electronic distribution of network access credentials.

Exemplary embodiments can include the use of a differential fault protection unit (DFPU), which can manage both the input and output from a cryptographic unit. Since the manufacturer of the cryptographic unit or storage unit containing a cryptographic unit may not control the environmental conditions under which the cryptographic unit operates, a potential attacker could attempt to extract keys or similar activity by exposing the cryptographic or storage unit to environmental conditions outside the specified operating range. A DFPU can perform error checks such that data is not output unless the same output is derived multiple times, thereby reducing errors in the output. Further, a DFPU can provide increased resistance to side-channel attacks, including those where a potential attacker does not have physical access to the storage unit, such as (i) adding random delay to the timing of data output from a cryptographic unit, and (ii) limiting the rate at which a cryptographic unit will output data.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1b is a graphical illustration of hardware, firmware, and software components for a module, including a storage unit, in accordance with exemplary embodiments;

FIG. 1c is a graphical illustration of hardware, firmware, and software components for a module and a storage unit, in accordance with exemplary embodiments;

FIG. 4a is a flow chart illustrating exemplary steps for creating a digital signature using a private key, parameters, and data input, in accordance with exemplary embodiments;

FIG. 4b is a flow chart illustrating exemplary steps for verifying a digital signature using a public key, parameters, and data input, in accordance with exemplary embodiments;

FIG. 5 is a graphical illustration of hardware, firmware, and software components for a module, where a cryptographic unit can be integrated with a processor, in accordance with exemplary embodiments;

FIG. 6 is a graphical illustration of hardware, firmware, and software components for a module, where a cryptographic unit can be integrated a universal integrated circuit card (UICC), in accordance with exemplary embodiments;

FIG. 7a is an illustration of a certificate for a module public key, in accordance with exemplary embodiments; and, FIG. 7b is an illustration of a certificate for cryptographic unit public key, in accordance with exemplary embodiments.

DETAILED DESCRIPTION OF EXEMPLARY EMBODIMENTS OF THE INVENTION

FIG. 1a

Figure 1A:
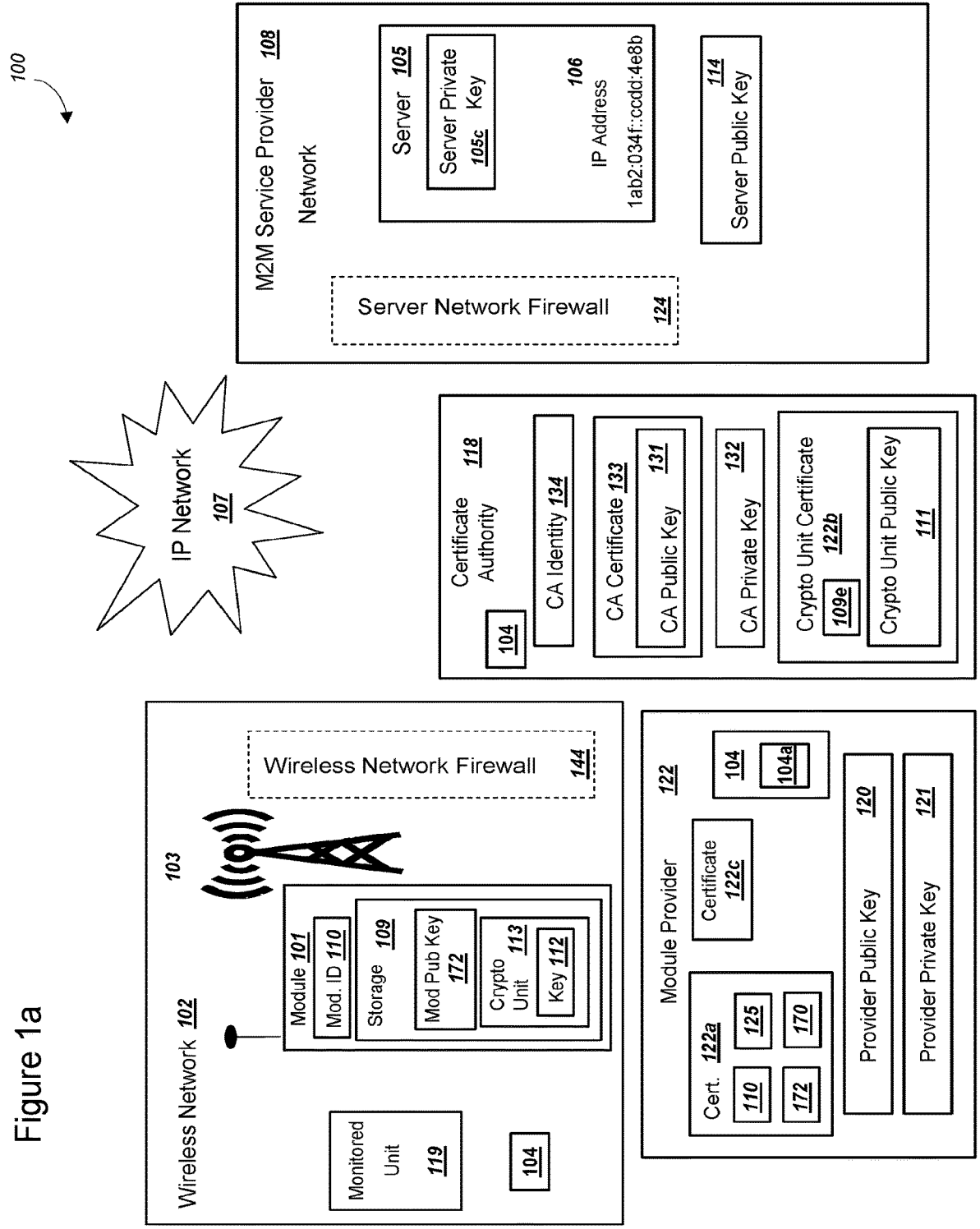
FIG. 1a is a graphical illustration of an exemplary system, where a module with a cryptographic unit communicates with other nodes through a network, in accordance with exemplary embodiments.

FIG. 1a is a graphical illustration of an exemplary system, where a module with a cryptographic unit communicates with other nodes through a network, in accordance with exemplary embodiments. The system 100 includes a module 101 operating within a wireless network 102. System 100 can also include a module provider 122, a network 107, and an M2M service provider 108, a certificate authority 118, and a monitored unit 119. Network 107 could comprise a packet switched network such as the public Internet or a private intranet, and can also be referred to as Internet 107. M2M service provider 108 can include a server 105. System 100 is illustrated without specific packet transmissions between module 101 and M2M service provider 108, although elements can communicate with each other via network 107. Examples of the communications and messages pertaining to the present invention will be illustrated in later Figures.

As contemplated herein, machine-to-machine communications may comprise communication between a module 101 and other nodes through a network 107, including a server 105, such that data can be transferred between the module and other nodes with minimal manual intervention, although manual intervention can be required to set up system 100 and any occasional manual maintenance required. Also as contemplated herein, machine-to-machine communications may also be referred to as "the Internet of things" (IoT). Module 101 may comprise a wireless module, such that module 101 can communicate with wireless network 102 using a radio and an antenna. Thus, either a wireless or a wired configuration for module 101 can be utilized in the present invention, although a wireless configuration is depicted in FIG. 1*a*.

If module 101 operates as a wireless module, module 101 and wireless network 102 can communicate using a base station 103. Module 101 and wireless network 102 can utilize a variety of wireless technologies to communicate, including WiFi, WiMax, a 2nd generation wireless wide area network (WAN) technology such as General Packet Radio Services (GPRS) or Enhanced Data rates for GSM Evolution (EDGE), 3rd Generation Partnership Project (3GPP) technology such as 3G, 4G LTE, or 4G LTE Advanced, and other examples exist as well. A wired module 101 can connect to the Internet 107 via a wired connection such as an Ethernet, a fiber optic, or a Universal Serial Bus (USB) connection (not shown). Module 101 can include a module identity 110, which could comprise a preferably unique alpha-numeric identifier for module 101, such as an Ethernet MAC address, an International Mobile Equipment Identity (IMEI), an owner interface identifier in an IPv6 network, a serial number, or other sequence of digits to uniquely identify each of the many different possible units for module 101.

Generally, the communication techniques, security steps, and message flows described herein can be independent of the network technologies utilized at the physical and data-link layers, so long as the underlying network provides access to the Internet 107 and supports Internet Protocols (IP). The Internet 107 can be an IPv4 or an IPv6 packet-switched based network that utilizes standards derived from the Internet Engineering Task Force, such as RFC 786 (User Datagram Protocol), RFC 793 (Transmission Control Protocol), and related protocols. The Internet 107 can be the public Internet comprising globally routable IP addresses, or a private network that utilizes private IP addresses. Although Internet 107 is illustrated as the globally routable public Internet in FIG. 1, with an exemplary IPv6 address for the server 105, Internet 107 could also be a private Internet that is (i) not globally routable and (ii) only accessible to authorized modules and servers. As one example of a private Internet 107, Internet 107 could use private IP addresses for nodes on the network, and in this case Internet 107 could be referred to as an intranet or private network. Alternatively, Internet 107 could be a private network layered on top of the publicly routable Internet via secured and encrypted connections between nodes using public addresses and then communicating through private addresses inside the encrypted connection. The specific numbers for IP addresses and port numbers shown in Figure are illustrative and any valid IP address or port number can be used, including an IPv4 and an IPv6 address.

When operating in a wireless network configuration, module 101 can access the Internet 107 via the wireless network 102. When communicating with other elements such as a server 105, module provider 122, and/or certificate authority 118, module 101 can be a wireless handset, a cellular phone, a smartphone, a tablet computer, a laptop, a computer with a radio, a tracking device, an M2M device, and intelligent sensor, or a circuit board with a radio that accesses wireless network 102. Example manufactures of wireless modules that utilize a wireless WAN such as 3G and 4G LTE networking technologies in 2015 include Sierra Wireless® and Telit®. In a wired configuration (not shown in FIG. 1*a*), module 101 can be a computer, security camera, security monitoring device, networked controller, etc. A more detailed depiction of exemplary components of a module 101 is included in FIG. 1*b* and FIG. 1*c* below.

Module 101 could also comprise a mobile phone operating as client for a payment terminal, such that a wireless antenna within module 101 could send payment information such as an account number from a credit card or similar account associated with either a bank or stored currency. In this case, the "monitored unit" 119 in FIG. 1*a* could comprise a payment terminal. Module 101 could communicate with the payment terminal via a magnetic reader or near-field wireless communications, and in this case the magnetic reader or antenna for near-field communications can function as a sensor for module 101. Module 101 could also operate as a "smartcard" such that an end user presents module 101 to merchants for payments. Credentials and keys for identification and payment could be included within storage unit 109, and the credentials and keys for identification and payment can incorporate the methods and systems described below.

Wireless network 102 may comprise either a wireless local area network (LAN) such as an 802.11 WLAN, Bluetooth, or Zigbee among other possibilities, and module 101 operating in wireless mode could communicate with a base station 103 of a wireless network 102 using a radio and an antenna. Wireless network 102 could operate as a Mode II device according to FCC Memorandum Opinion and Order (FC-12-36) and related white space regulation documents. If module 101 supports IEEE 802.15.4, then wireless network 102 could be a Zigbee network, an ISA100.11a standards-based network, a 6LoWPAN network as described by IETF RFC 4944, or a client within the Thread protocol specification. Other possibilities exist as well for the wireless technology utilized by a wireless network 102 and module 101, operating in a wireless mode, without departing from the scope of the present invention.

Module 101 can collect data regarding a monitored unit 119 and periodically report status to an M2M service provider 108 or a server 105. Examples of a monitored unit 119 can include a vending machine, an alarm system, an automobile or truck, a standard 40-foot or 20-foot shipping container, or industrial equipment such as a transformer on an electrical grid or elevator in a building. Additional examples of a monitored unit 119 include can also include a pallet for shipping or receiving goods, an individual box of pharmaceuticals, a health monitoring device attached to a person such as a pacemaker or glucose monitor, and a gate or door for opening and closing. Other examples exist as well without departing from the scope of the present invention.

Module 101 can utilize a sensor to measure and collect data regarding a parameter of monitored unit 119 such as temperature, physical location potentially including geographical coordinates from a Global Positioning System (GPS) receiver, radiation, humidity, surrounding light levels, surrounding RF signals, weight, vibration and/or shock, voltage, current, and/or similar measurements. If monitored unit 119 is a person or a health monitoring device associated with a person, then relevant health data could be recorded by module 101 in order to transmit to a M2M service provider 108, which could be associated with a health service such as a hospital, doctor's office, or a similar health service. Module 101 could also periodically record a picture, image, or video of or around monitored unit 119, using either visible or infrared light.

As illustrated in FIG. 1a, wireless network 102 may include a wireless network firewall 144 and M2M service provider 108 may include a server network firewall 124. These firewalls may be used to secure communication at the data link, network, transport, and/or application layers of communications using the Internet 107. Server network firewall 124 can (i) allow communication from a module 101 to a server 105 after module 101 has been properly authenticated using module identity 110, and (ii) deny communication with other nodes or hosts connected to network 107 that have not been authenticated. Wireless network firewall 144 can (i) allow communication from a server 105 to a module 101 after server 105 has been properly authenticated using server public key 114 or a server identity, and (ii) deny communication with other nodes or hosts connected to network 107 that have not been authenticated. Other possibilities exist as well for the operation of a firewall 144 and firewall 124 without departing from the scope of the present invention.

According to exemplary embodiments, module 101 can include a storage unit 109. Storage unit 109 can comprise either (i) a removable digital media card, or (ii) embedded storage operating within module 101 and electrically connected to a data bus within module 101. Storage unit 109 as a removable unit can comprise a removable device in order for data and files can be physically loaded or physically removed from a module 101. As contemplated herein, removable storage unit 109 can also be referred to as storage unit 109. Example form factors of removable storage unit 109 common in 2015 for M2M modules and portable computing devices include "secure digital" (SD) cards and also universal integrated circuit cards (UICC), also known as a Subscriber Mobile Identity (SIM) card. The UICC could also include an embedded universal integrated circuit card (eUICC). Example SD card form factors include a standard SD card (~32 mm×~24 mm), a mini SD card, and the micro SD card. Example UICC form factors include a mini-SIM (~25 mm×15 mm), a micro-SIM, and a nano-SIM. A removable storage unit could comprise other form-factors as well without departing from the scope of the present invention, such as device that connects through a universal serial bus (USB) port of module 101. Removable storage unit 109 can include flash memory in order to retain data and files when module 101 or removable storage unit 109 is not powered. Other possibilities for the non-volatile memory technology and physical interfaces for a storage unit 109 are possible as well without departing from the scope of the present invention.

According to exemplary embodiments, storage unit 109 may preferably record a module public key 172 in non-volatile memory such as flash memory. Module public key 172 can be associated with a module private key 173 (not shown). Module private key 173 can be recorded by a cryptographic unit 113 in a protected memory within storage unit 109 that is preferably and feasibly only accessible to the cryptographic unit 113. Keys 172 and 173 can be utilized by module 101 and cryptographic unit 113, respectively, in order to perform public key infrastructure operations such as creating digital signatures, asymmetric ciphering, and also key derivation functions, as discussed below such as with FIG. 1d, FIG. 4a, and FIG. 4b. As contemplated herein, cryptographic unit 113 can internally generate, derive, or calculate the key pair comprising a module private key 173 and a module public key 172, where module private key 173 (i) is recorded or stored within storage unit 109 in a protected memory and (ii) may optionally not be received, loaded, shared, or transmitted with any entity outside module 101.

In exemplary embodiments, storage unit 109 can include a cryptographic unit 113, and cryptographic unit 113 can perform cryptographic operations using the PKI keys 172 and 173. Cryptographic unit 113 can be securely isolated from module 101 and other programs, software, or firmware operating on module 101, such that input to cryptographic unit 113 can be passed through storage unit 109 and output from cryptographic unit 113 can be passed through storage unit 109. Intermediate data, memory, and non-volatile storage utilized by cryptographic unit 113 to receive the input and process the output can remain separated and protected from software programs or firmware operating on module 101. Cryptographic unit 113 can record a cryptographic unit (CU) private key 112, which can be used with cryptographic operations and algorithms as described below such as with FIG. 1d. Cryptographic unit (CU) private key 112 can be associated with a cryptographic unit (CU) public key 111, where CU public key 111 is depicted in FIG. 1a as being recorded with a certificate authority 118.

As contemplated herein, both (i) public keys illustrated in FIG. 1a and subsequent figures, and (ii) digital signatures associated with public keys can optionally be freely transmitted and recorded across the various nodes such as a module 101, a module provider 122, and an M2M service provider network 108, so CU public key 111 could also be recorded by these other elements. In contrast, private keys such as CU private key 112 and module private key 173 may preferably not be communicated between nodes in FIG. 1a in order to enhance security. Exemplary embodiments discussed below provide methods and systems for the private keys to not be communicated between the elements in FIG. 1a. In exemplary embodiments, CU private key 112 is recorded in CU 113, and CU 113 operates within storage unit 109. Storage unit 109 containing CU 113 can be manually inserted or removed from module 101 in an exemplary embodiment.

Module 101 may also be associated with a module provider 122. Module provider 122 could be a manufacturer or distributor of module 101, or may also be the company that installs and services module 101 or associates module 101 with monitored unit 119. Module provider 122 can also operate or support a distribution channel in order to deliver module 101 to end users. Module provider 122 can receive storage unit 109 from a certificate authority 118 and manually load storage unit 109 into module 101. Or, module provider 122 could deliver module 101 and storage unit 109 separately to end users, and the end users could manually insert storage unit 109 in module 101. Module provider 122 could deliver module 101 to an end-user, where the end-user associates module 101 with monitored unit 119. An end-user could install storage unit 109 inside module 101, similar to end-users inserting SIM cards in mobile phones and SD cards in digital cameras. Module provider 122 can record a module public key 172 and a certificate 122a for module 101 with module identity 110 (where certificate 122a is illustrated below in FIG. 7a). Module public key 172 may be associated with a module public key identity 170 (illustrated in FIG. 1a as recorded in certificate 122a by module provider 122), and module public key identity 170 could be an identifier of module public key 172 for embodiments where module 101 with module identity 110 uses different module public keys 172 over time.

Module 101 may utilize a plurality of module private keys 173 (not shown in FIG. 1a but shown in FIG. 1e and FIG. 3b) and module public keys 172 during the operation of a system 100 or the operational lifetime of module 101. Consequently an identifier of the module public key 172 can be helpful for various elements in FIG. 1a to keep track of the proper module public key 172 to utilize when communicating with module 101 at a given point in time. Module public key identity 170 can be used to select and/or identify the correct module public key 172. Module public key identity 170 could be a string or sequence number uniquely associated with each of a plurality of different module public keys 172 for a single module 101. In exemplary embodiments, module public key identity 170 can be globally unique for all modules 101 and all module public keys 172 in a system 100. Module public key identity 170 may preferably not be included in the string or number comprising module public key 172, but rather associated with the string or number comprising module public key 172, and in this case the two together (module public key identity 170 and the string or number for module public key 172) may be used to refer to module public key 172 as contemplated herein for some embodiments. In other words, when a node or element is referred to as using a module public key 172, the node or element can use module public key 172 in conjunction with a module public key identity 170 in order to ensure the proper module public key 172 is being utilized due to the possible nature of module public keys 172 changing over time.

The module public key 172 along with module identity 110 and module public key identity 170 can optionally be signed by a certificate authority 118 in order to confirm the identity of module 101. Module provider 122 may have its own provider public key 120 and provider private key 121. A module provider public key 120 can also be signed by a certificate authority 118 in order to confirm the identity of module provider 122. Module provider 122 may have its provider public key 120 signed by a certificate authority 118 and recorded in a certificate 122c (similar to exemplary certificates 122a and 122b illustrated in FIGS. 7a and 7b below, respectively). Module provider 122 could then also sign module public key 172 using module provider private key 121 and a signing step depicted in FIG. 4a below. In this manner, module provider 122 can also function as a certificate authority for module 101, where the "parent" certificate authority for certificates issued by module provider 122 can be certificate authority 118. Thus, in an exemplary embodiment, the validity of module public key 172 in a certificate issued for module 101 by module provider 122 could be verified with module provider 122 certificate 122c, and the public key 120 for module provider 122 in certificate 122c could be verified against certificate authority 118. Exemplary steps for verifying a signature are included in FIG. 4b below. Additional details for exemplary embodiments of utilizing public keys and certificates are depicted and described in figures below.

Public keys and private keys as contemplated in the present invention, including module public key 172, module private key 173 (not shown in FIG. 1a), CU public key 111, CU private key 112, and additional PKI keys described herein, may leverage established standards for Public Key Infrastructure (PKI). Certificates may be formatted according to the X.509 series of standards, such as X.509 v3 certificates, and subsequent or future versions and these keys may be considered as a format for recording public keys. Public keys and identities can be recorded in X.509 certificates, as well as recorded in other locations such as a database associated with module provider 122, wireless network 102, certificate authority 118, or M2M service provider network 108. The keys can support standards such as the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards.

Public keys and private keys as contemplated in the present invention, including module public key 172, module private key 173 (not shown in FIG. 1a), CU public key 111, CU private key 112, and additional PKI keys described herein, could be generated using standard software tools and libraries such as Openssl and libcrypt. Other, similar tools and algorithms can be utilized to generate public and private keys without departing from the scope of the present invention. Public and private keys as contemplated herein could be recorded in a file such as a *.pem file (Privacy-enhanced Electronic Mail), a file formatted according to Basic Encoding Rules (BER), Canonical Encoding Rules (CER), or Distinguished Encoding Rules (DER), or as text or binary files. Other formats for public and private keys may be utilized as well, including proprietary formats, without departing from the scope of the present invention. As contemplated herein, a key may also comprise either a public key or a private key. A public key as contemplated herein may also be considered a certificate or a public certificate. A private key as contemplated herein may also be considered a security key or a secret key.

Certificate authority 118 can include servers and processes in order to securely verify a module identity 110 and a module public key 172, including the support of a change in module public key 172 over time after the module 101 with module identity 110 has been deployed in the field. After the secure verification of a module identity 110 and a module public key 172, certificate authority 118 can issue a module certificate 122a, which is illustrated as recorded with a module provider 122 in FIG. 1a. In order to support the secure verification of the module public key 172 over time, the certificate authority 118 can utilize a cryptographic unit (CU) certificate 122b which can include a CU public key 111 and a CU identity 109e. An exemplary CU certificate 122b is depicted and described in connection with FIG. 7b below. In an exemplary embodiment, CU 113 records CU private key 112 in protected memory within storage unit 109 before distribution of the storage unit 109 to module provider 122. Subsequently, CA 118 can utilize CU private key 112 to authenticate or verify (i) a derived module public key 172 (shown in FIG. 2b below) or (ii) other data submitted by a module 101 with module identity 110 and cryptographic unit identity 109e. Other embodiments for the use and operation of CU private key 112, CU public key 111, certificate 122b, and certificate authority 118 are discussed below.

In exemplary embodiments, any of certificate authority 118, module provider 122, and wireless network 102 could operate a cryptographic unit (CU) configuration unit 104. Although these three elements are depicted as including a CU configuration unit 104, any could also optionally omit the CU configuration unit 104. CU configuration unit 104 could comprise a server or computer for configuring a storage unit 109 with CU 113 before distribution of storage unit 109 to an end user. Exemplary operation of a CU configuration unit is depicted and described in connection with FIG. 3a and FIG. 3b. Storage unit 109 could be inserted into CU configuration unit 104, and CU configuration unit 104 could perform configuration steps on storage unit 109, such as (i) loading firmware and data into an EEPROM within storage unit 109, (ii) configuring memory in storage unit 109 to be sufficiently cryptographically secure, (iii) instructing CU 113 to generate PKI keys pairs, (iv) securely and authoritatively sending the public portion of the PKI keys to certificate authority 118 in order for CA 118 to process a certificate 122a or 122b, and (v) quality assurance and performance verification checks on the storage unit 109.

CU configuration unit 104 can also provide a cryptographic audit mode 104a, such that a complete record of relevant internal binary states used to generate a random number can be read when cryptographic audit mode 104 is activated. In this manner, the states could be used to verify internal processes used to generate a random number, thereby providing an "open book" for users and third parties as opposed to a closed "black box" common with noise generating systems based on thermal noise. As discussed above in the Description of Related Art, important market resistance against many embedded random number generation systems has been frequent use of "black box" technology in the embedded systems. This market and commercial concern can be addressed by support of a cryptographic audit mode 104a in exemplary embodiments, also discussed in additional detail below in connection with FIG. 3a. System 100, CU configuration unit 104, storage unit 109, and CU 113 can take steps such that cryptographic audit mode 104 is not feasible (i) without inserting storage unit 109 into CU configuration unit 104, and (ii) after storage unit 109 has been deployed with a module 101 for use by an end user.

Although a single module 101, module provider 122, wireless network 102, certificate authority 118, and M2M service provider network 108 are illustrated in FIG. 1a, system 100 could comprise a plurality of each of these elements. Each of the elements could also be associated with a plurality of private keys and public keys. Module 101 could also record sensor data pertaining to a plurality of monitored units 119. Module 101 could be mobile, such as physically attached to a truck or a pallet, and module 101 could connect to a series of different wireless networks 102 as module 101 moves geographically. The operation of a certificate authority 118 could be combined with any of module provider 122, wireless network 102, or M2M service provider network 108. Other configurations combining or mixing the operation of various nodes or elements in FIG. 1a are possible as well without departing from the scope of the present invention.

FIG. 1b

FIG. 1b is a graphical illustration of hardware, firmware, and software components for a module, including a storage unit, in accordance with exemplary embodiments. FIG. 1b is illustrated to include many components that can be common within a module 101, and module 101 may also operate in a wireless configuration in order to connect with a wireless network 102. Module 101 may consist of multiple components in order to collect sensor data or control an actuator associated with a monitored unit 119. In a wireless configuration, the physical interface 101a of module 101 may support radio-frequency (RF) communications with networks including a wireless network 102 via standards such as GSM, UMTS, mobile WiMax, CDMA, LTE, LTE Advanced, and/or other mobile-network technologies. In a wireless configuration, the physical interface 101a may also provide connectivity to local networks such as 802.11 WLAN, Bluetooth, Zigbee, or an IEEE 802.15.4 network, among other possibilities. In a wireless configuration, module 101 could use a physical interface 101a be connected with both a wireless WAN and wireless LAN simultaneously. In a wired configuration, the physical interface 101a can provide connectivity to a wired network such as through an Ethernet connection or USB connection.

The physical interface 101a can include associated hardware to provide connections to components such as radio-frequency (RF) chipsets, a power amplifier, an antenna, cable connectors, RF filters, etc. Device drivers 101g can communicate with the physical interfaces 101a, providing hardware access to higher-level functions on module 101. Device drivers 101g may also be embedded into hardware or combined with the physical interfaces. Device drivers 101g can include a storage driver 101s, which can be utilized by a module 101 and operating system 101h in order to read and write data to storage unit 109, including communicating with a cryptographic unit 113 within storage unit 109. Additional details regarding the communication between module 101 and cryptographic unit 113 within storage unit 109 are described in additional figures below, including FIG. 2c. Module 101 may preferably include an operating system 101h to manage device drivers 101g and hardware resources within module 101. The operating systems described herein can also manage other resources such as memory and may support multiple software programs or software libraries operating on module 101.

The operating system 101h can include Internet protocol stacks such as a User Datagram Protocol (UDP) stack, Transmission Control Protocol (TCP) stack, a domain name system (DNS) stack, etc., and the operating system 101h may include timers and schedulers for managing the access of software to hardware resources, including storage unit 109. The operating system shown of 101h can be appropriate for a low-power device with limited memory and CPU resources (compared to a server 105). Example operating systems 101h for a module 101 includes Linux, Android® from Google®, IoS from Apple®, Windows® Mobile, or Open AT® from Sierra Wireless®. Additional example operating systems 101h for module 101 include eCos, uC/OS, LiteOs, Contiki, OpenWRT, Raspbian, and other possibilities exist as well without departing from the scope of the present invention.

A module program 101i may be an application programmed in a language such as C, C++, Java, and/or Python, and could provide functionality to support M2M applications such as remote monitoring of sensors and remote activation of actuators. Module program 101i could also be a software routine, subroutine, linked library, or software module, according to one preferred embodiment. As contemplated herein, a module program 101i may be an application operating within a smartphone, such as an iPhone® or Android®-based smartphone, and in this case module 101 could comprise the smartphone. The application functioning as a module program 101i could be downloaded from an "app store" associated with the smartphone. Module program 101i can include data reporting steps 101x, which can provide the functionality or CPU 101b instructions for collecting sensor data, sending messages to server 105 or module provider 122, and receiving responses from server 105, as described in the present invention. Module program 101*i* can also include the logic for connecting with a server 105, sending a module identity 110 to the server 105, receiving a challenge or nonce from server 105, and sending a digital signature for the challenge or nonce to the server, where the digital signature can be calculated in a cryptographic unit 113.

Many of the logical steps for operation of module 101 can be performed in software and hardware by various combinations of sensor 101*f*, actuator 101*y*, physical interface 101*a*, device driver 101*g*, operating system 101*h*, module program 101*i*, data reporting steps 101*x*, and storage unit 109. When module 101 is described herein as performing various actions such as acquiring an IP address, connecting to the wireless network, sending a module identity 110, receiving a challenge or nonce, sending a digital signature, monitoring a port, transmitting a packet, sending a message, receiving a response, or encrypting or signing data, specifying herein that module 101 performs an action can refer to software, hardware, and/or firmware operating within module 101 illustrated in FIG. 1*b* performing the action.

Note that module 101 may also optionally include user interface 101*j* which may include one or more devices for receiving inputs and/or one or more devices for conveying outputs. User interfaces are known in the art and generally are simple for modules such as a few LED lights or LCD display, and thus user interfaces are not described in detail here. User interface 101*j* could comprise a touch screen if module 101 operates as a smartphone or mobile phone. As illustrated in FIG. 1*b*, module 101 can optionally omit a user interface 101*j*, since no user input may be required for many M2M applications, although a user interface 101*j* could be included with module 101.

Module 101 may be a computing device that includes computer components for the purposes of collecting data from a sensor 101*f* or triggering an action by an actuator 101*y*. Module 101 may include a central processing unit (CPU) 101*b*, a random access memory (RAM) 101*e*, and a system bus 101*d* that couples various system components including the random access memory 101*e* to the processing unit 101*b*. The system bus 101*d* may be any of several types of bus structures including a memory bus or memory controller, a peripheral bus, and a local bus using any of a variety of bus architectures including a data bus.

Module 101 may include a read-only memory (ROM) 101*c* which can contain a boot loader program. Although ROM 101*c* is illustrated as "read-only memory", ROM 101*c* could comprise long-term memory storage chipsets or physical units that are designed primarily for writing once and reading many times, such as Electrically Erasable Programmable Read-Only Memory (EEPROM). As contemplated within the present invention, a read-only address could comprise a an address within a read only memory such as a ROM 101*c* memory address or another hardware address for read-only operations accessible via bus 101*d*. Changing data recorded in a ROM 101*c* can require a technician have physical access to module 101, such as removing a cover or part of an enclosure, where the technician can subsequently connect equipment to a circuit board in module 101, including replacing ROM 101*c*. ROM 101*c* could also comprise a nonvolatile memory, such that data is stored within ROM 101*c* even if no electrical power is provided to ROM 101*c*. In exemplary embodiments, ROM 101*c* could be (i) optionally omitted and storage 109 used for nonvolatile memory within module 101, or (ii) included in a memory unit within CPU 101*b* (not shown).

Module 101 can include a storage unit 109, and storage unit 109 can be removable. Storage unit 109 is also depicted and described in connection with FIG. 1*a* above and additional details regarding storage unit 109 are depicted and described in connection with FIG. 1*c* and FIG. 1*e* below, as well as additional details for the operation of storage unit 109 in subsequent figures. An exemplary storage unit 109 form factor could comprise a standard SD card, a mini SD card, a micro SD card, a mini UICC, a micro UICC, or a nano UICC, and other possibilities exist as well without departing from the scope of the present invention. Storage unit 109 could also comprise a solid state hard drive with a suitable small form factor for operation with module 101. Storage unit 109 can include electrical contacts (such as external pins 109*a* depicted in FIG. 1*c*) which provide electrical connectivity to bus 101*d*.

Storage unit 109 can be inserted in a housing in module 101, such that storage unit 109 can be manually inserted into or manually removed from module 101 after module 101 is manufactured. The manual operation of insertion of storage unit 109 can be performed by entities such as module provider 122 or an end user of module 101. Storage unit 109 can include NAND or NOR flash memory in order to record data when module 101 is not powered, and other nonvolatile memory technologies can be used in a storage unit as well without departing from the scope of the present invention. Storage unit 109 can be separately manufactured from module 101 and accessed and loaded with data before insertion into module 101, when storage unit 109 includes support for operating as removable media. Storage unit 109 could also operate as an "embedded" unit, such that storage unit comprises an integrated circuit soldered to a circuit board in module 101, and in these embodiments storage unit 109 can be fixed and not removable.

In exemplary embodiments, storage unit 109 can include a cryptographic unit 113, and additional details regarding the components and operation of a cryptographic unit 113 are depicted and described in additional figures below, including FIG. 1*c* and FIG. 1*e*. The inclusion of cryptographic unit 113 and the operation of cryptographic unit 113 in storage unit 109 can add functionality for storage unit 109 that is not normally included in commercially available removable storage media in the market as of 2015, such as SD cards or UICC cards. Cryptographic unit (CU) 113 within storage unit 109 can include a processor, bus, and memory similar (but with less power and on a smaller scale) as the CPU 101*b*, bus 101*d*, and ROM 101*c*. CU 113 can perform cryptographic functions such as (i) internally deriving a private key such as module private key 173 in a cryptographically secure manner, (ii) recording the private key in a protected memory such that module 101 or external parties cannot feasibly or cost-effectively read the private key, and (ii) generating digital signatures using the module private key 173.

Although the exemplary environment described herein employs ROM 101*c*, RAM 101*e*, and storage unit 109, it should be appreciated by those skilled in the art that storage unit 109 could also comprise other types of computer readable media which can store data that is accessible by a module 101, such as memory cards, subscriber identity module (SIM) cards, local miniaturized hard disks, and the like, may also be used in the exemplary operating environment without departing from the scope of the invention. The memory and associated hardware illustrated in FIG. 1*b* provide nonvolatile storage of computer-executable instructions, data structures, program modules, module program 101*i*, and other data for computer or module 101. Note the module 101 may include a physical data connection at the physical interface 101*a* such as a miniaturized universal serial bus adapter, firewire, optical, or other another port and the computer executable instructions such as module program 101*i*, data reporting steps 101*x*, operating system 101*h*, or device driver 101*g* can be initially loaded into memory such as ROM 101*c* or storage unit 109 through the physical interface 101*a* before module 101 is given to an end user, shipped by a manufacturer to a distribution channel, or installed by a technician. Further, module program 101*i*, data reporting steps 101*x*, operating system 101*h*, or device driver 101*g* can be separately loaded into storage unit 109 before or after distribution of module 101, and then storage unit 109 can be inserted into module 101.

A number of program modules may be stored in RAM 101*e*, ROM 101*c*, or storage unit 109, including an operating system 101*h*, device driver 101*g*, an http client (not shown), a DNS client, and related software. Cryptographic unit 113 can record program modules as well, where the program modules in CU 113 may be focused on cryptographic operations and functions conducted within CU 113. Program modules include routines, sub-routines, programs, objects, components, data structures, etc., which perform particular tasks or implement particular abstract data types. Aspects of the present invention may be implemented in the form of (i) a module program 101*i* and/or data reporting steps 101*x* which are executed by the module 101 working in conjunction with (ii) firmware on CU 113 (depicted as CU firmware 113*x* in FIG. 1*c*) to authenticate module 101 with a server 105 using public key infrastructure. In exemplary embodiments, program modules for CU 113 in storage unit 109 can include cryptographic algorithms as depicted and described in connection with FIG. 1*d* below.

A user may enter commands and information into module 101 through an optional user interface 101*j*, such as a keypad, keyboard (possibly miniaturized for a mobile phone form-factor), and a pointing device. Pointing devices may include a trackball, an electronic pen, or a touch screen. A user interface 101*j* may also include a display (not shown) such as a module screen. A display may also be connected to system bus 101*d* via an interface. The display can comprise any type of display devices such as a liquid crystal display (LCD), a plasma display, and an organic light-emitting diode (OLED) display. Module 101 may also include a camera (not shown) connected to or integrated with module 101 through a physical interface 101*a*, and the camera can comprise a video camera for the module 101 to collect sensor data that includes video or images. The camera (not shown) can be a CCD (charge-coupled device) camera, a CMOS (complementary metal-oxide-semiconductor) camera, or a similar device to collect video input. Other arrangements could be used as well, without departing from the invention.

The module 101, comprising a computer, may operate in a networked environment using logical connections to one or more remote computers, such as the server 105 illustrated in FIG. 1*a*. Server 105 can also function as a general purpose server to provide files, programs, disk storage, remote memory, and other resources to module 101 usually through a networked connection. Additional remote computers with which module 101 communicates may include another module 101 or mobile device, an M2M node within a capillary network, a personal computer, other servers, a client, a router, a network PC, a peer device, a wireless network 102, or other common network node. The server 105 or a remote computer typically includes many of the elements described above relative to the module 101, including a CPU, memory, and physical interfaces. It will be appreciated that the network connections shown throughout the present invention are exemplary and other means of establishing a wireless or wired communications link may be used between mobile devices, computers, servers, corresponding nodes, and similar computers. The operation of a cryptographic unit 113 within a storage unit 109 can be utilized to authenticate a module 101 in each or any of the above described networking environments.

The module program 101*i* and data reporting steps 101*x* operating within module 101 illustrated in FIG. 1*b* can provide computer executable instructions to hardware such as CPU 101*b* through a system bus 101*d* in order for a module 101 to (i) transmit and receive data with a module provider 122, (ii) monitor a sensor and/or change the state of an actuator 101*y*, (iii) send or receive packets with a server 105, and (iv) authenticate with a server 105 or M2M service provider network 108, thus allowing server 105 to remotely monitor or control a monitored unit 119 in an authenticated and secure manner. The module program 101*i* and/or data reporting steps 101*x* can enable the module 101 to authenticate and communicate with a server 105 by recording data in memory such as RAM 101*e*, where the data can include sensor data, a destination IP address number such as the exemplary IP address number 106 in FIG. 1*a*, a packet or packet header value, an encryption or ciphering algorithm and key, a digital signature and public key, etc. The data recorded in RAM 101*e* can be subsequently read by the operating system 101*h* or the device driver 101*g*. The operating system 101*h* or the device driver 101*g* can write the data to a physical interface 101*a* using a system bus 101*d* in order to use a physical interface 101*a* to send data such as a digital signature for authentication to a server 105 using the Internet 107. Alternatively, the module program 101*i* and/or data reporting steps 101*x* can write the data directly to the physical interface 101*a* using the system bus 101*d*.

In general, digital signatures for authentication with a server 105 can be performed in CU 113, where the digital signature output is transferred from CU 113 to RAM 101*e* before being transmitted from module 101 to server 105 through the IP network 107. The data recorded in RAM 101*e* such as a digital signature can be subsequently read by the operating system 101*h* or the device driver 101*g*. The operating system 101*h* or the device driver 101*g* can write the data to a physical interface 101*a* using a system bus 101*d* in order to use a physical interface 101*a* to send data such as a digital signature for authentication to a server 105 using the Internet 107. Alternatively, the module program 101*i* and/or data reporting steps 101*x* can write the data directly to the physical interface 101*a* using the system bus 101*d*. Other possibilities exist as well without departing from the scope of the present invention.

The module program 101*i* and/or data reporting steps 101*x*, or operating system 101*h* can include steps to process the data recorded in memory such as encrypting data, selecting a destination address, or encoding sensor data acquired by (i) a sensor 101*f* or (ii) through a physical interface 101*a* such as a thermocouple, shock or vibration sensor, light sensor, or global positioning system (GPS) receiver, etc. The module 101 can use the physical interface 101*a* such as a radio to transmit or send (i) the data from a sensor or (ii) a digital signature from CU 113 to a wireless network 102. For those skilled in the art, other steps are possible as well for a module program 101*i* or operating system 101h to collect data from either (i) a sensor 101f or (ii) a CU 113 and send the data in a packet without departing from the scope of the present invention.

Conversely, in order for module 101 to receive a packet or response from server 105, which could include a challenge or nonce in order to authenticate a module 101 with a server 105, the physical interface 101a can use a radio to receive the challenge or nonce from a wireless network 102. The challenge or nonce received from the server 105 through the wireless network 102 could comprise a random number or a pseudo random string of digits, bits, and/or characters. The received data can include information from a server 105 and may also comprise a datagram, a source IP address number, a packet or header value, an instruction for module 101, an acknowledgement to a packet that module 101 sent, a digital signature, and/or encrypted data. The operating system 101h or device driver 101g can use a system bus 101d and CPU 101b to record the received data such as a challenge or nonce from server 105 in memory such as RAM 101e, and the module program 101i or operating system 101h may access the memory in order to process the received data and determine the next step for the module 101 after receiving the data. Processing the received data could include deciphering or decrypting received data with a key, sending the challenge or nonce to the CU 113, reading an instruction from a server 105, or similar transformations of the received data. The steps within this paragraph may also describe the steps a module program 101i or data reporting steps 101x can perform in order to receive a packet. For those skilled in the art, other steps are possible as well for a module program 101i, data reporting steps 101x, or module 101 to receive a packet or challenge or nonce from a server 105 without departing from the scope of the present invention.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, servers, and the like. The invention may also be practiced in distributed computing environments, where tasks are performed by remote processing devices that are linked through a communications network. In a distributed computing environment, program modules may be located in both local and remote memory storage devices. In addition, the terms "mobile node", "mobile station", "mobile device", "M2M module", "M2M device", "networked sensor", or "industrial controller" can be used to refer to module 101 as contemplated herein.

In exemplary embodiments, a module 101 can include the functional capabilities of (i) collecting sensor data regarding a monitored unit 119, (ii) changing state of an actuator 101y associated with monitored unit 119, (iii) communicating the data associated with a monitored unit 119 with a wireless network 102, and/or receiving a challenge or nonce from a server 105 and sending a digital signature. The function of module 101 and cryptographic unit 113 could also be integrated (such as depicted and described in connection with FIG. 5 below), and in this case module 101 could also be referred to as a "sensor", "intelligent sensor", or "networked sensor". The device driver 101i, operating system 101i, and/or module program 101i could optionally be combined into an integrated system for providing the module 101 functionality. Other possibilities exist as well for the configuration or combination of components illustrated in FIG. 1b without departing from the scope of the present invention.

FIG. 1c

FIG. 1c is a graphical illustration of hardware, firmware, and software components for a module and a storage unit, in accordance with exemplary embodiments. The illustrated exemplary components for a module 101 in FIG. 1c can include a module identity 110, a random number generator 128, a clock 160, a battery 101k, a radio 101z, and RAM 101e. The random number generator 128 in module 101 can include a random number generator seed 128b. The RAM 101e can include data recorded in module 101 for the operation of module 101 when collecting data regarding monitored unit 119 and communicating with server 105. RAM 101e can include a server public key 114, cryptographic algorithms 141, the module identity 110, a certificate for module 101 using module identity 110, and a symmetric key 127. Note that both module 101 and CU 113 can record cryptographic algorithms 141, and in exemplary embodiments module 101 can use a first set of cryptographic algorithms 141 in RAM 101e for symmetric ciphering of data with a server 105 using a symmetric key 127, while CU 113 can use a different, second set of cryptographic algorithms 141 within CU 113 for processing digital signatures and asymmetric ciphering using private keys such as key 112 and key 173.

As depicted in FIG. 1c, module identity 110 can be recorded both within a nonvolatile physical location in module 101 and also within RAM 101e concurrently. Certificate 122a for module 101 with module identity 110 can include a module public key 172 and a digital signature 125 from certificate authority 118. Module 101 can send certificate 122a to a server 105 for authentication with server 105, such that server 105 can use the public key 172 to verify a digital signature (i) sent from module 101, and (ii) processed by CU 113. Symmetric key 127 can include an expiration time 133, such that symmetric key 127 can be identified as expired by module 101 when expiration time 133 has transpired. Although not depicted in FIG. 1c, certificate 122a can also include an expiration time 133, such as depicted for a certificate 122a in FIG. 7a below.

The illustrated components for a storage unit 109 in FIG. 1c can include external pins 109e, an interface driver 109b, an interface controller 109c, a memory core interface 109m, a cryptographic unit 113, a cryptographic unit only accessible memory 109g, and non-volatile memory 109i. The external pins 109e of storage unit 109 can provide an electrical interface for storage unit 109 to connect with bus 101d of module 101, such that a CPU 101b of module 101 can communicate with the internal elements of storage unit 109, using storage driver 101s. The external pins 109a can include pads or electrical contacts for electrical input into storage unit 109 and such as a power voltage, electrical ground, a clock input, and data lines to communicate binary data. The external pins 109a can support electrical output from storage unit 109 as well.

In an exemplary embodiment, the external pins of storage unit 109 could support a serial peripheral interface (SPI) bus mode with a micro SD card, such that pin 6 would be ground, pin 4 would be power, pin 3 would be serial data in, pin 2 would be serial data out, pin 5 would be a clock signal, etc. Other possibilities exist as well for the possible pin layouts and bus supported by the external pins 109e of an SD card, such as a one-bit SD bus mode or a four-bit SD bus mode. If storage unit 109 comprises a UICC, then the PIN layout of external pins 109a could comply with 3GPP standards and the interface, such as standard 3GPP TS 31.102. In another embodiment, external pins 109e can support either (i) a parallel bus such as a member of the Peripheral Component Interconnect (PCI) standards or a Peripheral Component Interconnect Express (PCIe) standards, or (ii) other serial interfaces such as a universal serial bus (USB).

Interface driver 109b within storage unit 109 can provide the firmware to support the selected physical bus type and communications protocol for the external pins 109a. The interface driver 109b can provide functionality similar to device driver 101g in FIG. 1b. For example, interface driver 109b could support one-bit or four-bit SD bus mode for data transfer between the interface controller 109c and CPU 101b in module 101, and other possibilities exist as well. Interface controller 109c can comprise a processor similar to CPU 101b, but embedded into the storage unit 109 and consequently typically with less resources than a CPU 101b, such as (i) less cache memory, (ii) operating typically at a slower speed, (iii) fewer internal registers, (iv) lower power consumption due to reduced thermal dissipation for a storage unit 109 compared to module 101, etc. Interface controller 109c can also manage and sequence the flow of data between non-volatile memory 109i and the external pins 109a, among other functions such as receiving updated cryptographic unit firmware 113x through external pins 109a.

As of 2015, and for the foreseeable future, large capacity removable storage media, such as SD cards with a gigabyte of memory or more, can include non-volatile memory such as non-volatile memory 109j. Properly managing reading and writing to the non-volatile memory 101j can require relatively computationally intensive operations to be performed inside the removable storage media such as the SD card. These operations performed by interface controller 109c include (i) error correcting codes to reduce or eliminate bit errors in nonvolatile memory 101j, (ii) leveling write wearing in order to spread the number of data writes as uniformly as possible across the physical memory 109j, (iii) registers and tables to keep track of memory, block and page addresses in order to perform operations such as reads and writes to a memory core interface 109m, etc.

These operations can be relatively computationally intensive for a small form factor storage unit such as a micro SD card and can comprise thousands of machine code instructions for a single operation of (i) selecting a page of physical memory within a block of memory, (ii) reading the selected page of physical memory, (iii) error correcting the data read and also write the error corrections back to the physical memory, and (iv) transferring the data through electrical pins 109a. The above exemplary operations be performed by a processor or multiple processors embedded in the storage unit 109 in the form of interface controller 109c. Exemplary microcontrollers embedded in the SD card include modified versions of an 8051 processor or an ARM® processor, such as an exemplary processor that is a member of the ARM® 7 family of processors, and other possibilities exist as well without departing from the scope of the present invention.

Storage unit 109 can also include a memory core interface 109m, where memory core interface 109m provides controller 109c and/or cryptographic unit 113 access to physical memory such as non-volatile memory 101j and/or noise collecting memory 113a. Controller 109c and/or cryptographic unit 113 can read data from physical memory by writing an address of a memory page and/or block to memory core interface 109m, and memory core interface 109m returns the data from the page. Similarly, controller 109c and/or cryptographic unit 113 can write data from physical memory by writing an address of a memory block and/or page to memory core interface 109m plus the data to be recorded in physical memory, and memory core interface 109m can subsequently write the data to physical memory at the block and page address specified. Other possibilities exist as well for the use of a memory core interface 109m without departing from the scope of the present invention. In exemplary embodiments, individual cells within a page can be addressed by a memory core interface 109m as well, and other possibilities for the structure and naming conventions of memory are possible without departing from the scope of the present invention.

Storage unit 109 can include a cryptographic unit 113, where cryptographic unit 113 can perform cryptographic operations for storage unit 109. Cryptographic unit 113 can include cryptographic unit identity 109e, a shared secret symmetric key 127, cryptographic parameters 126, cryptographic algorithms 141, a private key 112, a certificate authority public key 131, random access memory 113e, a CPU 113b, and ROM 113c. The cryptographic unit identifier 109e can comprise a globally unique identifier for cryptographic unit 113, such that nodes communicating with module 101 using storage unit 109 with cryptographic unit 113 can properly identify cryptographic unit 113 using the cryptographic unit (CU) identifier (ID) 109e. Cryptographic unit identity 109e can also be referred to as CU ID 109e. CU ID 109e can be a string or a number, such as a hexadecimal number with sufficient length such as an exemplary 8 bytes of data for the CU ID 109e, although other possibilities exist as well without departing from the scope of the present invention.

CU ID 109e can be used outside of CU 113 in a cryptographic unit certificate 122b such as, but not limited to, cryptographic unit certificate 122b depicted and described in connection with FIG. 7b below. CU ID 109e can be read from read only memory (ROM 113c) in CU 113 or via a data bus within CU 113 such as bus 113d depicted and described in connection with FIG. 1e below. In exemplary embodiments, CU ID 109e can be recorded in storage unit 109 either (i) upon manufacturing of storage unit 109, or (ii) before distribution of storage unit 109 such that CU ID 109e cannot be subsequently changed or altered after CU ID 109e is recorded in storage unit 109. Other possibilities exist as well for the format, recording location, and use of a cryptographic unit identity 109e without departing from the scope of the present invention.

Secret symmetric key 127 within cryptographic unit 113 can be a secret key for use with symmetric ciphering algorithms as described in FIG. 1d below. In exemplary embodiments, secret symmetric key 127 can be uniquely associated with cryptographic unit 113 using CU ID 109e and can also be loaded in storage unit 109 either (i) upon manufacturing of storage unit 109, or (ii) before distribution of storage unit 109 such that symmetric key 127 cannot be subsequently changed or altered after symmetric key 127 is recorded in storage unit 109. A CU 113 can record multiple secret symmetric keys 127, such (A) that a first key 127 remains permanently recorded in CU 113 before installation of CU 113 with a module 101, while (B) subsequent keys 127 could be recorded in CU 113 after distribution of storage unit 109. In other words, these subsequent symmetric keys 127 could be changed or altered after the first symmetric key 127 was written before distribution of storage unit 109.

Symmetric key 127 could comprise a pseudo random number or random number of sufficient length such as an exemplary 128 or 256 bits, such that output of a symmetric ciphering algorithm such as the Advanced Encryption Standard (AES) could not feasibly be decrypted without the use of symmetric key 127. Among many possible uses for symmetric key 127 in the present invention, symmetric key 127 could be utilized to decrypt cryptographic unit firmware 113x, where symmetric key 127 was used to encrypt the cryptographic unit firmware 113x before cryptographic unit firmware 113x was loaded into storage unit 109. In this manner, cryptographic unit firmware 113x can be resistant to reading or tampering by end users or other external parties other than the manufacturer of cryptographic unit 113 or authorized parties who also have symmetric key 127.

Cryptographic algorithms 141 within cryptographic unit 113 in storage unit 109 are depicted and described in connection with FIG. 1d below. Private key 112 in cryptographic unit 113 depicted in FIG. 1c can also be referred to as cryptographic unit (CU) private key 112. CU private key 112 can be the private key associated with CU public key 111. CU private key 112 can be a key of sufficient length and format for use with either (i) RSA algorithms and cryptography or (ii) Elliptic Curve Cryptography (ECC) as described in FIG. 1d below. Other cryptographic algorithms for CU private key 112 could be utilized by a cryptographic unit 113 as well. CU private key 112 can be either (i) loaded in storage unit 109 or (ii) internally derived within storage unit 109 using the steps depicted and described in connection with FIG. 3a below.

For embodiments where CU private key 112 is loaded into storage unit 109, the step of loading the CU private key 112 can take place either (i) upon manufacturing of storage unit 109, or (ii) before distribution of storage unit 109, such that private key 112 cannot be subsequently changed or altered after private key 112 is recorded in storage unit 109. In addition, CU 113 can operate in a manner such that private key 112 cannot be transferred out of storage unit 109 or either directly or indirectly read by module 101. CU 113 can (i) accept input via electrical pins 109a and a bus 113d described below in FIG. 1e, and (ii) send output, where the output is processed using the private key 112, but the private key 112 remains private and would be infeasible (or equivalently not cost effective) to obtain using the output CU 113 sends through electrical pins 109a.

Cryptographic unit 113 in storage unit 109 depicted in FIG. 1c can also include a certificate authority public key 131. Although not illustrated in FIG. 1c, certificate authority public key 131 can be recorded in a certificate authority certificate 133 (depicted in FIG. 1a), where certificate authority certificate 133 can be similar to (i) the certificate for a module 101 in certificate 122a illustrated in FIG. 7a or (ii) certificate for a cryptographic unit 113 in certificate 122b illustrated in FIG. 7b. Certificate authority public key 131 can be recorded internally in CU 113 in a suitable file format such as a *.pem file or text file, and other possibilities exist as well without departing from the scope of the present invention. Certificate authority public key 131 can be useful for CU 113 to verify digital signatures for data received by storage unit 109 from a certificate authority 118, such as a digital signature 125 for a module public key 173 (shown in FIG. 1e below). Although not illustrated in FIG. 1c, CU 113 could also include module provider public key 120, and module provider 122 could load module provider public key 120 into CU 113 after module provider 122 receives storage unit 109 and before module provider 122 distributes module 101. Module provider 122 could use a CU configuration unit 104 to load a module provider public key 120 in storage unit 109.

The exemplary data elements for a CU 113 in FIG. 1c such as CU private key 112, certificate authority public key 131, cryptographic parameters 126, module provider public key 120, can be recorded by CU 113 in a RAM 131e memory while CU 113 is powered via the electrical pins 109a, and these exemplary data elements could also be recorded in CU only accessible memory 109g, such that when power is removed from CU 113, CU 113 continues to record the data and the data is readily available for CU 113 operations when power is restored. CU only accessible memory 109g can comprise a portion of the non-volatile memory 109j separated either logically or physically from general memory 109i for module 101 by a memory controller 109k. Although CU only accessible memory 109g is illustrated as residing within a separate portion of nonvolatile memory 109j in FIG. 1c, CU only accessible memory 109g could alternatively be integrated within CU 113 and omitted from non-volatile memory 109j in order to enhance security and further protect memory 109g from access by elements external to storage unit 109. In the case where CU only accessible memory 109g operates within CU 113, then memory controller 109k could also operate within CU 113, and other possibilities exist as well without departing from the scope of the present invention.

Figure 1D:
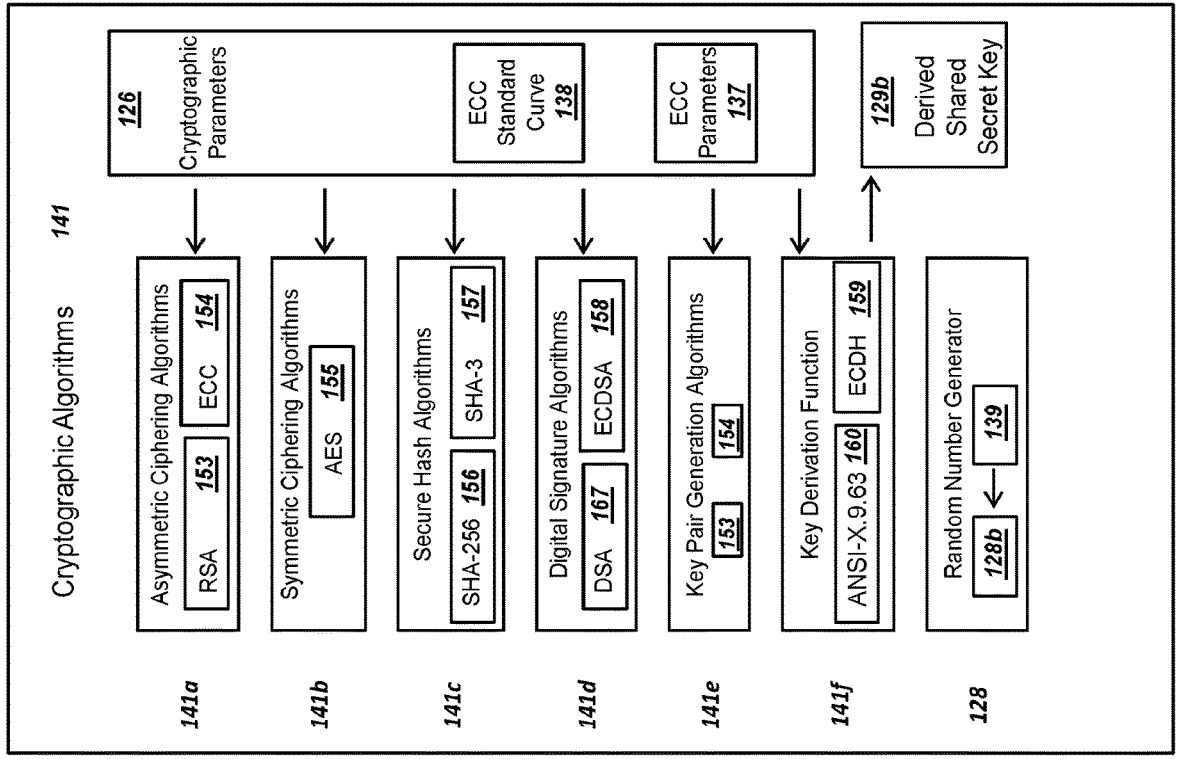
FIG. 1d is a graphical illustration of components in a set of cryptographic algorithms, in accordance with exemplary embodiments.
Figure 1E:
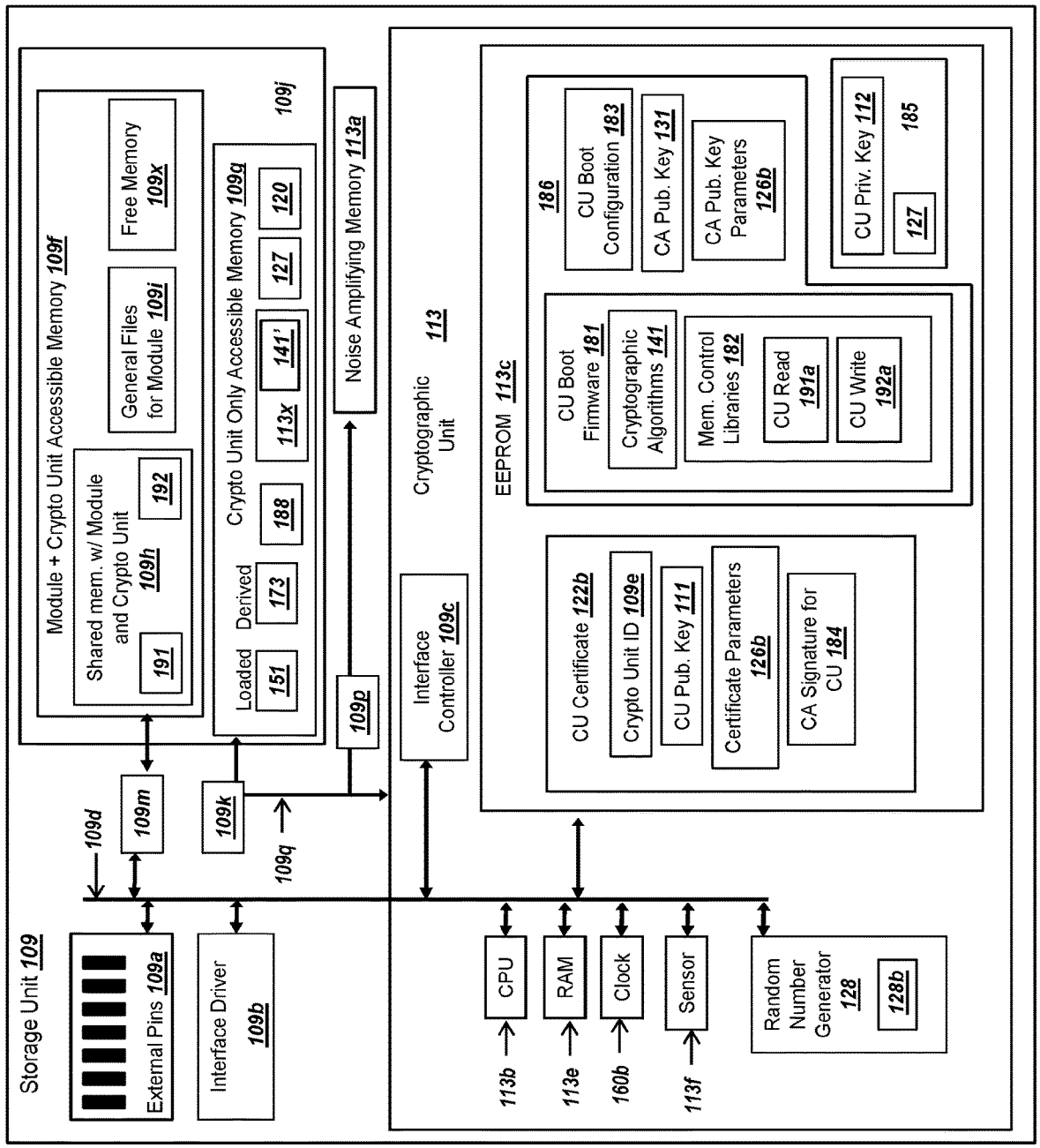
FIG. 1e is a graphical illustration of components within a storage unit, in accordance with exemplary embodiments.

Although illustrated as a separate unit from interface controller 109c in FIG. 1c, in exemplary embodiments, cryptographic unit 113 could also be optionally combined with interface controller 109c, such as depicted in FIG. 1e below in exemplary embodiments. In other words, a single physical processor similar to CPU 101b could perform the function of interface controller 109c and CU 113. Combining exemplary elements and operation of interface controller 109c and CU 113 can be referred to as a processor or a storage unit processor. A single physical processor for both controller 109c and CU 113 could be a processor belonging to the exemplary MIPS®, ARM®, or Intel® family of processors, and other possibilities exist as well. Cryptographic unit 113 could comprise also a trusted execution environment (TEE) or similar secured environment within the single, integrated physical processor. Or, CU 113 and controller 109c could comprise separate physical processors or components within storage unit 109.

Data utilized by cryptographic unit 113 may logically or physically separately from controller 109c and interface driver 109b through the use a memory controller 109k. Memory controller 109k can provide physical or logical isolation of CU 113 and cryptographic only accessible memory 109g such that module 101 could not read or write to CU only accessible memory 109g. As one example, the physical memory in storage unit 109 comprising non-volatile memory 109j could have a portion of the physical addresses reserved for reading and writing by CU 113 only, such as an exemplary top 50 blocks of non-volatile memory 109j. Memory controller 109k could intentionally disallow the transfer of data from or to non-volatile memory 109j to interface controller 109c or other elements except CU 113, where the block address is in the exemplary top 50 blocks. Memory controller 109k could also operate on a lower level than a block address for non-volatile memory 109j as well, such as only allowing CU 113 or processor 113b (shown below in FIG. 1e) to allow a specified range of pages within non-volatile memory 109j, where the specified range of pages could belong to CU only accessible memory 109g. In this manner, memory controller 109k could operate as a firewall to restrict access to CU only accessible memory 109g. Other possibilities exist as well for the operation of a memory controller 109k in order to isolate and separate CU only accessible memory 109g such that interface controller 109c cannot utilize physical memory addresses for recording and reading data utilized in a CU only accessible memory 109g.

In another embodiment, memory controller 109k could perform hardware-based encryption/decryption using a symmetric key 127 to encrypt and decrypt data transferred between CU 113 and CU only accessible memory 109g. In an exemplary embodiment, CU only accessible memory 109g can be formatted with a file system with a separate partition from the memory that module 101 accesses within memory 109f A file system on CU only accessible memory 109g could be encrypted using a symmetric ciphering algorithm 141b discussed below and a symmetric key 127 recorded by CU 113, such that even if CU only accessible memory 109g could be accessed by module 101, no useful data could be extracted or tampered with. Although memory controller 109k is depicted in FIG. 1c as a separate element from memory core interface 109m, memory controller 109k could also be optionally integrated with memory core interface 109m, and other possibilities exist as well for the operation and location of a memory controller 109k for ciphering data or restricting access to data recorded in storage unit 109 for CU 113, without departing from the scope of the present invention.

Figure 2A:
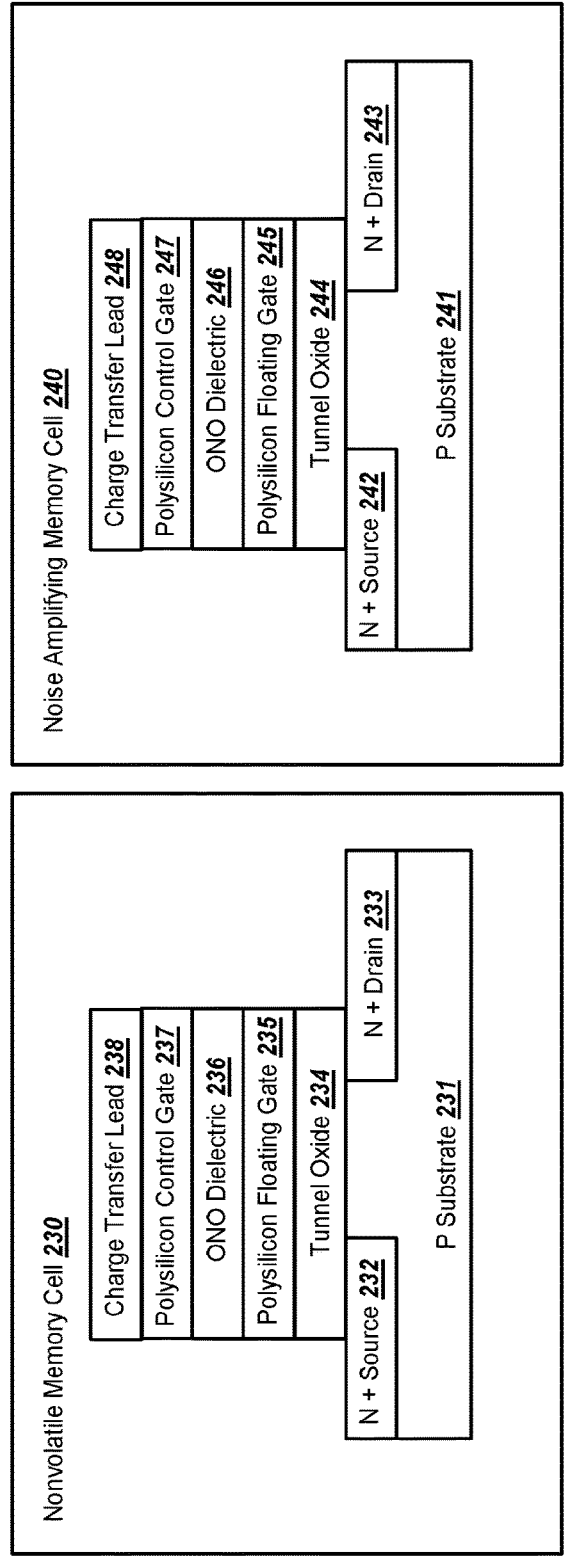
FIG. 2a is a graphical illustration of a nonvolatile memory cell and a noise collection memory cell, in accordance with exemplary embodiments.

Storage unit 109 can include non-volatile memory 109j. Non-volatile memory 109j can comprise a physical memory of NAND or NOR flash memory, such that data recorded in non-volatile memory 109j continues to be recorded when electrical power is removed from storage unit 109. The data within non-volatile memory 109j can subsequently be read and/or re-written when power is restored to storage unit 109. As of 2015, typical exemplary values for the amount of memory available non-volatile memory 109j for SD cards can range from 512 megabytes to 64 gigabytes, and other possibilities exist as well. Non-volatile memory 109j can include occasional bit errors due to the nature of the physical memory, such as small cell 230 sizes (where an exemplary cell 230 is depicted in FIG. 2a below), but error correcting codes operating in interface controller 109c can normally correct the errors, such as limiting errors in a file read by module 101 from non-volatile memory 109j to less than one part per billion during the normal, operating lifetime of storage unit 109. As contemplated herein, error correcting codes can comprise either (i) convolution codes operating on a bit by bit basis on memory or data from memory, such as a Veterbi decoder, or (ii) block codes, such as a Hamming codes or Reed-Solomon codes. Other possibilities for the physical structure of non-volatile memory 109j and error correcting codes exist as well without departing from the scope of the present invention, and generally (i) non-volatile memory 109j includes addresses and blocks, such that binary data can be recorded and subsequently read, and (ii) error correcting codes attempt to identify and correct the presence of bit errors in either physical memory and/or data read from the physical memory.

Non-volatile memory 109j in storage unit 109 can include module and CU accessible memory 109f and CU only accessible memory 109g. The two types of memory can be identified by separate addresses within the physical memory comprising non-volatile memory 109j, or similarly different sectors assigned by a file system written to the physical memory. In an exemplary embodiment the two types of memory 109f and 109g can be segmented logically, where memory 109g is encrypted with a symmetric key 127 within CU 113 by a memory controller 109k. Module and CU accessible memory 109f can include shared memory 109h, module general memory 109i, and cryptographic unit firmware 109x. Module general memory 109i can comprise memory that module 101 can access in non-volatile memory 109j such as recording firmware for module 101 or other long-term and non-volatile storage of data or files for module 101. In exemplary embodiments, operating system 101h for module 101 can be recorded in module general memory 109i. Module and CU accessible memory 109f can record a file system for both module 101 and CU 113 to access, such as exemplary file systems of FAT16, FAT 32, NTFS, ext3, ext4, UDF, and other file systems for memory 109f and memory 109j are possible as well without departing from the scope of the present invention.

Shared memory 109h in nonvolatile memory 109j can include memory accessible by both a module 101 and CU 113, such as a portion of a file system recorded in memory 109j. Exemplary use of module and CU shared memory 109h is depicted and described in connection with FIG. 2c below. In exemplary embodiments, both module 101 and CU 113 can both read and write to module and CU shared memory 109h, which can also be referenced herein as shared memory 109h. As illustrated in FIG. 1c, shared memory 109h can be a subset of module and CU accessible memory 109f, and module and CU accessible memory 109f can also include general memory 109i for module 101. In exemplary embodiments, the CU 113 may have access to general memory 101i, such as a location for collecting additional noise or information entropy for input into a random number generator 128 for CU 113 as depicted in FIG. 1e below. In other words, CU 113 may read data from general memory 101i, but in an exemplary embodiment (i) CU 113 does not write to general memory 101i and (ii) CU 113 does write to shared memory 109h. Other possibilities for the configuration of a non-volatile memory are possible as well, such that storage unit 109 can provide nonvolatile memory (i) dedicated to module 101, (ii) dedicated to CU 113, and (iii) shared between module 101 and CU 113, without departing from the scope of the present invention.

Storage unit 109 can also include a noise collecting memory 113a, which can be included within the CU only accessible memory 109g discussed above. Noise amplifying memory 113a can utilize NAND or NOR memory in a configuration such that the memory is designed and manufactured to intentionally collect a higher level of bit errors over time compared to non-volatile memory 109j. Noise amplifying memory 113a can be identified separately from non-volatile memory 109j by a significantly higher bit error rate or frequency of recorded bit errors for noise amplifying memory 113a compared to non-volatile memory 109j. In an exemplary embodiment, noise amplifying memory 113a can have a bit error rate greater than an order of magnitude higher than non-volatile memory 109j, typically after operation of several minutes or longer with relatively intensive read/writes to the noise amplifying memory 113a. Further, noise amplifying memory 113a can be operated separately from non-volatile memory 109j, where the use of error correction codes on noise amplification memory 113a are intentionally omitted, while error correction codes are used on non-volatile memory 109j. Although different operations on noise amplifying memory 113a, such as programming or recording data, may concentrate errors in a particular set of memory cells, the collection of bit errors within noise amplifying memory 113a can be on a relatively random basis over time for large sample of bits or cells, such as a sample of 10,000 bits.

In a noise amplifying memory 113a, random errors in memory cells or recorded bits can be intentionally induced by operations from CU 113. The operations by CU 113 to intentionally induce errors can include (i) programming disturbances, where the voltage stress in cells not being programmed are elevated (such as memory cells nearby the cells being programmed), and (ii) read disturbances, where cells not being programmed are exposed to elevated voltage stress (such as memory cells nearby the cells being read). Note that noise amplifying memory 113*a* can also include some aspects of non-volatile memory 109*j*, such as memory that does not essentially completely reset when power is removed, such as with RAM memory. In other words, with a noise amplifying memory 113*a*, a majority or significant majority of the memory cells can retain their state or data (such as a logic level of "1" or a logic level of "0") when power is removed from storage unit 109.

As illustrated in FIG. 1*c*, module 101 may also contain a random number generator 128. Random number generator 128 may contain a seed 128*b*. The creation of random numbers with a high degree of entropy may be important the use of cryptographic algorithms 141. A plurality of the data as a source for a random number seed 128*b* could be appended together into a "module random seed file" 139 (depicted in FIG. 1*d* below) with a combined series or list of module states (i.e. a plurality of sensor 101*f* measurements, radio 101*z* measurements, clock 160 times or values, memory 101*e* or memory 101*w* states, operating system 101*h* states, actuator 101*y* states, and/or hardware 101*a* or 101*d* states). Note that values or data for each of the elements listed in the previous sentence could be utilized in a "module random seed file" 139 instead of or in addition to a state. In exemplary embodiments, random number generator 128 can include a secure hash algorithm 141*b* (discussed in FIG. 1*d* below) operating on random number seed 128*b*, where the output is a seemingly random number for an observer who does not know the random number seed 128*b*. Other possibilities exist as well for the operation of a random number generator 128 without departing from the scope of the present invention.

FIG. 1*d*

FIG. 1*d* is a graphical illustration of the components in a set of cryptographic algorithms, in accordance with exemplary embodiments. As contemplated herein, a cryptographic unit 113 in a storage unit 109 can utilize a set of cryptographic algorithms 141 in order to support the secure communication between a module 101 and other nodes, such as a server 105, a wireless network 102, or module provider 122. The cryptographic algorithms 141 used by cryptographic unit 113 or module 101, can comprise a set of steps, procedures, or software routines for accomplishing tasks for ciphering, deciphering, signing, and verifying messages, including the generation of public keys, private keys, and derived shared keys. The generation of random numbers may also be required for cryptographic operations including private key generation, creating nonce or challenge values, and also creating digital signatures, such as an R-value in the elliptic curve digital signature algorithm (ECDSA). Cryptographic algorithms 141 can be implemented in software or firmware operating on (i) module 101 in the form of a module program 101*i*, or (ii) cryptographic unit 113. Example software or routines for a cryptographic algorithms 141 includes the libraries within the openssl, libmcrypt, and/or and Crypto++ open source libraries, and proprietary implementations are available as well.

In addition, cryptographic algorithms 141 may be implemented in hardware or firmware on any of module 101 or cryptographic unit 113. Other nodes in FIG. 1*a* could implement cryptographic algorithms as well, such as a server 105, CA 118, module provider 122, and wireless network 102. Note that module 101, cryptographic unit 113, and server 105 could each utilize a different set of cryptographic algorithms 141, although the sets of algorithms should preferably be fully interoperable (i.e. ciphering with a first symmetric ciphering algorithm 141*b* and a symmetric key 127 on cryptographic unit 113 could be deciphered by a second symmetric ciphering algorithm 141*b* on server 105 using the same symmetric key 127, etc.). As illustrated in FIG. 1*d*, cryptographic algorithms 141 may comprise an asymmetric ciphering algorithm 141*a*, a symmetric ciphering algorithm 141*b*, a secure hash algorithm 141*c*, a digital signature algorithm 141*d*, a key pair generation algorithm 141*e*, a key derivation function 141*f*, and a random number generator 128.

Asymmetric ciphering algorithms 141*a* can comprise algorithms utilizing public key infrastructure (PKI) techniques for both (i) encrypting with a public key and (ii) decrypting with a private key. Example algorithms within asymmetric algorithms 141*a* include the RSA algorithms 153 and the Elliptic Curve Cryptography (ECC) algorithms 154, and other asymmetric algorithms could be utilized as well. For example, either ECC algorithms 154 or RSA algorithms 153 can be used for encryption and decryption. A set of parameters 126 can include input into asymmetric ciphering algorithms 141*a*, such as specifying key lengths, elliptic curves to utilize (if ECC), modulus (if RSA) or other parameters or settings required. As contemplated herein and described in additional detail below, the algorithms illustrated in FIG. 1*d* can perform both ciphering and deciphering, using the appropriate keys.

The use and application of RSA algorithms and cryptography are described within IETF RFC 3447 titled "Public-Key Cryptography Standards (PKCS) #1: RSA Cryptography Specifications Version 2.1", herein incorporated by reference, among other published standards for the use of RSA algorithms 153. The use of an RSA algorithm 153 for encryption and decryption, including with cryptographic algorithm and other description of encryption or decryption algorithms, can also be processed according to the description of the RSA algorithm according to the Wikipedia entry for "RSA (algorithm)" as of Sep. 9, 2013, which is incorporated by reference herein.

The use and application of ECC algorithms 154 for asymmetric ciphering algorithms 141*a* within cryptographic algorithms 141 are described within IETF RFC 6090 titled "Fundamental Elliptic Curve Cryptography Algorithms" (herein incorporated by reference), among other published standards using ECC. ECC algorithms 154 can also utilize elliptic curve cryptography algorithms to the Wikipedia entry for "Elliptic curve cryptography" as of Sep. 9, 2013, which is incorporated by reference herein. ECC algorithms 154 may utilized according to exemplary preferred embodiments in order to maintain high security with smaller key lengths, compared to RSA, thereby helping to comparably reduce the message lengths, radio frequency spectrum utilization, and processing power required by CU 113. Thus, the use of ECC algorithms 154 within various steps requiring ciphering or digital signatures may help conserve battery life of module 101 operating a CU 113 while maintaining the objective of securing system 100. Note that as contemplated herein, other algorithms besides with ECC algorithms 154 and RSA algorithms 153 may be also be used in asymmetric algorithms 141*a*.

Cryptographic algorithms 141 may also include a set of symmetric ciphering algorithms 141b. Symmetric ciphering algorithms 141b can utilize a symmetric key 127 by one node such as a module 101 with cryptographic unit 113 to encrypt or cipher data, and the encrypted data can be decrypted or deciphered by server 105 also using the symmetric key 127. A server 105 could also encrypt data using a symmetric key 127 and the data could be decrypted by module 101 or CU 113 using the symmetric key. Or, cryptographic unit firmware 113x could be ciphered with a symmetric key 127 by a module provider 122 or CA 118 and CU 113 could decrypt CU firmware 113x using the symmetric key. Examples of symmetric ciphers include Advanced Encryption Standard 155 (AES), as specified in Federal Information Processing Standards (FIPS) Publication 197, and Triple Data Encryption Standard (Triple DES), as described in NIST Special Publication 800-67 Revision 1, "Recommendation for the Triple Data Encryption Algorithm (TDEA) Block Cipher (Revised January 2012)".

Parameters 126 input into symmetric ciphering algorithms 141b can include symmetric key 127 length, such as the selection of 128, 192, or 256 bits with AES 155 symmetric ciphering, and parameters 126 could also select a symmetric ciphering algorithm in a collections of symmetric ciphering algorithms 141b. Other examples of symmetric ciphering algorithms 141b may be utilized as well within cryptographic algorithms 141. Also note that as contemplated herein, the term "symmetric ciphering" contemplates the use of a symmetric ciphering algorithm 141b in order to encrypt or cipher data with a symmetric ciphering algorithm 141b, and "asymmetric ciphering" contemplated the use of an asymmetric ciphering algorithm 141a to encrypt or cipher data with a public key, such as module public key 172 or server public key 114.

Cryptographic algorithms 141 may also include a set of secure hash algorithms 141c in order to compute and output a secure hash value or number based on a string or file input into the secure hash algorithms 141c. Example secure hash algorithms include SHA256 156 (also known as SHA-2) and SHA-3 157. SHA256 156 is specified in the National Institute of Standards and Technology (NIST) Federal Information Processing Standards Publication (FIPS PUB) 180-2 titled "Secure Hash Standard". SHA-3 157 is specified in FIPS PUB 180-4. Parameters 126 input into secure hash algorithms 141c can include the selection of the length of the secure hash, such as either 224, 256, or 512 bits with either SHA-2 or SHA-3, and other possibilities exist as well.

Cryptographic algorithms 141 may also include a set of digital signature algorithms 141d, in order to sign and verify messages by a cryptographic unit 113, module 101, server 105, wireless network 102, module provider 122, or certificate authority 118. Digital signature algorithms 141d can also verify signatures such as comparing that (i) a first secure hash value received in the form of a digital signature in a certificate (such as signature 125 in certificate 122a) using a certificate authority private key 132 matches (ii) a second secure hash value independently calculated using the same input and CA public key 131. Digital signature algorithms 141d can utilize algorithms in National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". The use of ECDSA algorithm 158 within a set of digital signature algorithms 141d may be preferred if keys such as cryptographic unit public key 111 and certificate authority public key 131 are based on elliptic curve cryptography. An exemplary embodiment of (i) using a private key to for generating digital signatures is depicted and described in connection with FIG. 4a below and (ii) using a public key to verify digital signatures is depicted and described in connection with FIG. 4b below.

Other PKI standards or proprietary techniques for securely verifying digital signatures may be utilized as well in digital signature algorithms 141d. Parameters 126 input into digital signature algorithms 141d can include the selection of a secure hash algorithms 141c to utilize with digital signature algorithms 141d, or the algorithm to utilize, such as ECDSA shown in FIG. 7a or an RSA-based alternative for digital signatures is possible as well. Parameters input into digital signature algorithms 141d can also include (i) a padding scheme for use in a digital signature algorithm 141d, or (ii) the selection of either deterministic usage of DSA or ECDSA such as specified in IETF RFC 6979 or the use of a random R value in the signature algorithm. Digital signature algorithms 141d could also include an RSA digital signature algorithm for use with RSA-based public and private keys.

Cryptographic algorithms 141 may also include key pair generation algorithms 141e, a key derivation function 141f, and a random number generator 128. Key pair generation algorithms 141e can be utilized by cryptographic unit 113 to securely generate private and public keys. The key pair generation algorithms 141e can also use input from a parameters 126, such as the desired key lengths, or an ECC curve if the public key will support ECC algorithms 154. According to an exemplary preferred embodiment, cryptographic unit 113 can derive a pair of module public key 173 and module private key 172 using key pair generation algorithms 141e and the input from a random number generator 128. Software tools such as openssl and libcrypt include libraries for the generation key pairs, and these and similar libraries can be used in a key pair generation algorithm 141e.

Key derivation function 141f can be used by module 101, server 105, certificate authority 118, wireless network 102, and/or module provider 122 in order to determine a common derived shared secret key 129, using at least two respective public keys as input, and may also include the input of a private key. A key exchange to share a common symmetric key 127 (comprising a derived shared secret key 129) can be performed using a key derivation function 141f and parameters 126. An exemplary algorithm within a key derivation function 141f can be the Diffie-Hellman key exchange, which is used by tools such as secure socket layer (SSL) with RSA algorithms 153. When using ECC algorithms 154, module 101 and server 105 can utilize Elliptic Curve Diffie-Hellman (ECDH) algorithms 159, and a summary of ECDH is included in the Wikipedia article titled "Elliptic Curve Diffie-Hellman" from Sep. 24, 2013, which is herein incorporated by reference.

Other algorithms to derive a shared secret key 129b using public keys and a private key may also be utilized in a key derivation function 141f, such as the American National Standards Institute (ANSI) standard X-9.63 160. Parameters 126 used with key derivation function 141f with elliptic curve cryptography can include a common base point G for two nodes using the key derivation function 141f and public keys. The base point G in a parameters 126 can be transmitted or sent from a module 101 to a server 105 in a message transmitted over network 107, and the base point G can be sent from a server 105 to a module 101 in a response transmitted over network 107, and other possibilities exist as well. Parameters 126 can also include other or additional information for using a key derivation function 141*f* in order to derive a commonly shared symmetric key 127.

Parameters 126 input into key pair generation algorithms 141*e* can include the type of asymmetric ciphering algorithms 141*a* used with the keys, the key length in bits, an elliptic curve utilized for ECC, a time-to-live for a public key that is derived, and similar settings. Additional parameters 126 for a public key can include a supported point formats extension, where the supported point formats extension could comprise uncompressed, compressed prime, or "compressed char2" formats, as specified in ANSI X-9.62. In other words, an ECC public key can have several formats and a set of parameters 126 can be useful to specify the format. Although a set of parameters 126 is illustrated in FIG. 1*d* as internal to cryptographic algorithms 141, parameters 126 could be recorded in other locations in a cryptographic unit 113, storage 109, and/or module 101. As one example, parameters 126 could be recorded in a server 105 and downloaded by module 101 using the Internet 107 and subsequently written to CU 113. The various algorithms within cryptographic algorithms 141 may utilize a random number generator 128, which is also depicted and described in connection with FIG. 1*c* above and FIG. 1*e* below.

According to a preferred exemplary embodiment, parameters 126 can include values to define an elliptic curve and/or use ECC algorithms 154. The values could be constants or variables in a defining equation for an elliptic curve, or the parameters could simply name an existing, defined curve such as the standard named curve. Parameters 126 could include a set of ECC parameters 137 for using elliptic curve cryptography in ECC algorithms 154, where the ECC parameters 137 can include the ECC parameters in section 3.3 of IETF RFC 6090, including: (i) a prime number p that indicates the order of a field Fp, (ii) a value "a" used in a curve equation, (iii) a value "b" used in the curve equation, (iii) a generator "g" of the subgroup, and (iv) an order "n" of the subgroup generated by "g". Further, the ECC parameters 137 could include values used for elliptic curve cryptography as specified in IETF RFC 5639 titled "Elliptic Curve Cryptography (ECC) Brainpool Standard Curves and Curve Generation", section 3: (i) a "p" value for the prime specifying the base field, (ii) "A" and "B" are coefficients for an equation such as y^2=x^3+A*x+B mod p defining the elliptic curve, (iii) "G"=(x,y) as the base point, i.e., a point in E of prime order, (iv) "q" as the prime order of the group generated by G, and (v) "h" as the cofactor of G in E, i.e., #E(GF(p))/q. Other possibilities exist as well for an ECC parameters 137 that can be used in a cryptographic algorithms. Parameters 126 could also include an ECC standard curve 138, which could comprise a name and/or values for a standardized curve, such as the list of named curves included in section 5.1.1 of IETF RFC 4492 titled "Elliptic Curve Cryptography (ECC) Cipher Suites for Transport Layer Security (TLS)."

As contemplated herein, a set of cryptographic algorithms 141 may operate using either strings or numbers, and parameters 126 could include either strings or numbers as well. The processing of cryptographic algorithms within a cryptographic unit 113 can take place within a CPU 113*b*, or module 101 could also process cryptographic algorithms 141 in a processor 101*b*. Embodiments of the present invention contemplate that cryptographic algorithms 141 operating in cryptographic unit 113 perform select functions when communicating with a server 105, such as calculating a digital signature using a private key, and other functions when communicating with a server 105 can be performed by CPU 101*b* in module 101, such as ciphering data transmitted between module 101 and server 105.

FIG. 1*e*

FIG. 1*e* is a graphical illustration of components within a storage unit, in accordance with exemplary embodiments. FIG. 1*e* depicts additional details for a cryptographic unit 113 and storage unit 109 illustrated in FIG. 1*c*. Storage unit 109 can include module and CU accessible memory 109*f*, CU only accessible memory 109*g*, cryptographic unit 113, noise amplifying memory 113*a*, memory core interface 109*m*, memory controller 109*k*, noise memory interface 109*p*, and data bus 109*d*, and an internal bus 109*q*. Cryptographic unit (CU) 113 can include a processor 113*b*, RAM 113*e*, a clock 160*b*, a random number generator 128, a sensor 113*f*, an interface controller 109*c*, and EEPROM 113*c*. Although not illustrated in FIG. 1*e*, CU identity 109*e* could also be written into hardware within CU 113, such as at a physical address connected to bus 109*d* or within processor 113*b*, such that CU identity 109*e* can be read from storage unit 109 regardless of a configuration or data recorded in EEPROM 113*c*

EEPROM 113*c* could also comprise a read only memory, where the data in EEPROM 113*c* is written once upon manufacturing of storage unit 109. EEPROM 113*c* could also function as a read only memory for CU 113 similar to ROM 101*c* for module 101 above. In other words EEPROM 113*c* does not need to be erasable and reprogrammable, although some data in EEPROM 113*c* could be re-written in exemplary embodiments. Although interface controller 109*c* is depicted inside CU 113 in FIG. 1*e*, CU 113 could also comprise a logical or physical component in interface controller 109*c*. Or, the function of interface controller 109*c* and CU 113 could be combined, and for example interface controller 109*c* and CU 113 could share a common processor 113*b*. The components in CU 113 can be connected to data bus 109*d* in order to transfer data between the various components in CU 113 and storage unit 109.

The processor 113*b* in CU 113 can function similar to processor 101*b* for module 101 as described in connection with FIG. 1*b* above, with a form factor, speed, and computational capacity suitable for CU 113. Processor 113*b* in CU 113 could be a processor belonging to the exemplary MIPS®, ARM®, or Intel® family of processors, and other possibilities exist as well. Processor 113*b* can include components such as registers, accumulators, and logic elements to add, subtract, multiply, and divide numerical values, and processor 113*b* can be connected to data bus 109*d*. The timing of processor 113*b* and data bus 109*d* can be driven by a clock 160*b*. Processor 113*b* can provide the hardware for CU 113 to perform calculations for cryptographic algorithms 141 in addition to the general operation of CU 113 and managing communication between CU 113 and module 101 through electrical pins 109*a*. Processor 113*b* could also be connected to internal bus 109*q*

Upon startup or powering of CU 113 and storage unit 109, processor 113*b* could load and operate on instructions provided by CU 113 boot firmware 181 from EEPROM 113*c*. CU 113 boot firmware 181 and CU firmware 113*x* can provide instructions to processor 113*b* in the format of machine executable code. The instructions in CU 113 boot firmware can provide instructions for processor and CU 113 to initialize and subsequently load CU firmware 113*x*. Processor 113*b* for CU 113 can access noise amplifying memory 113*a* through internal bus 109*q* and noise memory interface 109*p*. Internal bus 109*q* is depicted in FIG. 1*e* as connected to CU 113, and CU 113 can include processor 113*b*. In this manner and through this connection between processor 113*b* and CU 113, processor 113*b* can read data from and write data to noise amplifying memory 113*a* and CU only accessible memory 109*g*.

Random access memory 113*e* in CU 113 can function similar to RAM 101*e* for module 101, with a form factor, speed, and storage capacity suitable for CU 113. RAM 113*e* can be connected to data bus 109*d* in storage unit 109, and can store data for processor 113*b* in a volatile state, such that data recorded in RAM 113 can be essentially flushed or reset when electrical power to storage unit 109 and CU 113 is removed. Random access memory 113*e* can store data such as tables of memory addresses and sectors for memory 109*g* and memory 109*f*, since these tables are ordinarily larger than the registers provided by CPU 113*b*. Clock 160*b* can comprise an oscillator outputting a sine or CMOS signal at several megahertz or higher. Clock 160*b* can be synchronized or operating at a multiple or fraction of clock 160 for module 101. Clock 160*b* can also be driven by a clock input pin on electrical pins 109*a*, and clock 160*b* can include phased loop logic (PLL) to convert the frequency from a clock input pin on electrical pins 109*a* from module 101 to a clock rate or frequency suitable for CU 113. Clock 160*b* can also drive internal bus 109*q*, such that CU 113 can access noise amplifying memory 113*a* using the timing and clock cycles generated by clock 160*b*.

CU 113 can also include an embedded sensor 113*f*. Sensor 113*f* could comprise a sensor similar to sensor 101*f* for module 101, with a difference that sensor 113*f* can be sufficiently small to be enclosed by the housing for storage unit 109 along with the other components illustrated in FIG. 1*e*. In exemplary embodiments the analog output of sensor 113*f* can be converted to digital form by processor 113*b* and utilized as input, along with other data, into a random number seed 128*b* within random number generator 128 in CU 113. Sensor 113*f* could collect analog data, such as temperature, pressure, thermal noise in silicon within CU 113, or other environmental variables, with a sufficient number of significant digits, such that the trailing digits could comprise an effective noise value.

In exemplary embodiments, processor 113*b* could include analog to digital inputs of sufficient width, such as an exemplary 16 bits, where an exemplary least significant 6 bits of data from the converted analog input into processor 113*b* can essentially comprise a "noise" value 197 (depicted in FIG. 2*b* below) since sensor 113*f* may not provide resolution or accuracy of more than an exemplary 10 bits, although other possibilities exist as well to acquire noise from a sensor 113*f*. Multiple samples of the least significant bits of data from sensor 113*f* could be added together over time in order to generate a number of adequate length for a noise value 197. Although a single sensor 113 is depicted in FIG. 1*e*, CU 113 or storage unit 109 could include multiple sensors 113*f*. Random number generator 128 with random number see 128*b* in CU 113 can provide equivalent functionality as random number generator 128 depicted and described in connection with FIG. 1*c* above.

Noise memory interface 109*p* can be connected to internal bus 109*q* within storage unit 109, providing CU 113 and processor 113*b* access to noise amplification memory 113*a*, such as read and write operations. Noise memory interface 109*p* can operate differently than memory core interface 109*m* or memory controller 109*k*, where noise memory interface 109*p* can support read and write operations to noise amplification memory 113*a*. Noise memory interface 109*p* can operate in a manner to assist, enhance, or amplify the generation of memory noise 194 (depicted in Figure if below) or bit errors in noise amplification memory 113*a*. In an exemplary embodiment, the memory cells within noise amplification memory 113*a* can be manufactured with memory cells that are functionally equivalent to memory cells in non-volatile memory 109*j*. For reference, memory cells in non-volatile memory 109*j* can also include general memory 109*i* in storage unit 109 for module 101, where bit errors are preferably minimized.

In exemplary embodiments, whereas memory core interface 109*m* can operate within specifications to read and write data to non-volatile memory 109*j* to minimize bit errors or memory noise 194, noise memory interface 109*p* can intentionally operate outside the specifications of memory core interface 109*m*. In an exemplary embodiment, a routine write operation of memory core interface 109*m* on non-volatile memory 109*j* can introduce on the order of $1 \times 10^{-4}$ bit errors or less before error correction operations to rectify errors, while a similar routine write operation of noise memory interface 109*p* on noise amplification memory 113*a* can introduce on the order of $1 \times 10^{-3}$ bit errors or more, including possibly a level of $1 \times 10^{-2}$ or higher bit errors per operation. In addition, the use of a noise amplification memory 113*a* preferably omits error correction code operations in order to aggregate bit errors over time. Other possibilities exist as well for the value of bit error introduced by a noise memory interface 109*p* and memory core interface 109*m* without departing from the scope of the present invention.

In exemplary embodiments, noise memory interface 109*p* can apply voltages to memory cells in noise amplification memory that are higher than or lower than the specified voltages for memory core interface 109*m*. In an exemplary embodiment, memory core interface 109*m* could be specified to access a page of memory cells in non-volatile memory 109*j* by applying 5 volts pulses in order to change selected memory cells from a value of "1" to a value of "0". Continuing with this exemplary embodiment, noise memory interface 109*p* can apply a voltage pulse of 4 volts instead of 5 volts when changing the equivalent memory cells from a value of "1" to a value of "0" in noise amplification memory 113*a*. Whereas memory core interface 109*m* operating at 5 volts pulses would effectively change the memory state of all or essentially all selected memory cells in non-volatile memory 109*j* (such that resulting bit errors are below a manufacturer specified threshold), noise memory interface 109*p* using the lower voltage pulses of 4 volts may change only a portion of the selected memory cells from a value of "1" to a value of "0", thereby introducing noise or random bit errors into noise amplification memory 113*a* (such that resulting bit errors are above the manufacturer specified threshold for a memory core interface 109*m*).

In this manner, in exemplary embodiments the voltage used by a noise memory interface 109*p* when operating on a noise amplifying memory 113*a* can be different or less than the voltage used by a memory core interface 109*m* when operating on nonvolatile memory 101*j*. In addition, noise memory interface 109*p* would not conduct or pass error correction code operations in order to rectify bit errors resulting from read and write operations in a noise amplifying memory 113*a*. The above voltages of 5 volts for 109*m* and 4 volts for 109*p* are exemplary, and other voltages or similar differences in voltage values may be suitable for different types of flash NAND, NOR, or similar non-volatile memory technologies, without departing from the scope of the present invention.

Further, noise memory interface 109p can operate outside specifications of memory core interface 109m using parameters other than voltages in pluses to set bits or collection of bits, or a combination of other parameters with voltages. In an exemplary embodiment, memory core interface 109m could be specified to access a page of memory cells in non-volatile memory 109j by applying voltage pulses with duration 1 microsecond+/−0.2 microseconds in order to change selected memory cells from a value of "1" to a value of "0". Continuing with this exemplary embodiment, noise memory interface 109p can apply a voltage pulses with duration of 0.7 microseconds+−0.3 microseconds when changing the equivalent memory cells from a value of "1" to a value of "0" in noise amplification memory 113a. Whereas memory core interface 109m operating at 1 microsecond pulses would effectively change the memory state of all or essentially all selected memory cells in non-volatile memory 109j, noise memory interface 109p using the shorter voltage pulses of 0.7 microseconds may change only a portion of the selected memory cells from a value of "1" to a value of "0", thereby introducing noise or random bit errors into noise amplification memory 113a.

In this manner, in exemplary embodiments the duration of voltage pulses used by a noise memory interface 109p when operating on a noise amplifying memory 113a can be different or less than the duration of voltage pulses used by a memory core interface 109m when operating on nonvolatile memory 101j. The above values of voltage pulses of 1 microsecond for 109m and 0.7 microseconds for 109p are exemplary, and other pulse durations or and related values may be suitable for different types of flash NAND, NOR, or similar non-volatile memory technologies, without departing from the scope of the present invention. In exemplary embodiments, the rise time, fall time, or hold time for applying voltages and voltage pulses in order to set or program memory cells in a noise amplifying memory 113a can be different or lower than nonvolatile memory 101j.

Further, as flash memory such as NAND and related mass storage technologies continue to evolve to support different configurations and higher densities, including multi-bit cells, a noise memory interface 109p could be specified to operate with parameters outside the specified or normal operating range of memory core interface 109m in a manner that (i) introduces noise or bit errors into noise amplification memory 113a, while (ii) continuing to minimize permanent damage to memory cells (such as an exemplary memory cell 240 illustrated in FIG. 2a below) or keep permanent damage to memory cells below a specified tolerance level. Noise memory interface 109p can support read operations to noise amplifying memory 113a by processor 113b similar to read operations supported by memory core interface 109m, such that CU 113 can read the randomly or pseudo-randomly generated bit errors or memory noise 194 in noise amplifying memory 113a. In general, noise memory interface 109p can introduce noise or bit errors into noise amplification memory 113a most frequently through write operations that are out of specification as described above, although read operations could also introduce some or a lower level of bit errors over time.

As contemplated herein, a noise memory interface 109p can also be identified separately from a regular memory core interface 109m in exemplary embodiments due to a significantly reduced or eliminated number of error correction code operations performed on noise amplification memory 113a, after read and write functions of a noise memory interface 109p. In other words, memory core interface 109m can use a significantly higher number of error correction code operations to rectify bit errors recorded in a non-volatile memory 109j, but a noise memory interface 109p can use a significantly lower or no error correction code operations on noise amplification memory 109p.

In an exemplary embodiment, the same physical memory can be used for noise amplification memory 113a and non-volatile memory 109j (with a separate section of memory blocks from the physical memory assigned to noise amplification memory 113a), and noise memory interface 109p can function equivalently to memory core interface 109m with the exception that memory core interface 109m uses error correction code operations while noise memory interface 109p occasionally, frequently, or entirely omits the error correction code operations. Other possibilities exist as well for a noise memory interface 109p to introduce and retain bit errors at a higher rate than memory core interface 109m without departing from the scope of the present invention.

EEPROM 113c in CU 113 can include a CU certificate 122b, CU boot firmware 181, CU boot configuration 183, certificate authority public key 131, certificate authority public key parameters 126b, a cryptographic unit private key 112, and a symmetric key 127. CU private key 112 and symmetric key 127 can be recorded in a protected memory 185 in EEPROM 113c, similar to CU only accessible memory 109g, such that (i) only CU 113 can read CU private key 112 using instructions in CU boot firmware 181 or CU firmware 113x, and (ii) CU private key 112 may not be read by module 101 or transferred out of storage unit 109 in exemplary embodiments. In exemplary embodiments, CU boot firmware 181 or CU firmware 113x can omit instructions that would allow CU private key 112 to be transferred to electrical pins 109a.

Data 186 within EEPROM 113c can comprise CU boot firmware 181, CU boot configuration 183, certificate authority public key 131, and certificate authority public key parameters 126b. Data 186 can be written to EEPROM 113c by a CU configuration unit 104. The data 186 in EEPROM 113c can be written into EEPROM 113c in storage unit 109 before storage unit 109 is distributed to a module provider 122, such as during a step 304 depicted and described in connection with FIG. 3a below. CU certificate 122b can be written to EEPROM 113c by a CU configuration unit 104 (i) after the generation of CU private key 173, and (ii) during a step 311 to load CU certificate 122b depicted and described in connection with FIG. 3a.

CU certificate 122b can include the CU identity 109e, CU public key 111, certificate parameters 126b, and a certificate authority digital signature 184. CU certificate 122b can be formatted according to the X.509 v3 specifications, among other possible formats, and stored as a plain text file, *.pem file, or *.crt file or similar file formats. CU certificate 122b can be used by CU 113 in order to (i) verify identity of CU 113 to module 101, or (iii) generate a digital signature for an internally generated or derived module public key 172. In exemplary embodiments, parameters 126b in CU certificate 122b can include an expiration time of CU certificate 122b longer than the expected operational lifetime of storage unit 109, and in this manner CU certificate 122b can remain valid whenever storage unit 109 is utilized. An exemplary expiration time of CU certificate 122b could be 20 years, although other possibilities exist as well.

CU boot firmware 181 in EEPROM 113c can provide machine executable code for processor 113b to initiate operations when electrical power is provided to CU 113 and storage unit 109 via the electrical pins 109a. Although not illustrated in FIG. 1e, processor 113b may also include a ROM memory with CPU 113*b* instructions for CPU 113*b* to fetch CU boot firmware 181 upon startup when power is provided to CPU 113*b*. CU boot firmware 181 can include a set of cryptographic algorithms 141, such as depicted and described in connection with FIG. 1*d* above, and memory control libraries 182. CU boot firmware 181 in EEPROM 113*c* could also include instructions for CU 113 to load CU firmware 113*x* recorded in nonvolatile memory 109*j*, if present, as depicted in FIG. 1*e*.

In exemplary embodiments, CU firmware 113*x* could be decrypted with a symmetric key 127 recorded in EEPROM 113*c*. Authorized providers of CU firmware 113*x*, such as CA 118 or module provider 122, could have access to symmetric key 127 for CU 113 with CU ID 109*e*, and consequently only the authorized providers could properly encrypt CU firmware 113*x* using the symmetric key 127. CU firmware 113*x* could be transmitted to a module 101 over network 107 in the encrypted format. In exemplary embodiments, a symmetric key 127 for CU 113 will be unique for each different storage unit 109, and each symmetric key 127 can be uniquely associated with a CU ID 109*e*. Symmetric key 127 within CU 113 can comprise a shared secret key. Symmetric key 127 in module 101 can comprise a different key for other purposes than decrypting CU firmware 113*x*. In exemplary embodiments, CU firmware 113*x* is not required for CU 113 to operate, and CU 113 could operate using CU boot firmware 181, and CU firmware 113*x* can be loaded into storage unit 109 for embodiments where the firmware for CU 113 is desired to be updated.

In this manner and in exemplary embodiments, the operating firmware for CU 113 could be updated after distribution of storage unit 109, where CU boot firmware 181 can be loaded into EEPROM 113*c* upon manufacturing of storage unit 109, such as during a step 304 described below. For example, CU firmware 113*x* depicted in FIG. 1*e* could include a new set of cryptographic algorithms 141, which could comprise an updated set of cryptographic algorithms 141 that were included in CU boot firmware 181. An exemplary new set of cryptographic algorithms 141 different than an initial set of cryptographic algorithms 141 for CU 113 can be designated as a set of cryptographic algorithms 141', as depicted with firmware 113*x* in FIG. 1*e*. In this manner, the cryptographic algorithms used by CU 113 could be updated, such as supporting the use of longer key length, the addition new or updated asymmetric ciphering algorithms 141*a*, new or updated symmetric ciphering algorithms 141*b*, new or updated secure hash algorithms 141*c*, etc.

CU boot firmware 181 could use a symmetric ciphering algorithm 141*b* and parameters 126 and the symmetric key 127 also recorded in EEPROM 113*c* to decrypt CU firmware 113*x*. A certificate authority 118 or module provider 122 could encrypt the CU firmware 113*x* with the symmetric key 127 in EEPROM 113 in order to ensure that only authorized and approved CU 113*x* firmware is loaded into CU 113. If CU 113 cannot properly decrypt CU firmware 113*x* loaded into nonvolatile memory 109*j* by module 101, then CU 113 could return an error or "unauthorized" code. Note that CU firmware 113*x* is not required for the operation of CU 113, and CU 113 can operate entirely based on CU boot firmware 181 in exemplary embodiments. The use of symmetric key 127 in EEPROM 113*c* and CU firmware 113*x* encrypted with symmetric key 127 can be required if firmware on CU 113 is to be updated after the installation of storage unit 109 in module 101.

Memory control libraries 182 could include software or firmware to manage and schedule the operation of CU 113, such as machine code for (i) instructing processor 113*b* to write data to bus 109*d* for memory controller 109*k* when data is recorded in memory 109*g*, (ii) read data from interface controller 109*c* when data from module 101 is passed to CU 113, and (iii) reading CU private key 112 from protected memory 109*g* or protected memory 185 when cryptographic algorithms 141 for CU 113 need the private key 112 for operations such as performing a digital signature 141*d*. For embodiments where interface controller 109*c* and CU 113 are combined, memory control libraries 182 can include the software libraries and firmware for processor 113*b* to manage all input and output of storage unit 109. Other possibilities exist as well for memory control libraries 182 to support the operation of CU 113 and storage unit 109 via program instructions provided to processor 113*b* without departing from the scope of the present invention.

Memory control libraries 182 can also include CU read instructions 191*a* and CU write instructions 191*b*. CU read instructions 191*a* can provide machine executable code for processor 113*b* to read data from module 101 using shared memory 109*h*. The data read from shared memory 109*h* could be used with cryptographic algorithms 141 by CU 113. In this manner, CU read instructions 191*a* could provide the logical software or firmware interface for CU 113 to receive data from module 101. CU read instructions 191*a* could specify memory addresses or file locations in a file system for non-volatile memory 109*j* where module 101 can write data in order to be read by CU 113. In an exemplary embodiment, (i) module 101 could write a file with a name "digital_signature_input.txt" (such as digital signature input 204 in FIG. 2*c* below) to a specified location in shared memory 109*h*, such as the depicted memory 191 for CU read and module write operations in FIG. 2*c* below, and then (ii) CU read instructions 191*a* could instruct processor 113*b* to read the data in 191 and subsequently use data 191 (which could comprise digital signature input 204) for input into a digital signature algorithm 141*d*. Other possibilities exist as well for a processor 113*b* to read data input from module 101 into storage unit 109 without departing from the scope of the present invention.

CU write instructions 192*a* can provide machine executable code for processor 113*b* to write data output from processor 113*b* to memory 109*h* in order for module 101 subsequent read for data input into module 101. In this manner, CU write instructions 192*a* could provide the logical software or firmware interface for CU 113 to send data to module 101, and other possibilities exist as well for the transfer of data from CU 113 to module 101 without departing from the scope of the present invention. CU write instructions 192*a* could specify memory addresses or file locations in a file system for non-volatile memory 109*j* where CU 113 using processor 113*b* can write data in order to be read by module 101. In an exemplary embodiment, (i) CU 113 could write a file with a name "digital_signature_output.txt" (such as digital signature output 210 in FIG. 2*c* below) to a specified location in memory 109*h*, such as the depicted memory 192 for CU 113 write and module read operations, and then (ii) module 101 could subsequently read the data in 192 in order to obtain the data in digital signature output 210.

In this exemplary embodiment described in the previous two paragraphs, CU 113, using CU read instructions 191*a* and CU write instructions 191*b*, can (i) read data from module 101 using shared memory 109*h* and (ii) write data to memory 109*h*, where module 101 can subsequently read data from memory 109*h*. In another embodiment, CU write instructions 192*a* could provide instructions for CU 113 to write data directly to RAM 101e or processor 101b, but in this case a closely coupled software and firmware interface between CU 113 and module 101 through electrical pins 109a would be required. For example an SPI bus mode, a one-bit SD bus mode, or a four-bit SD bus mode for the interface through electrical pins 109a would not normally be able to support CU 113 writing data directly to RAM 101e or processor 101b, so alternative bus technology connecting storage unit 109 and module 101 would be required for CU 113 to write data directly to RAM 101e or processor 101b.

EEPROM 113c in CU 113 for storage unit 109 can also include a CU boot configuration 183, a certificate authority public key 131, certificate authority public key parameters 126b, a cryptographic unit private key 112 and a symmetric key 127. CU boot configuration 183 can provide values for the configuration or operation of CU 113 when operating with the CU boot firmware 181, such as specifying (i) the frequency to poll shared memory 109h for data input from module 101, (ii) the frequency to operate a clock 160b, (iii) a firmware version number, (iv) the memory capacity of noise collecting memory 113a, (v) the memory addresses, cells, or file sectors to utilize for shared memory 109h or noise collecting memory 113a, (vi) the processor 113b version number, and (vii) parameters specifying values for hardware within CU 113. Certificate authority (CA) public key 131 can be utilized by CU 113 to verify digital signatures received where the digital signature was generated and signed with a CU private key 132. CA public key parameters 126b can specify the parameters for using the CA public key 131, where parameters 126b can be a subset of the parameters 126 supported by cryptographic algorithms 141. Exemplary parameters 126b for a CA public key 131 can be similar or equivalent to parameters 126b for a CU public key 172 depicted and described in connection with FIG. 7b below, such as specifying a key length, digital signature algorithm 141d and secure hash algorithm 141c to utilize, etc. Note that parameters 126b for CA public key 131 and parameters 126b for CU public key 172 can be different.

Although a single CA public key 131, CU private key 112, symmetric key 127, and CU certificate 122b is depicted in FIG. 1e, an EEPROM 113c or storage unit 109 could record a plurality of each of these and associated elements. For example CU 113 could record two different private keys 112 in EEPROM 113c, where a first private key 112 is used with asymmetric ciphering algorithms 141a and a second private key 112 is used with digital signature algorithms 141d. Each of the first and second private keys could have a corresponding public key 111, and consequently two different CU certificates 122b (each with a different public key 111) could be recorded in an EEPROM 113c. CA public key 131 could also be used with asymmetric ciphering algorithms 141a, such that CU 113 could encrypt data using the CA public key 131 and CA 118 could subsequently decrypt the encrypted data using the CA private key 132.

Cryptographic unit only accessible memory 109g within nonvolatile memory 109j could be accessed by CU 113 via an internal bus 109q and memory controller 109k. As contemplated herein, Cryptographic unit only accessible memory 109g can also be referred to as protected memory 109g. Internal bus 109q and memory controller 109k can be utilized to physically or logically separate protected memory 109g from memory 109f and memory 109i in FIG. 1c, in order to prevent module 101 or external parties with physical access to storage unit 109 from reading the data or writing data in protected memory 109g. In other words and as illustrated in FIG. 1e, internal bus 109q can limit (A) the ability to read and write data to protected memory 109g and noise amplification memory 113a only to (B) CU 113 in exemplary embodiments. In contrast, access by module 101 to memory 109f could be accomplished through the separate data bus 109d and interface controller 109c.

In exemplary embodiments, interface controller 109c can provide the functionality to module 101 for storage unit 109 to operate as a standard removable flash memory storage unit via data bus 109d. Internal bus 109q and memory controller 109k can provide memory resources to CU 113 in a manner that prevents module 101 from accessing protected memory 109g and noise amplification memory 113a, including the description of memory controller 109k above. Internal bus 109q is not required in some exemplary embodiments, and memory controller 109k could be connected to data bus 109d, but limit access to physical memory cells comprising memory 109g and 113a to processor 113b. Other possibilities for (i) limiting access to memory 109g and memory 113a, while (ii) supporting shared access to memory 109h are possible as well without departing from the scope of the present invention.

Crypto unit only accessible memory 109g in nonvolatile memory 109j can include data for the operation of CU 113. Crypto unit only accessible memory 109g can include data such as (i) a externally derived or loaded module private key 151, (ii) an internally derived module private key 173, (iii) CU firmware 113x including cryptographic algorithms 141', (iv) a symmetric key 127 for symmetric ciphering algorithms 141b used by module 101, and (v) a module provider public key 120. Crypto unit only accessible memory 109g could also record a table 188, which can record memory state and memory address information for use by CU 113, such as the use of table 188 depicted and described in connection with FIG. 3b below. Other data could be recorded in protected memory 109g as well, including an updated CU boot configuration 183, which could include parameters for the operation of CU 113 that are different than initially stored CU boot configuration 183 in EEPROM 113c.

In exemplary embodiments crypto unit only accessible memory 109g, or protected memory 109g, can be encrypted using a symmetric key 127 recorded in CU 113 as depicted in FIG. 1e. In this manner, module 101 or external parties cannot feasibly read data from this protected memory 109g without symmetric key 127, and consequently data within protected memory 109 can only be feasibly written and read by CU 113. Additional protection or isolation of protected memory 109g can be provided via memory controller 109k.

Many of the logical steps for operation of CU 113 and storage unit 109 can be performed in software and hardware by various combinations of processor 113b, firmware 113x or boot firmware 181, data bus 109d, interface driver 109b, and interface controller 109c. When CU 113 or storage unit 109 is described herein as performing various actions such reading a file, writing a file, verifying a digital signature, generating a private key, encrypting or decrypting data, specifying herein that CU 113 or storage unit 109 performs an action can refer to software, hardware, and/or firmware operating within module 101 illustrated in FIG. 1e performing the action.

FIG. 1f

Figure if is a graphical illustration of the operation of a noise collecting memory over time, in accordance with exemplary embodiments. Noise amplifying memory 113a can comprise a plurality flash NAND or NOR memory cells, such as the exemplary noise amplification memory cell 240 depicted and described in connection with FIG. 2a below using NAND technology. Noise amplification memory 113a can be organized into blocks 195 and pages 199, such that a memory core interface 109m or a noise memory interface 109p can read data from and write data to the noise amplification memory 113a. The exemplary page size of 4 bits in Figure if is for illustration purposes to highlight the potential organization of nonvolatile memory, and current commercial flash technology can have page sizes typically ranging from around 512 bytes to 16 KB or more, and block sizes may typically range from ~2 MB to ~16 MB or more. Other possibilities for page sizes and block sizes within a nonvolatile memory 101j or a noise amplification memory 113a are possible as well without departing from the scope of the present invention.

Figure 1F:
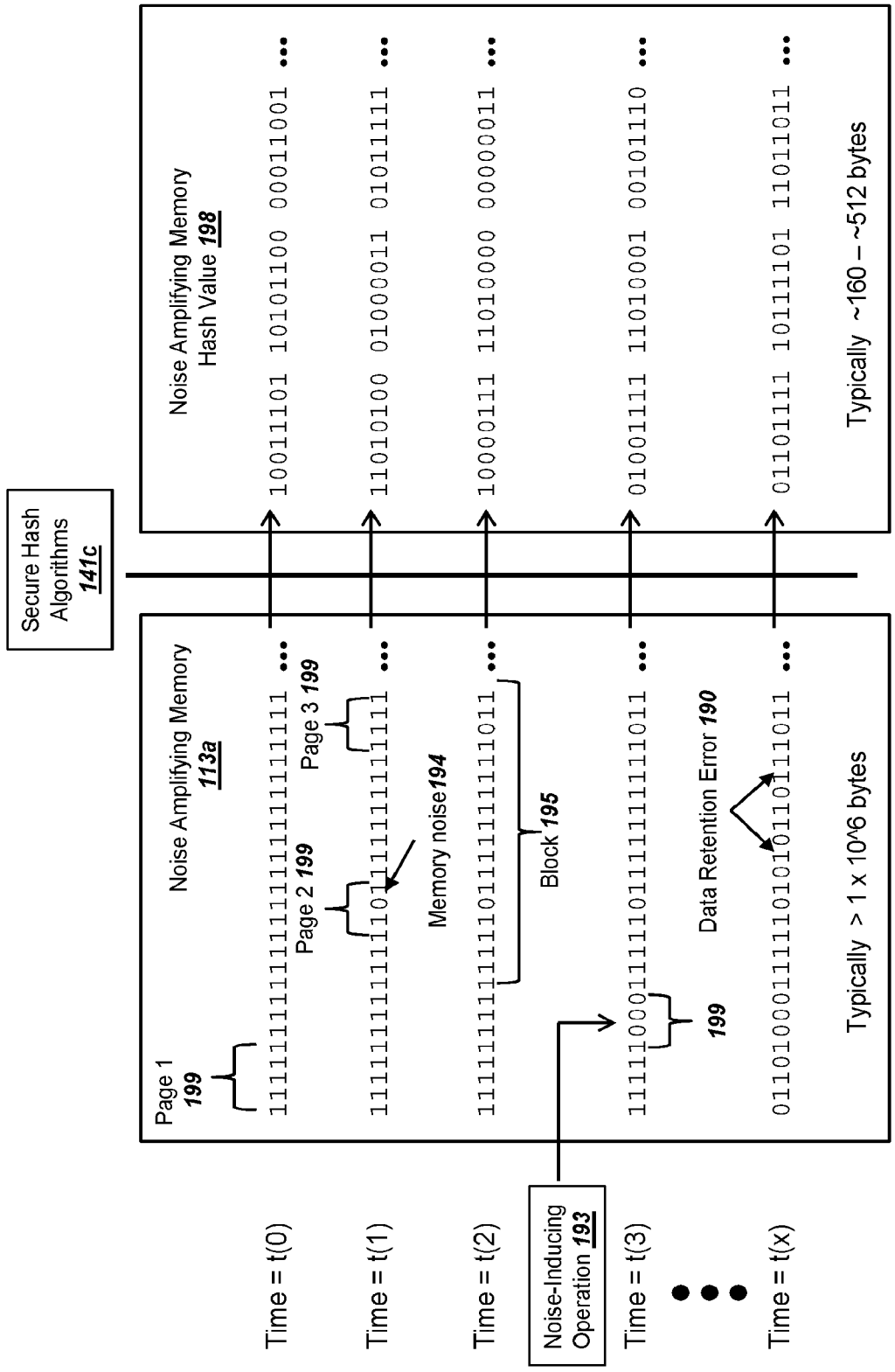
FIG. 1f is a graphical illustration of the operation of a noise collecting memory over time, in accordance with exemplary embodiments.

At an exemplary start point or time zero t(0) for noise amplification memory 113a, which could represent an initial state for noise amplification memory 113a, the individual bits could be set to an initial state comprising a level "1". Although not illustrated in FIG. 1f, some cells in the initial state could alternatively have a level "0". After time t(0) and before time t(1) in FIG. 1f, the cells shown for page 2 199 can be written and then reset or erased, where the erasure operation intends to return the cell to the state of "1". However, as illustrated in FIG. 1f, an individual cell within page 2 199 could retain an "error" comprising the cell remaining in the "0" state and not returning to the state of "1", and this exemplary "error" or "bit error" could comprise a single instance of memory noise 104.

Alternatively (and not shown in FIG. 1f), all of the cells shown for page 2 199 could be intended to be written or set at a state of "0", and in this alternative case the three cells in page 2 199 that retain a value of "1" could comprise "bit errors" or memory noise 194. Thus, although memory noise 194 is depicted as a cell remaining in the "0" state when the cell is intended to be in the "1" state, the converse can also be true, such that memory noise 194 could occur when a cell records the level "1" when a write operation on the cell intends to change the cell to a level "0". Between time t(1) and time t(2) in FIG. 1f, the cells in page 3 could also be written and then reset to the level "1". However, at time t(2) an additional exemplary bit error in noise amplification memory 113a could occur, as depicted in FIG. 1f, comprising a second instance of memory noise 194

The cause of the exemplary bit errors with a relatively high level of frequency (at least compared to an expected or specified tolerance level of error frequency in nonvolatile memory 109j) can be preferred in exemplary embodiments for a noise amplifying memory 113a. The memory noise 194 can be enhanced or amplified for a noise amplifying memory 113a by any or all of (i) the physical characteristics of noise amplification memory 113a discussed below for a cell 240, (ii) the operation of a noise memory controller 109p discussed above in connection with FIG. 1e, (iii) the result of omitting the application of error correction codes on noise amplifying memory 113a, and/or (iv) the combination of any or all of (i), (ii), and/or (iii). Note that the errors recorded in noise amplification memory 113a also remain relatively non-volatile, such that individual cells have a sufficiently high probability of remaining in the set state over a period of time, including the time required to read a page 199 or series of memory cells 240. In an exemplary embodiment, a series of cells with memory noise 194 or without memory noise 194 could have a 90% probability of retaining their state for a period of two years or longer. In this manner, a noise amplification memory 113 can retain and accumulate additional noise over time and the information entropy recorded can continue to increase. However, with tens of millions of cells or more typically included in a noise amplification memory 113a and the stated exemplary specification for data retention in a noise amplifying memory 113a, after a period of several months thousands of cells or more can be in an error or noise state due to the nature of cells gradually draining voltage over time.

Between time t(2) and t(3), CU 113 can also perform a noise-inducing operation 193, which can further increase the probability of bit errors or memory noise 194 being recorded in noise amplification memory 113a. The noise-inducing operation 193 could comprise multiple writes and erasures to the same cells, groups of cells, or nearby targeted cells where memory noise 194 or bit errors are desired to be generated. In exemplary embodiments, noise-inducing operation 193 could be conducted without the traditional "wear leveling" common for an interface controller 109c to utilize with commercial flash technology, and "wear leveling" attempts to minimize the number of bit errors with traditional nonvolatile memory 109j. In other words, "wear leveling" can be omitted in the operation of noise amplifying memory 113a. Note that noise-inducing operations 193 could be combined with the function of a memory controller 109p described above in connection with FIG. 1e in order to enhance the level of memory noise 194 induced into noise amplifying memory 113a. Other possibilities exist as well for a noise-inducing operation 193 on noise amplifying memory 113a, such as programming pages within a block in a random manner, instead of a sequential manner (where a sequential manner is used to minimize errors) recommended by memory manufacturers.

After several iterations and time increasing to time (x), a noise amplifying memory 113a can record a significant level of individual instances of memory noise 194 and a high level of information entropy. As discussed above, another desirable source of bit errors that can accumulate over time for noise amplification memory 113 are data retention errors 190, such that an intended bit stored in a quantitatively significant number of cells is naturally and gradually flipped due to the tendency of a voltage in a cell to drain slowly over time. Data retention errors 190 can also be enhanced by the manufacturing process and specification for a cell 240 in a noise amplification memory 113a discussed below in FIG. 2a. The physical differences from manufacturing a cell 240 in a noise amplifying memory 113a compared to a standard memory cell 230 can result in a higher level of desired data retention errors 190. Data retention errors 190 have the desirable property for noise amplifying memory 113a such at the information entropy or the random distribution of bit errors or memory noise 194 within memory 113a can increase naturally and gradually over time, even for the instance where storage unit 109 is not powered. In exemplary embodiments, neither CU 113 nor storage unit 109 performs error correcting code operations upon noise amplification memory 113a upon restoration of power after a period where power is removed to storage unit 109, such that data retention errors can be retained in noise amplification memory 113a As illustrated in FIG. 1f, a sample or all of memory 113a can be input into a secure hash algorithm 141c in order to calculate a noise amplifying memory hash value 198. Hash value 198 can be useful to further increase the apparent information entropy from memory 113a. In an exemplary embodiment, a single instance of memory noise 194 at time t(1) completely changes the output of hash value 198 in a seemingly random way (at least when viewing only or comparing only the outputs of the secure hash algorithm 141). Consequently, in preferred embodiments, data read from a noise amplifying memory 113a can be input into a hash algorithm 141c, where the resulting hash value 198 can be used in the generation of a private key 173, a shared secret key 127, a derived shared secret key 129b, or a random number, such as a random number or value for the parameter R transmitted with digital signatures according to the ECDSA 158 algorithm. Although only a small sample of data is depicted in FIG. 1f, a sample of the data from memory 113a input into secure has algorithms 141c for the generation of private keys or similar random values in exemplary embodiments can comprise selecting a sample of hundreds of thousands of bits or more from memory 113a in order to calculate the hash value 198, and other possibilities exist as well for the size of a sample without departing from the scope of the present invention.

Note that if CU 113 uses a sample of memory 113a for input into a secure hash algorithm 141d, a data table 188 (depicted in FIG. 1e in protected memory 109g) may be useful in exemplary embodiments, such that CU 113 can track which sample of memory 113a has been utilized in a sequence, and a sample of memory 113a not reused for a period of time or next in a sequence in order for the count and distribution of errors to change from one sample of data in memory 113a to the next sample of data in memory 113a. In an exemplary embodiment, noise amplification memory 113a could comprise a gigabit or more of cells similar to cells 240 depicted and described in FIG. 2a below. A sample of memory 113a could comprise an exemplary 16 megabits of data. Embedded processor 113b could operate at 100 MHz and hash approximately 2 MB/s, and consequently calculating the first hash value 198 could require less than a second. Table 188 could increment a pointer to memory 113a, such that the next time a second hash value 198 is required for cryptographic operations that require a random number, the next or a different 16 megabits of physical memory in memory 113a could be accessed to calculate the second hash value 198.

In this manner, CU 113 could support the generation of ~1000/16 hash values 198, or approximately 62, before table 188 rolls over to including data again from the initial 16 megabits of memory used for the first hash value. Table 188 could also include an estimate of time or cycles since the last time a block of 16 megabits was used, in order to confirm noise amplification memory 113a has recorded sufficient additional memory noise 104 to be cryptographically secure. Other possibilities exist as well for the size of a noise amplification memory 113b and the size of a sample for input into a hash algorithm 141d, including larger or smaller values for each, without departing from the scope of the present invention. Assuming even a low level of bit errors or memory noise 194 in noise amplification memory, such as an exemplary 1 part per thousand of bit errors, the number of permutations resulting from the example above, assuming a random distribution of could be $2^{16,000,000}!/2^{15840000}!$, which can provide a sufficiently large number of permutations for the reasonably secure use of a cryptographic system.

Even for cases where the memory noise 194 is not randomly distributed, such as reducing the number of possible permutations by several orders of magnitude, or more, the number of permutations can be reasonably large. Since the number of possible permutations is so high, even a smaller sized sample or total pool of memory cells 240 in a noise amplification memory 113a can suitable for the generation of random numbers, such as an exemplary megabit or less for noise amplification memory 113a and samples of ten thousand bits or less, the numbers of permutations can remain sufficient for reasonably secure cryptographic operations such as generating a random number. In exemplary embodiments, noise amplification memory 113a and noise memory controller 109p can be included within a processor 113b, and other possibilities exist as well for combining a noise amplification memory 113a and/or noise memory controller 109p with other components in a cryptographic unit 113 or storage unit 109 without departing from the scope of the present invention.

As discussed below with connection to FIG. 2a, a memory core interface 109m could be used with a noise amplification memory 113a in embodiments where the individual cells such a plurality of cells 240 below in noise amplification memory 113a are manufactured with different specifications and tolerances than nonvolatile memory 109j, which could comprise memory cells 230 below in FIG. 2a, since the physical nature of the cells 240 would normally introduce desired additional bit errors. In this manner and in exemplary embodiments, noise memory controller 109p can be optionally omitted. Alternatively, if a plurality of cells 240 comprising a noise amplification memory 113a is manufactured consistently or within the specification of cells 230 in non-volatile memory 109j, then a noise memory controller 109p can be helpful to increase the bit error rate and resulting "noise" residing in noise amplification memory 113a. In exemplary embodiments (i) a noise memory controller 109p and (ii) a plurality of cells 240 in memory 113a (manufactured with different specifications and tolerances to enhance memory noise 194) can be combined in order to increase the level of noise, bit errors, or information entropy retained in noise amplification memory 113a.

Although only a small sample of exemplary bits, values, or data stored is illustrated in noise amplification memory 113a in FIG. 1f, noise amplification memory 113f can comprise thousands or more of bits recorded in memory cells 240. A single bit could correspond to a single cell, although manufacturing and memory technology used to create noise amplification memory 113a could also record multiple bits per cell without departing from the scope of the present invention.

FIG. 2a

FIG. 2a is a graphical illustration of a nonvolatile memory cell and a noise collection memory cell, in accordance with exemplary embodiments. Nonvolatile memory 109j and noise collection memory 113a can comprise a plurality of memory cells in order to record data. Nonvolatile memory 109j can comprise a plurality of standard memory cells 230, organized into blocks 195 and pages 199, where memory core interface 109m can select groups of cells for blocks 195 and pages 199 using addresses specified by interface controller 109c or processor 113b, where a single memory cell 230 is depicted in FIG. 2a. Noise amplifying memory 113a can comprise a plurality of modified cells 240, organized into blocks 195 and pages 199, where noise memory controller 109p can select groups of cells for blocks 195 and pages 199 using addresses specified by processor 113b, where a single memory cell 240 is depicted in FIG. 2a. As depicted in FIG. 2a, memory cells 230 or 240 can comprise layers in sequence from bottom to top of a P substrate layer, tunnel oxide layer, polysilicon floating gate layer, oxide-nitride-oxide (ONO) dielectric layer, polysilicon control gate layer, and a charge transfer lead layer.

Noise amplification memory 113a could comprise a plurality of memory cells 240 such as, but not limited to NAND flash technology with NAND-based gates and transistors, manufactured with the same technology as non-volatile memory 109j, thus reducing the number of manufacturing steps and manufacturing costs associated with producing storage unit 109. In this case, noise and bit errors in noise amplification memory 113a can be introduced and retained via noise memory interface 109p, or possibly a memory core interface 109m for the case where a noise memory interface 109p is optionally omitted. Noise memory interface 109p can be omitted in embodiments where memory core interface 109m allows a sufficient level of bit errors or memory noise 194 to be recorded in noise amplification memory 113a. Or, noise memory interface 109p could be combined with a memory core interface 109m. Other flash memory technologies could be used for noise amplification memory 113a and non-volatile memory 109j as well, such as NOR technology. In exemplary embodiments, a first type of flash memory technology could be used for non-volatile memory 109j and a second type of flash memory technology could be used for noise amplifying memory 113a.

In exemplary embodiments, noise amplification memory 113a could comprise memory cells 240 manufactured to different specifications than non-volatile memory 109j, such as less or more thickness of (i) a semiconductor base such as a P substrate 241 layer below the tunnel oxide layer 244, when compared to the P substrate 231 layer in a nonvolatile memory cell 230, (ii) a tunnel oxide 244 layer above the P substrate 241 layer, when compared to the tunnel oxide 234 layer in a nonvolatile memory cell 230, (iii) a polysilicon floating gate 245 layer above a tunnel oxide 244 layer, when compared to the polysilicon floating gate 235 layer in a nonvolatile memory cell 230, (iv) a oxide-nitride-oxide (ONO) dielectric 246 layer when compared to the ONO dielectric 236 layer in a nonvolatile memory cell 230, (v) a polysilicon control gate 247 layer, when compared to the polysilicon control gate 237 layer in a nonvolatile memory cell 230, and/or (vi) a charge transfer lead 248 layer, when compared to the charge transfer lead 238 layer in a nonvolatile memory cell 230. In addition, combinations of two or more of any of the differences in thickness for the layers identified above could be utilized for a plurality of memory cells 240 in a noise amplification memory 113a Likewise either the N+ source 242 layer or N+ drain 243 layer could have a specified thickness or tolerance different than the N+ source 232 or N+ drain 233 layer for nonvolatile memory cells 230. Noise amplification memory 113a could also support a higher specified variability for the above-mentioned thickness levels in a plurality of memory cells 240 when compared to memory cells 230 for a nonvolatile memory 109j. In addition, noise amplification memory 113 could specify an offset distance for N+ source 242 or N+ drain 233, thereby reducing or increasing the contact area between (i) the source and/or drain and (ii) the tunnel oxide 244 layer, for memory cells 240 compared to memory cells 230. In addition, a collection of cells 240 could be organized in a physical layout within noise amplification memory 113a that is different than the physical layout of cells 230 for a nonvolatile memory 109j, such as being spaced or organized in a manner that enhances the introduction of bit errors or memory noise 194 in a noise amplifying memory 113a, including spacing cells 240 closer together when compared to the spacing between cells 230.

Further, noise amplification memory 113a could support either (i) a higher tolerance of impurities or (ii) the intentional introduction of impurities in any or all of the layers comprising N+ source, N+ drain, P substrate, tunnel oxide, polysilicon floating gate, ONO dielectric, and polysilicon control gate layers. In an exemplary embodiments, a specified level of impurities could be added to any or all of the N+ source, N+ drain, P substrate, tunnel oxide, polysilicon floating gate, ONO dielectric, and polysilicon control gate materials during manufacturing of noise amplification memory 113a. In these manners, noise amplification memory 113a can preferably record and retain a higher number of bit errors than non-volatile memory 101j. Other possibilities exist as well for noise amplification memory 113a to be manufactured in a manner to enhance or promote the random or pseudo-random generation of bit errors or memory noise 194 without departing from the scope of the present invention.

Although noise memory interface 109p is depicted in FIG. 1e, in an exemplary embodiment, noise memory interface 109p could optionally be omitted and a noise amplification memory 113a could operate with memory core interface 109m. In other words, a specified range of memory pages, memory cells, blocks or memory addresses comprising a plurality of memory cells 240 could be designated by CU 113 or interface controller 109c as memory with a higher probability of incurring bit errors due to the presence of a noise amplification memory 113a for the specified range of memory pages, memory cells, blocks, or memory addresses. In this case where noise memory interface 109p is omitted, noise amplification memory 113a could be manufactured to a different level of specifications such as any of the exemplary specifications in the previous three paragraphs. Error correcting code operations could also be intentionally omitted for the specified range of memory pages, memory cells, blocks, or memory addresses comprising the noise amplification memory 113a with a plurality of memory cells 240. In exemplary embodiments, noise memory interface 109p and noise amplification memory 113a could be combined in a storage unit 109 in order to provide an enhanced level of random or pseudo-random bit errors within noise amplification memory 113a.

Although the use of memory cells 230 and 240 in FIG. 2a supports the use of NAND flash memory for nonvolatile memory 109j and noise amplification memory 113a, other nonvolatile memory technology could be utilized as well without departing from the scope of the present invention. In other words, with different memory technology, the types of materials and layers for a memory cell could change from those depicted in FIG. 2a, but memory cells 240 for noise amplification memory 113a could have different manufacturing specifications or tolerances from memory cells 230 for a nonvolatile memory 109j in order to enhance the random nature and increase the probability of bit errors or memory noise 194 occurring in noise amplification memory 113a.

FIG. 2b

Figure 2B:
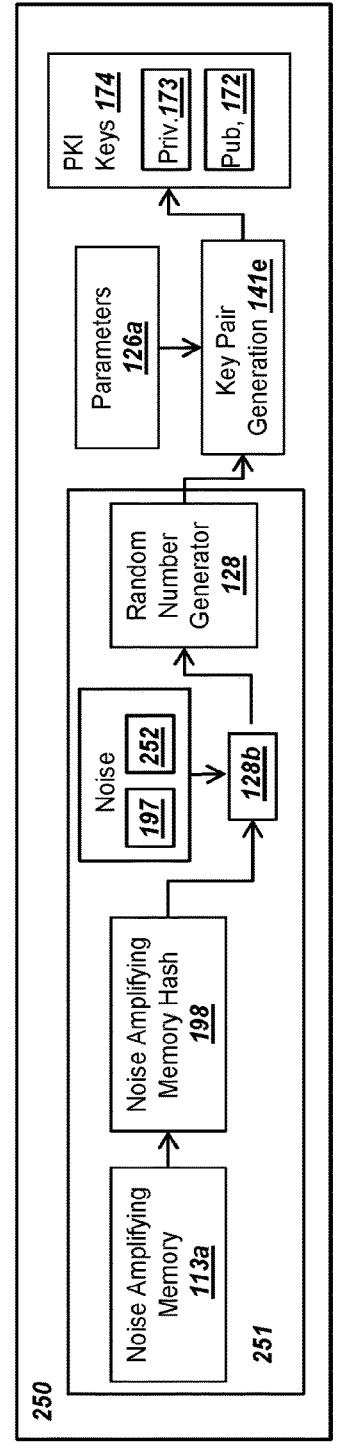
FIG. 2b is a flow chart illustrating exemplary steps for using data output from a noise amplifying memory in order to generate a private key and a public key, in accordance with exemplary embodiments.

FIG. 2b is a flow chart illustrating exemplary steps for using data output from a noise amplifying memory in order to generate a private key and a public key, in accordance with exemplary embodiments. The processes and operations, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A noise amplifying memory 113$a$ can include a plurality of cells 240 with memory noise 194. Before CU 113 selects a sample of memory 113$a$ on which to process a hash 198, CU 113 can conduct a series of noise-inducing operations 193, as depicted and described in connection with Figure if above. CU 113 can use a memory controller 109$p$ in order to enhance the level of memory noise 194 generated by noise-inducing operations 193. After a series of noise-inducing operations 193, CU 113 can select a sample of noise amplifying memory 113$a$ using a table 188, such that the sample of memory 113$a$ is incremented, or different than a previous selection of a sample of memory 113$a$. The resulting data from the sample of memory 113$a$ can be input into a secure hash algorithm 141$c$ in order to record a noise amplifying memory hash 198. Note that the use of a secure hash algorithm 141$c$ and noise amplifying memory hash 198 can be optionally omitted or substituted with other processing logic such that a pseudo-random number can be input into a random number seed 128$b$. In exemplary embodiments and as depicted in FIG. 2$b$, additional pseudo-random data can be input into random number seed 128$b$, such as a noise value 197 from a sensor 113$f$ in CU 113 or also a random number 252 received from module 101 via bus 109$d$.

Although not illustrated in FIG. 2$b$, the multiple values of hash 198, noise value 197, and random number 252 from module 101 could also be input into a secure hash algorithm 141$c$, where the output from the secure hash algorithm 141$c$ could comprise random number seed 128$b$. In this manner, noise or a high level of information entropy from multiple sources including memory 113$a$, sensor 113$f$, and module 101 could be combined together in order increase the randomness of a number used to generate module private key 173. Input into random number seed 128$b$ could also include a plurality of noise values 197 available to CU 113, such as various machine and hardware states that could be measured or determined by CU 113. The machine and hardware states could include combinations of clock cycle counts or increments, values from RAM 113$e$ memory, values from memory 109$f$, and/or internal register or accumulator values for processor 113$b$, and each of these values could comprise an additional noise value 197 combined into random number seed 128$b$. In addition, noise values 197 and random number 252 from module 101 could optionally be omitted, and in this case the single source of information entropy or randomness could be the noise amplifying memory 113$a$.

After recording random number seed 128$b$ with the various described inputs, CU 113 could utilize a random number generator 128 with the random number seed 128$b$ in order to calculate and record a random number. The random number could be input into a key pair generation algorithm 141$e$ along with a set of cryptographic parameters 126$a$, where parameters 126$a$ could be a selected subset of parameters 126 from FIG. 1$d$ in order to generate a set of PKI keys 174 with the desired length, format, and algorithm supported (such as RSA vs. ECC and also a specified ECC curve in parameters 126$a$ if ECC is utilized). The output of key pair generation algorithm 141$e$ could be recorded by CU 113 as a derived module private key 173 and corresponding derived module public key 172. Although not illustrated in FIG. 2$b$, the derived module private key 173 can subsequently (i) be recorded in protected memory 109$g$ depicted and described in connection with FIGS. 1$e$ and 1$c$ above, and (ii) not be transferred outside storage unit 109. In this manner, CU 113 can obtain a PKI key pair 174 with a sufficient level of security in order to support the desired operation of module 101 and authentication of module 101 with various networks and servers, such as a wireless network 102 and a server 105. The generation or derivation of a CU private key 112 and CU public key 111 can also utilize the steps illustrated in FIG. 2b, with the primary difference being a potentially different set of cryptographic parameters 126b for the CU private key 112 and CU public key 111 could be utilized, as discussed in connection with the description of a step 306 in FIG. 3a below.

FIG. 2c

Figure 2C:
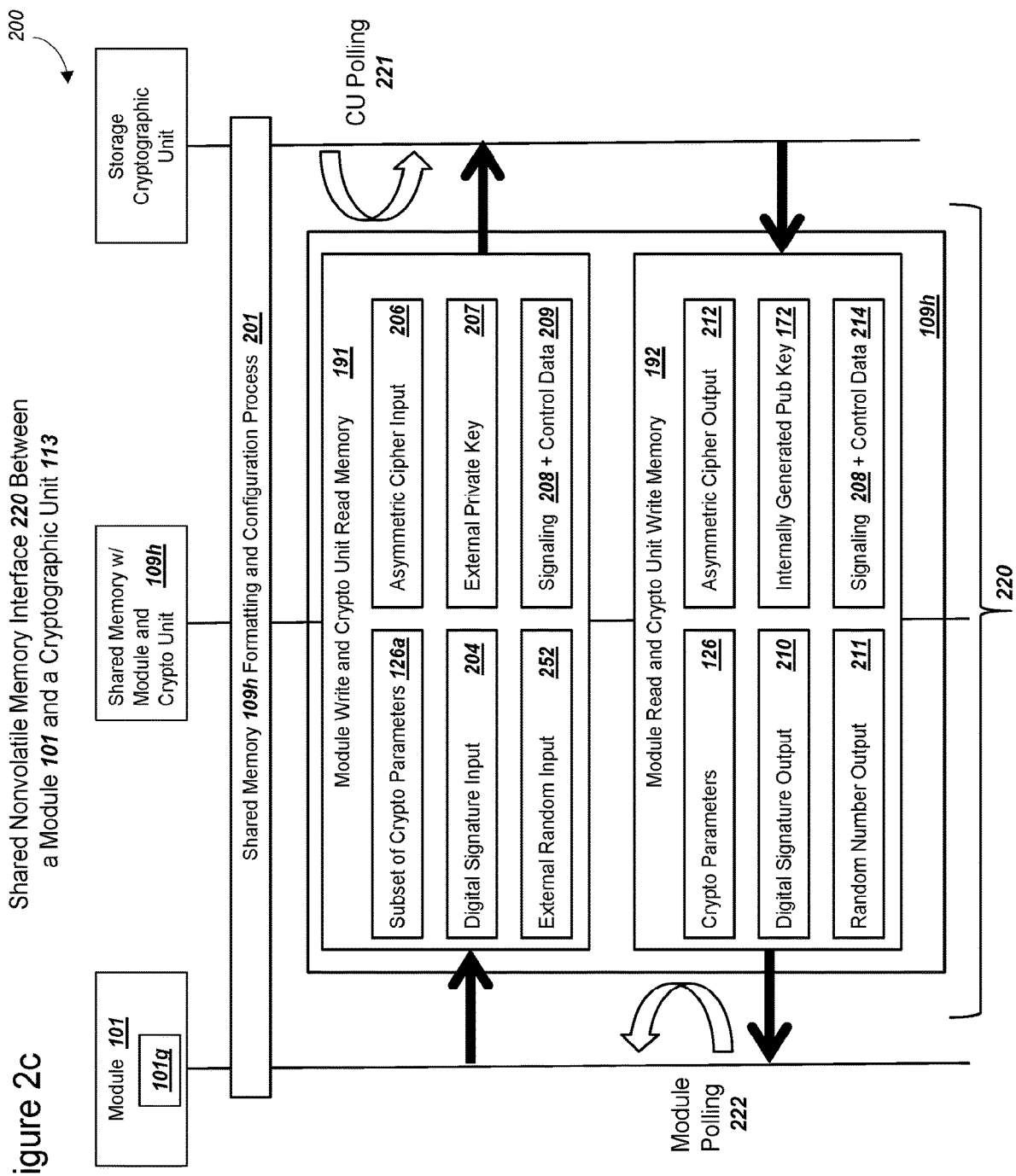
FIG. 2c is a graphical illustration of an exemplary system, where a module and a cryptographic unit communicate through a shared nonvolatile memory interface, in accordance with exemplary embodiments.

FIG. 2c is a graphical illustration of an exemplary system, where a module and a cryptographic unit communicate through a shared nonvolatile memory interface, in accordance with exemplary embodiments. Module 101 and CU 113 can preferably communicate through mutually supported protocols, in order to transfer data between the two elements. An exemplary embodiment for a system supporting communication through a shared nonvolatile memory interface 220 is illustrated in FIG. 2c. Module 101 and CU 113 can both mutually access a shared memory 109h, which could comprise a selected portion of non-volatile memory 109j, where shared memory 109h is also depicted and described in connection with FIG. 1c and FIG. 1e. A shared nonvolatile memory interface 220 can comprise a shared memory 109h, CU polling 221 and module polling 222, where shared memory 109h can include a module write and crypto unit read memory 191 and module read and crypto unit write memory 192.

The use of shared memory 109h can be desirable when CU 113 resides on a storage unit 109 operating with established standards for removable media, such as using generic removable media drivers for device driver 101g. The generic or pre-existing device driver 101g installed on a wide variety of modules 101 may not include specific interfaces for communication with CU 113, but communication between module 101 and CU 113 can be desirable in exemplary embodiments. For example, electrical pins 109a and device driver 101g could support a one-bit SD bus for removable media such as a micro SD card and resulting file or memory operations within the micro SD card, but device driver 101g included in module 101 may not have specific support to send data directly to CU 113. Other possibilities exist as well, where a wide variety of manufactured modules 101 can (A) support standards-based removable storage media such as SD cards, but (B) lack pre-installed drivers 101g with protocols for communicating directly with CU 113. Storage unit 109 and CU 113 could subsequently utilize system 200 in order to communicate with module 101, where support for a module 101 to read and write to non-volatile memory 109j could be widely supported by existing modules 101.

By using shared memory 109h, a generic or existing removable storage media device driver 101g can allow module 101 to (i) write data to memory 191 or files in storage unit 109, and (ii) read data from memory 192 or files in storage unit 109. Using system 200, CU 113 and module 101 can subsequently utilize this standard capability to communicate. In other words, for module 101 to send data to CU 113, device driver 101g can write the data to memory 191 in shared memory 109h, where CU 113 can subsequently read data in the memory 191 in shared memory 109h using CU read libraries 191a within memory control libraries 182. CU 113 can using periodic CU polling 221 of memory 191 in shared memory 109h to determine that module 101 has written data for CU 113 to subsequently read. Further, in order for module 101 to read data from CU 113, CU 113 could write the data to memory 192 in shared memory 109h using CU write libraries 192a within memory control libraries 182, and module 101 could subsequently read the data from memory 192 in shared memory 109h using device driver 101g. Module 101 can using periodic module polling 222 of memory 192 in shared memory 109h to determine that CU 113 has written data for module 101 to subsequently read. As contemplated herein, CU polling 221 or module polling 222 could comprise a logical loop operating with processor 113b or processor 101b, respectively, where the loop determines that a file or value recorded in memory has been updated or changed by the other node (where module 101 and CU 113 can comprise the two nodes). The loop timing for CU polling 221 or module polling 222 could operate at specified frequencies, such as an exemplary every 10 or 20 milliseconds, although other possibilities exist as well without departing from the scope of the present invention.

Before recording shared data in shared memory 109h, module 101 or module provider 122 could perform a shared memory formatting and configuration process 201. The process 201 could comprise the standard steps for formatting removable media such as an SD card, where a file system is applied to the available memory. Process 201 could include formatting memory 109h to standards supported by module 101 such as exemplary file systems of FAT16, FAT 32, NTFS, ext3, ext4, UDF. Other file systems for memory 109f and memory 109h are possible as well without departing from the scope of the present invention. Process 201 could also format all of non-volatile memory 109j (which can include share memory 109h). At the conclusion of a process 201 while storage unit 109 is powered, CU 113 memory control libraries 182 could include a detection of the file system selected by module 101 or module provider 122 for memory 109j or memory 109h, such that CU 113 can subsequently support reading and writing to the selected file system using a compatible versions of memory control libraries 182.

In other words, module 101 or module provider 122 can normally be responsible for selecting the format of a file system during configuration 201, where the first portion of configuration 201 can comprise writing a regular file system format for standard removable media, where the regular file system format can support existing SD cards that don't include a CU 113. A second portion of configuration 201 can comprise CU 113 subsequently detecting and utilizing the selected file system. In this manner CU 113 within a storage unit 109 can support the use of existing device drivers 101g in modules 101. Communication between module 101 and CU 113 using a system 200 can utilize an module program 101i depicted and described in connection with FIG. 1b for a module 101 (i) to write data to memory 191 in shared memory 109h, (ii) read data from memory 192 in shared memory 109h, and (iii) conduct a periodic module polling 222.

After a configuration 201 step, either module 101 or CU 113 can load shared memory 109h with an initial set of values supporting the operation of CU 113. In exemplary embodiments, the initial set of values could be included in a CU boot configuration 183. Module 101 could write data into module write and crypto unit read memory 191 in the format of either (i) multiple different files, or (ii) a single file with multiple values recorded in the file. The file or files in memory 191 could include the depicted values of a subset of crypto parameters 126a, digital signature input 204, external random input 252, asymmetric cipher input 206, external private key 207, signaling data 208, and control data 209. CU 113 could write data into crypto unit write and module read memory 192 in the format of either (i) multiple different files, or (ii) a single file with multiple values recorded in the file. The file or files in memory 192 could include the depicted values of crypto parameters 126, digital signature output 210, random number output 211, asymmetric cipher output 212, internally generated pub key 172, signaling 208, and control data 214. Other possibilities exist as well for the values or data recorded in shared memory 109h without departing from the scope of the present invention, and the exemplary data above is illustrative as opposed to limiting.

As an example of the data flow supported by a shared nonvolatile memory interface 220 in a system 200, after configuration 201, CU 113 could write the set of cryptographic parameters 126 as shown in FIG. 2c, where parameters 126 could specify all the parameters supported by a set of cryptographic algorithms 141 in CU 113. Module 101 could read parameters 126 and (i) select a subset of cryptographic parameters 126a for CU 113 to utilize in generation of a derived module private key 173 as depicted in FIG. 2b, and (ii) write the selected subset of parameters 126a to a file in memory 191. CU 113 could utilize periodic polling 221 for changes in memory 191 in order to detect that module 101 has written the subset of parameters 126a in memory 191 and subsequently read the data. Other possibilities exist as well for both (i) the values in shared memory 109h and (ii) the steps of transferring the data between module 101 and CU 113 without departing from the scope of the present invention.

FIG. 3a

Figure 3A:
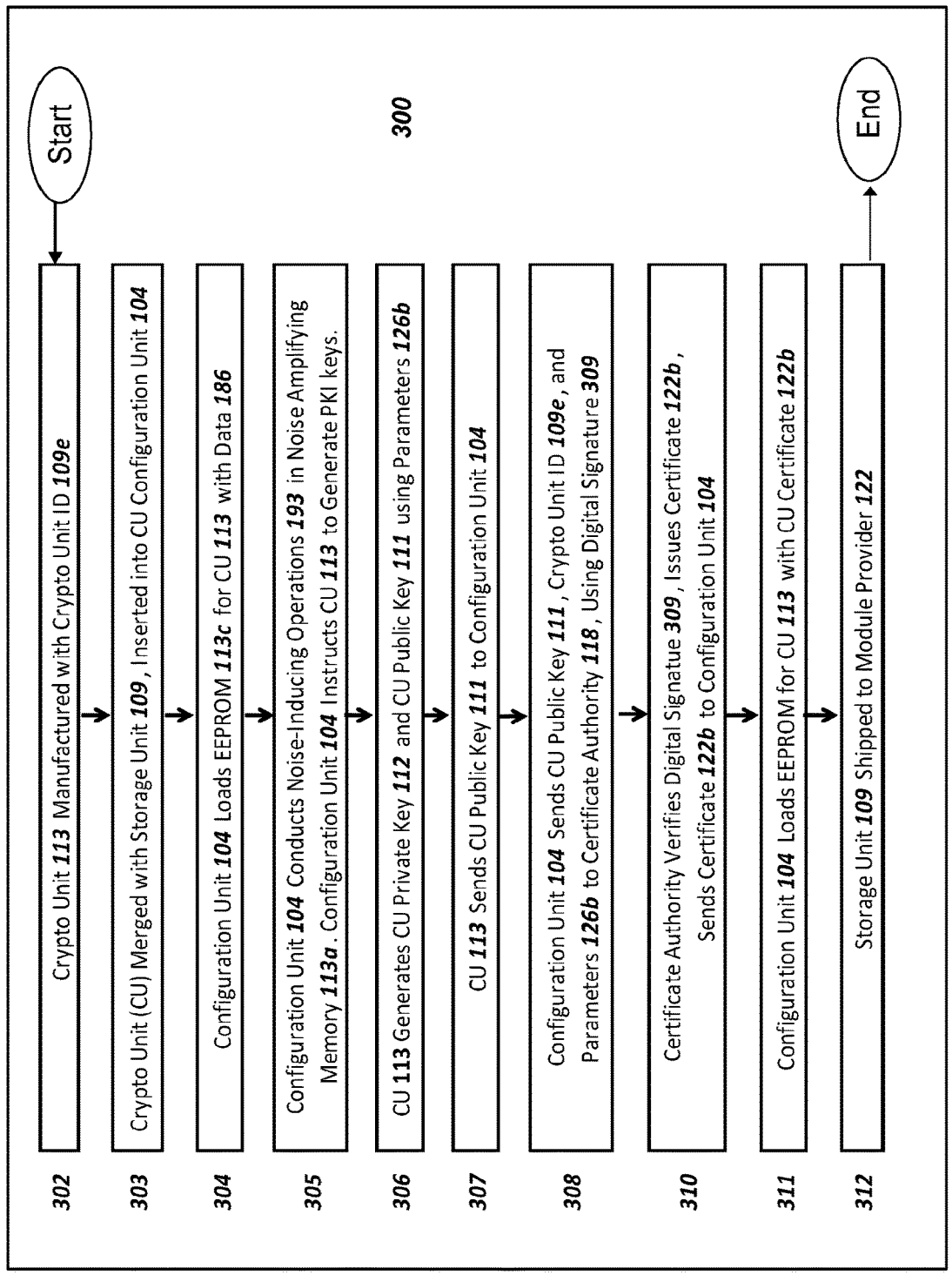
FIG. 3a is a flow chart illustrating exemplary steps for configuring a cryptographic unit and generating a certificate for the cryptographic unit, in accordance with exemplary embodiments.

FIG. 3a is a flow chart illustrating exemplary steps for configuring a cryptographic unit and generating a certificate for the cryptographic unit, in accordance with exemplary embodiments. Before a storage unit 109 with an embedded cryptographic unit 113 is distributed to a module provider 122, the manufacturer, certificate authority 118, or provider of storage unit 109 can perform a series of steps 300 in order to both (i) internally generate a CU public key 111 and CU private key 112 with a sufficient level of security for the desired operation of module 101, and (ii) generate a certificate 122b for the CU 113. Note that PKI key pair for CU 113 is different than a module private key 173 and module public key 172, which can subsequently be derived at later steps depicted in FIG. 3b below. In other words and as described below, CU private key 112 and CU public key 111 can be used by a certificate authority 118 in order to verify that a subsequently derived module public key 173 (with a corresponding but secret module private key 172) belong to CU 113 with CU 109e operating in a module 101 with a module identity 110. In this manner, using the steps in FIG. 3a and FIG. 3b, a certificate authority 118 can subsequently issue a certificate 122a for module 101 with module identity 110 using module public key 172 with a high level of certainty and authority, such that the certificate 122a used by module 101 in communication with a server 105 or a wireless network 102 can be trusted. In other words, a CU private key 112 can be used to digitally sign a subsequently derived module public 172, where the CU public key 111 can be used to verify the signature. Additional details regarding exemplary embodiments using this feature for CU 113 will be described below in this FIG. 3a and next FIG. 3b.

At step 302, cryptographic unit 113 can be manufactured, and a cryptographic unit identity 109e can be recorded in CU 113. In exemplary embodiments, CU 113 can be manufactured in step 301 with the components depicted and described in connection with FIG. 1c, FIG. 1e, and FIG. 2a. CU identity 109e can be recorded in a protected memory 109g or also recorded in a physical location within CU 113 that can be directly read by a bus 109d or internal bus 109q. In this manner, CU identity 109e can be permanently recorded in CU 113 and in exemplary embodiments CU identity 109e cannot be readily or feasibly altered or tampered with. At step 303, CU 113 can be merged with storage unit 109, such as assembling the components depicted in FIG. 1e into a housing or enclosure for both CU 113 or storage unit 109.

A CU configuration unit 104 used in a step 303 in FIG. 3a can comprise a server 105 or a computer designed to configure CU 113 such as loading firmware, generating keys, etc. CU configuration unit 104 can utilize a plurality of interfaces supporting electrical pins 109a, such that a plurality of CU 113 units can be connected to CU configuration unit 104 at one time, in order to speed the subsequent configuration steps for CU 113. Additional exemplary descriptions of CU configuration unit 104 are also above in FIG. 1a. Note that CU 113 discussed below can internally derive its private key 112 in a step 306. Since CU 113 below can internally derive its private key 112 in a step 306, the security requirements for the location and operation of CU configuration unit 104 can be reduced. For example CU configuration unit 104 could be located in a manufacturing facility or at the end of a manufacturing line producing either CU 113 or storage unit 109. In comparison, alternative systems where private keys or shared secret keys are (i) externally generated and (ii) subsequently loaded into removable storage media require that a unit similar to CU configuration unit 104 be kept in a secure area and generally offline, such that copies of the private keys or shared secret keys in the removable storage media be kept secure, such as with traditional SIM or UICC cards. In exemplary embodiments of the present invention, the CU private key 112 or module private key 173 can preferable reside only in CU 113, thus reducing the procedural and process overhead of the steps required when CU private key 112 has been externally generated and then loaded into CU 113.

At step 304, CU configuration unit 104 can load EEPROM 113c for CU 113 with data 186, where data 186 was depicted and described in connection with FIG. 1e above. Although not depicted in FIG. 3a, CU configuration unit 104 could initially read CU identity 109e and subsequently lookup the correct or desired data 186, such as one group of CU identities 109e can utilize a first CU boot firmware 181, while a second group of CU identities 109e can utilize a second CU boot firmware 181. After loading EEPROM 113c with data 186, CU configuration unit 104 can perform a series of reboots and quality assurance checks and tests to assure that CU 113 in storage unit 109 boots properly and operates to within specifications.

At step 305, CU configuration unit 104 can conduct a series of noise-inducing operations 193 on a noise collecting memory 113a in CU 113, such that information entropy in memory 113a or randomness is increased from the initial manufactured state from step 302. In an exemplary embodiment, CU configuration unit 104 can utilize its own random number generator 128 in order to structure and organize the series of noise-inducing operations 193 differently from one CU 113 to the next. In other words, CU configuration unit 104 should perform the first sentence in a step 305 differently from one CU 113 to the next, in order to enhance randomness across different individual units of CU 113. After the series of operations 193, CU configuration unit 104 can instruct CU 113 to generate CU private key 112 and CU public key 111, where the derivation or generation of the keys can be conducted in a step 306 below.

A step 305 could also include CU configuration unit 104 performing a quality assurance (QA) verification or check on a noise collecting memory 113a and noise memory controller 109p. During this exemplary QA step within step 305, that a manufacturer or the operator of CU configuration unit 104 can verify that a desirable number of bit errors or memory noise 194 are introduced into noise amplifying memory 113a. For example, if the instances of memory noise 194 are below a threshold, such as less than an exemplary 1 part per hundred, then noise amplifying memory 113a along with CU 113 may be considered defective and not suitable for use as a storage unit 109. Other values for a threshold could be applicable as well, depending on (i) the number of noise-inducing operations 193 performed during the QA check within a step 305, and (ii) the specifications of the noise amplifying memory for recording bit errors or memory noise 194.

In exemplary embodiments, although not depicted in FIG. 3a, CU configuration unit 104 and CU 113 can also optionally support a "cryptographic audit" mode 104a at the conclusion of a step 305 where random bit errors have been introduced into noise amplifying memory 113a. A cryptographic audit mode 104a is depicted in FIG. 1a. Noise inducing operations 193 can cease in cryptographic audit mode 104a and noise memory controller 109p can also preferably operate as a regular memory core interface 109m in order to minimize the introduction of new bit errors during cryptographic audit mode 104a. A potential benefit of the embodiments for generating a random number using the noise amplifying memory 113a is the complete state (in terms of a sequence of bits in noise amplifying memory 113a) at a point in time can be read, recorded, and subsequently analyzed.

In other words for exemplary embodiments, during a cryptographic audit mode 104a only, the state of all memory cells 240 for the relevant sample in a noise amplifying memory 113a used to generate a random number can be output by a CU 113 to shared memory 109h. During cryptographic audit mode 104a, CU 113 can (A) write a copy of every bit read from noise amplifying memory 113a into shared memory 109h as (B) CU 113 reads the individual bits in noise amplifying memory 113a for input into random number generator 128. In exemplary embodiments, mode 104a can thus obtain and read an accurate and non-volatile record of the state of noise amplifying memory 113a and subsequent random number generated, even for the case that noise amplifying memory 113a may incur subsequent bit errors when operating in cryptographic audit mode 104a.

Analysis of the series of a series of bits comprising the state of all memory cells can support both (i) outside verification of both "randomness" of the system, and (ii) demonstration of sufficiently low levels of potential bias. In this manner and by providing an open and complete record of the relevant state at the time of random number generation, users or third parties can gain confidence in the system and thereby support market adoption. Random number generation from transient systems, such as using thermal noise to generate a random number, often encounters problems where users do not have ready access to the complete state of thermal noise, even for auditing or verification purposes. Such alternative transient systems often remains a completely closed "black box", where "random" numbers are extracted, but internal states at the time the "random" numbers are extracted can remain unknown and thus subject to doubt or concern by users. Without a complete and accurate record of the state of thermal noise during evaluation of random number generation, users or third parties can thus be concerned by biases or "back doors" into the system. In contrast, by using a cryptographic audit mode 104a, a complete record of the internal state of memory cells 240 in noise amplifying memory 113a for a random number can be read by authorized users of CU configuration unit 104.

The audit command and analysis can preferably only be supported when CU 113 is inserted into CU configuration unit 104 and only for the generation of new keys after a series of noise inducing operations. CU 113 can be programmed to erase a private key generated in cryptographic audit mode 104a before exiting the cryptographic audit mode 104a, such that keys generated during cryptographic audit mode 104a cannot be used for subsequent commercial operations of a storage unit 109. Cryptographic audit mode 104a can include a series of noise inducing operations 193 for noise amplifying memory 113a after the internal state from the above two paragraphs has been read, such that internal state resulting for a cryptographic audit mode 104a would not be subsequently feasibly determined by subsequent holders of storage unit 109.

At step 306, CU 113 can generate CU private key 112 and CU public key 111. CU 113 can use the steps and procedures depicted and described in connection with FIG. 2b above, with difference that CU PKI keys are generated in a step 306 as opposed to the module PKI keys generated in a step 250. Additional differences between a step 306 and step 250 can be (i) external noise 252 can be provided by CU configuration unit 104 instead of a module 101, and (ii) parameters 126b instead of parameters 126a can be input into the key pair generation algorithm 141e. In other words, parameters 126b can be applicable for CU PKI keys, as illustrated in FIG. 7b below, and parameters 126a can be applicable for module PKI keys, as illustrated in FIG. 7a below. At the conclusion of step 306, CU 113 can internally record the internally generated CU private key 112 and CU public key 111. CU 113 can record CU private key 112 either (i) in protected memory 185 within EEPROM 113c as depicted in FIG. 1e, or (ii) within protected memory 109g, and other possibilities exist as well for CU 113 to securely record CU private key 112 within storage unit 109. In an exemplary embodiment, a processor 113b could include protected memory, and CU private key 112 could be recorded within the protected memory of processor 113b. Other possibilities exist as well for the physical memory or storage location for recording CU private key 112 within storage unit 109 without departing from the scope of the present invention.

At step 307, CU 113 operating in CU configuration unit 104 can send the CU public key 111 to CU configuration unit 104. Communication between CU 113 and CU configuration unit 104 can continue to be through electrical pins 109a. Other information can be sent by CU 113 at a step 307 as well, such as (i) CU identity 109e, and/or (ii) an identity or sequence number for the CU public key, such as a sequence number 702 depicted in FIG. 7b below.

At step 308, CU configuration unit 104 can combine the received CU public key 111 from step 307 with the CU identity 109e and the parameters 126b to generate a digital signature 309 using a private key associated with CU configuration unit 104 and a digital signature algorithm 141d. The exemplary operation of a digital signature algorithm 141d is depicted and described below in connection with FIG. 4a. CU configuration unit could record a private key similar to server private key 105c depicted in FIG. 1a. Continuing at step 308, CU configuration unit 104 can transmit or send to certificate authority 118 via a network 107 depicted in FIG. 1a the values of CU identity 109e, CU public key 111, parameters 126b, and digital signature 309 (along with an identity for CU configuration unit 104).

At a step 310, the certificate authority 118 can receive the data transmitted in step 308, and verify the digital signature 309 using the operation of a digital signature algorithm 141d depicted and described in connection with FIG. 4b below. Certificate authority 118 could record a public key for the CU configuration unit 104. In this manner, certificate authority 118 can be reasonably assured that CU public key 111 has been generated by CU 113 with CU identity 109e and transmitted by CU configuration unit 104. In other words, since CA 118 can trust CA configuration unit 104 and the operator of a CA configuration unit 104, CA 118 can (i) verify that CU public key 111 has been transmitted by CA configuration unit 104 and also (ii) subsequently trust that CU public key 111 is associated with CU identity 109e. After recording the data in a step 310 and verifying the digital signature 309, certificate authority 118 can issue a certificate 122b, such as the exemplary certificate 122b depicted and described in connection with FIG. 7b. In order to generate certificate 7b, certificate authority 118 can also perform a digital signature algorithm 141d operation with input of values for CU identity 109e, CU public key 111, parameters 126b, and a certificate authority private key 132. The use of a digital signature algorithm 141d for a signing operation can be similar to the signing operation illustrated in FIG. 4a below, where the output can be a digital signature 184 for certificate 122b, which is also depicted below in connection with FIG. 7b below. At the conclusion of step 310, CA 118 can send the generated certificate 122b back to CU configuration unit 104 via the network 107.

At step 311, CU configuration unit 104 can receive the data transmitted by certificate authority 118 in step 310 above, and CU configuration unit 104 can load EEPROM 113c in CU 113 with certificate 122b. A step 311 could also include a verification of the signature 184 in certificate 122b by CU configuration unit 104 in order to confirm the certificate 122b from CA 118 is correct. By loading certificate 122b in EEPROM 113e, CU 113 can subsequently have ready access to certificate 122b for future operations, such as authoritatively sending CU public key 111 to third parties, such as a module provider 122. The use of certificate 122b in EEPROM 113e can be useful for authoritatively identifying CU 113. At the conclusion of a step 311, storage unit 109 with CU 113 can be removed from CU configuration unit 104. At step 312 storage unit 109 with CU 113 can be shipped to a module provider 122, or possibly directly to end users, and other possibilities exist as well without departing from the scope of the present invention.

FIG. 3b

Figure 3B:
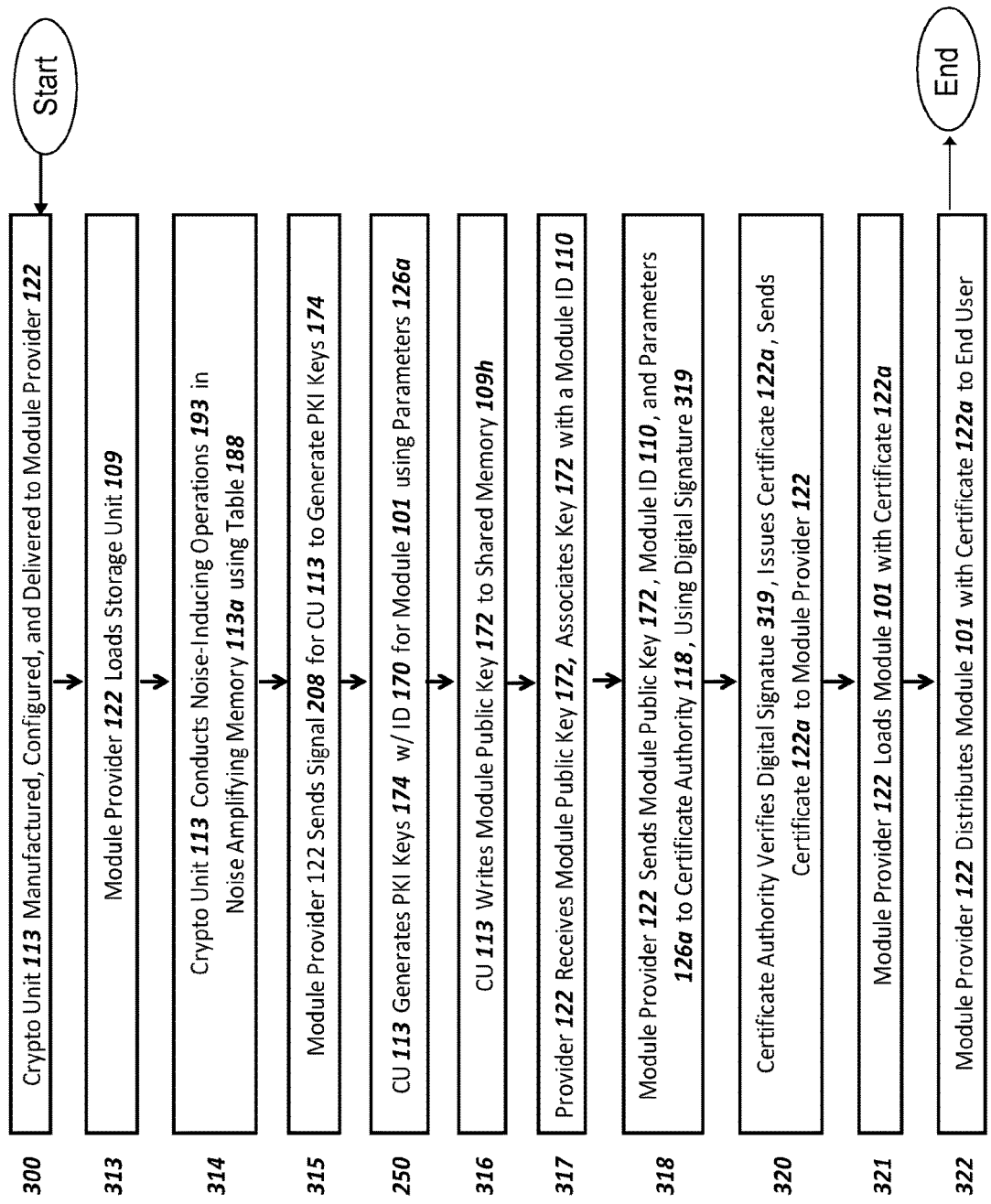
FIG. 3b is a flow chart illustrating exemplary steps for deriving a private key for a module using a cryptographic unit, and receiving a certificate for the corresponding public key, in accordance with exemplary embodiments.

FIG. 3b is a flow chart illustrating exemplary steps for deriving a private key for a module using a cryptographic unit, and receiving a certificate for the corresponding public key, in accordance with exemplary embodiments. Step 300 in FIG. 3b can comprise the steps depicted and described in FIG. 3a. Not all the sub-steps shown for a step 300 in FIG. 3a are required, and some may be omitted or substituted with equivalent or similar sub-steps in order to conclude a step 300 such that a cryptographic unit 113 can record a CU private key 112 and CU public key 111. For example, in an exemplary embodiment different than that depicted in FIG. 3a, CU private key 112 could be derived externally from CU 113 or storage unit 109 and consequently loaded into CU 113 using a CU configuration unit 104. At the conclusion of steps 300 in FIG. 3a, cryptographic unit 113 can record a CU private key 112 and a certificate 122b for the cryptographic unit 113 (as illustrated in FIG. 7b). Certificate 122b can support communication between module 101 and module provider 122 and certificate authority 118, and CU 113 and certificate authority 118 can use the exemplary steps in FIG. 3b such that CU 113 can (i) derive a module private key 173, (ii) send the corresponding public key 172 to a certificate authority 118 in an authenticated manner (using CA private key 112 and CA public key 111), and (iii) receive a certificate 122a for the module public key 172.

In exemplary embodiments, a module provider 122 or end user of module 101 can prefer for module 101 to utilize a different PKI key pair, which could comprise a module public key 172 and a module private key 173. Reasons for using different PKI key pair for the module could be many, including, (i) different parameters 126a than 126b could be associated with module 101, (ii) module provider or end users may prefer to rotate the use of a module private key 173 over time to increase security, (iii) module 101 may need a plurality of PKI keys 174 at any point in time (such as a first key for digital signatures, a second key for asymmetric ciphering, etc.), and other reasons for module 101 or storage unit 109 to derive a PKI key pair 174 could exist as well.

At step 313, module provider 122 can load storage unit 109 with cryptographic unit 113 inside into either (i) module 101 or (ii) a server similar to CU configuration unit 104 depicted and described in connection with FIG. 3a above. If module provider 122 loads storage unit 109 into a server similar to CU configuration unit 104, then module provider 122 or an end user could subsequently load storage unit 109 into a module 101 at a subsequent step such as step 322 below.

At step 314, after receiving electrical power due to the previous step 313, CU 113 can conduct initialization steps such as running boot firmware 181 and then conducting a series of noise-inducing operations 193 on noise amplification memory 113a. The noise inducing operations 193 can utilize a table 188 recorded in memory 109g in order to focus the generation of memory noise 194. In other words, table 188 could record the next physical addresses in noise amplification memory 113a where CU 113 would access to collect data comprising noise, and noise inducing operations 193 upon boot of CU 113 can start in a range specified by table 188. Table 188 could also record parameters regarding noise inducing operations 193 such as a minimum target bit error rate desired (such as an exemplary rates of 2 parts per hundred, 2 parts per thousand, etc.), and CU 113 could continue noise inducing operations 193 until the specified minimum level of bit errors in a table 188 were achieved. Note that an initial table 188 could also be included in EEPROM 113c, while an operating or updated table 188 could be recorded in protected memory 109g. In exemplary embodiments, a step 314 can be included in CU boot firmware 181, such that a boot or startup process for CU 113 can include a series of noise inducing operations 193. In exemplary embodiments, a step 314 could also be performed by CU 113 either (i) during periods of idle time, or (ii) at specified periodic intervals such as every X hours, such that CU 113 continues to periodically induce errors in noise amplification memory 113a over time.

In addition, steps 314 through 321 in FIG. 3b could comprise module provider 122 accessing module 101 remotely, such as via a wireless network 102. Thus, many of the steps depicted in FIG. 3b could be conducted remotely and "over the air" instead of module provider 122 requiring physical access to module 101. In other words, module provider 122 could physically access storage unit 109 for an initial configuration comprising steps 313 through 322 in FIG. 3b, but module provider 122 could also repeat exemplary steps 314 through 321 in FIG. 3b at a later time remotely and without the physical presence of storage unit 109 with module provider 122 at the later time. For the cases where module provider 122 utilizes the steps in FIG. 3b where module 101 with storage unit 109 operate remotely, additional steps could be performed in order to establish a secure link between module 101 and module provider 122, such as setting up a data session comprising TLS, IPSec, etc. over the network 107 between module 101 and module provider 122 depicted in FIG. 1a.

At step 315, module provider 122 can send a signal 208 for CU 113 to generate PKI keys 174. A set of parameters 126a could be (i) included with the signal 208, such that CU 113 would know the proper or desired subset of cryptographic parameters 126 to utilize for processing or creating the PKI keys 174, or (ii) communicated in a separate signaling 208 message either before or after a step 315. The signal 208 could be sent to CU 113 via the system 200 depicted and described in connection with FIG. 2c. If module 101 operates with storage unit 109 remotely from module provider 122, then module provider 122 could send the signal 208 first to module 101 via a secure connection over network 107 and wireless network 102 depicted in FIG. 1a, and then module 101 could send the command to CU 113 using an exemplary system 200 in FIG. 2c. If module provider 122 has installed storage unit 109 in a CU configuration unit 104 in a step 313, the signal 208 could still utilize a system 200, but in this case the CU configuration unit 104 would write the signal 208 to shared memory 109h in a system 200 instead of the module 101. In other words, the present invention contemplates many possible multiple hardware and network configurations and combinations, and the exemplary steps depicted in FIG. 3b could be conducted over the different hardware and network combinations, including the use of a CU configuration unit 104.

In a step 250, CU 113 can generate PKI keys 174 for module 101 using parameters 126a. Exemplary individual steps and components within a step 250 are depicted and described in FIG. 2b. Although a noise amplification memory 113a is illustrated in FIG. 2b, a noise amplification memory 113a can also be optionally omitted and noise or random numbers from other sources could be utilized for deriving PKI keys 174, such as from (i) random number 252 generated externally to CU 113, or (ii) data from a sensor 113f or sensor 101f. Other possibilities exist as well for the source of random numbers input into a key pair generation algorithm 141e in a step 250 without departing from the scope of the present invention. At the conclusion of a step 250, CU 113 could record module private key 173 in a protected, nonvolatile memory such as memory 109g, so that CU 113 could have access to module private key 173 at later times. CU 113 in a step 250 could also include a module public key identity 170, such that module public key 172 in a step 250 could be properly identified from a previous or subsequent module public key 172 for module 101 with module identity 110. CU 113 could receive module public key identity 170 in a signal 208 in a step 315 above, and other possibilities exist as well. The use of a module public key identity 170 for a module public key 172 is depicted and described in connection with FIG. 7b below. Module At step 316, after processing or deriving module PKI keys 174, CU 113 can write module public key 172 to shared memory 109h, such that a component external to storage unit 109 could subsequently read the module public key 172 derived in a step 250. CU 113 could also write the module public key identity 170 with module public key 172 in a step 316. As contemplated herein, module public key identity 170 could be combined with module public key 172, such that referring to module public key 172 includes both a number for the public key and an identity of the public key. If storage unit 109 is loaded into a module 101 at a step 316, then module 101 could subsequently read the key 172 using system 200 and subsequently send the key 172 to module provider 122. If storage unit 109 is loaded into a CU configuration unit 104 at a step 316, then CU configuration unit 104 could subsequently read the key 172 after a step 316.

As step 317, module provider 122 can receive the module public key 172 derived in step 315 and recorded in step 316. If module 101 with storage unit 109 operates remotely from module provider 122 in a step 317, then module 101 could send the module public key 172 using network 107, and in this case additional steps for authentication for module 101 with module provider 122 could take place before a step 317. If storage unit 109 is in a physically secured environment with module provider 122 at a step 317, such as storage unit 109 being inserted into a CU configuration unit 104 at a step 317, then a module provider 122 may not need a module 101 to operate or conduct the step 317. After receiving the module public key 172, module provider 122 can associate the public key 172 with a module identity 110. The module identity 110 in a step 317 can be for the module 101 where storage unit 109 with private key 173 will operate.

In other words, module public key 172 could belong to a module 101 that utilizes module identity 110, where external elements or nodes communicating the module 101 through network 107 depicted in FIG. 1a could identify module 101 using the module identity 110 and also subsequently use module public key 172 to authenticate or secure communication with module 101. In exemplary embodiments, module 101 and module provider 122 can use module identity 110 instead of a cryptographic unit ID 109e for identifying module 101, since module provider 122 can control and specify the module identity 110, whereas the module provider 122 may not normally be able to specify the CU ID 109e since that identity can be recorded when CU 113 in storage unit 109 is manufactured. Note that the module public key 172 could also optionally be associated with module public key identity 170 at a step 317. In other words, in exemplary embodiments, module public key 172 can be associated with both a module public key identity 170 and a module identity 110 at a step 317.

At step 318, module provider 122 can combine the received module public key 172 from step 317 with the module identity 110 and the parameters 126a to generate a digital signature 319 using a module provider private key 121 and a digital signature algorithm 141d. The exemplary operation of a digital signature algorithm 141d is depicted and described below in connection with FIG. 4a. Note that module provider 122 could have multiple module provider private keys 121, and a selected key 121 could be utilized for the digital signature process in a step 318. Continuing at step 318, module provider 122 can transmit or send to certificate authority 118 via a network 107 depicted in FIG. 1a the values of module identity 110, module public key 172, parameters 126a, and digital signature 319.

At a step 320, the certificate authority 118 can receive the data transmitted in step 318, and verify the digital signature 319 using the operation of a digital signature algorithm 141d depicted and described in connection with FIG. 4b below. In this manner, certificate authority 118 can be reasonably assured that module public key 172 has been transmitted by module provider 122. In other words, certificate authority 118 may have a trusted relationship with module provider 122, such that certificate authority 118 can trust that module public key 172 has been properly received and recorded by module provider 122. Note that certificate authority 118 could take additional steps to those depicted in FIG. 3b if certificate authority does not have a trusted relationship with module provider 122, but in that case as well the steps in FIG. 3b can be useful. After recording the data in a step 320 and verifying the digital signature 319, certificate authority 118 can issue a certificate 122a, such as the exemplary certificate 122a depicted and described in connection with FIG. 7a.

In order to generate certificate 7a, certificate authority 118 can also perform a digital signature algorithm 141d operation with input of values for module identity 110, module public key 172, parameters 126a, and a certificate authority private key 132, where the output of the signing operation similar to the signing operation illustrated in FIG. 4a below can be a digital signature 125 for certificate 122a, which is also depicted below in connection with FIG. 7a. At the conclusion of step 320, CA 118 can send the generated certificate 122a back to module provider 122 via the network 107.

At step 321, module provider 122 can receive the data transmitted by certificate authority 118 in step 320 above, and module provider 122 can load storage unit 109 with certificate 122a. Certificate 122a could be recorded in memory 109f in storage unit 109. A step 321 could also include a verification of the signature 125 in certificate 122a by module provider 122 in order to confirm the certificate 122a from CA 118 is correct. By loading certificate 122a in nonvolatile memory 109f, module 101 can subsequently have ready access to certificate 122a for future operations, such as authoritatively sending module public key 172 to third parties, such as a server 105 or other nodes operating on network 107. In other words, the use of certificate 122a obtained in this manner outlined in FIG. 3b can be useful for authoritatively identifying module 101 using module identity 110 by third parties, where the third parties trust CA 118.

If module 101 with storage unit 109 operates remotely from module provider 122 during steps 300 through 320 in FIG. 3b, then the sequence of steps for distributing the certificate 122a can conclude at a step 321. If storage unit 109 operates within a CU configuration unit 104 during steps 300 through 320 in FIG. 3b, then the additional step 322 can be performed. In other words, module provider 122 could use CU configuration unit 104 for an initial configuration of storage unit 109 and module 101, and module provider 122 could communicate with module 101 over a network 107 after module 101 has been distributed and deployed. For the case where module provider initially configures storage unit 109 and module 101 (such as the case where storage unit 109 has not been inserted into module 101), then module provider 122 could subsequently perform a step 322 in FIG. 3b, where module provider 122 distributes module 101 loaded with certificate 122a to end users.

Other possibilities for a CU 113 to derive PKI keys 174 for a module 101 using the steps and procedures outlined in FIG. 3b without departing from the scope of the present invention. In one embodiment, a module 101 could send a derived module public key 172 with module identity 110 and/or CU ID 109e directly to CA 118, along with a digital signature using CA private key 122 for the data. The digital signature for the data could be generated using the process depicted and described in connection with FIG. 4a and the CU private key 112. CA 118 could verify the digital signature and subsequently issue a new certificate 122a to module 101. The communication between module 101 and CA 118 could be via network 107 depicted in FIG. 1a. In this case, module provider 122 could send a signal 208 to module 101 using CU 113 to create the new PKI key pair 174. Other potentially trusted entities such as wireless network 102 or M2M service provider network 108 communicating with module 101 could originate a signal 208 for module 101 with CU 113 to derive a new PKI key pair 174.

In exemplary embodiments where CU 113 derives new PKI keys 174 while module 101 is operating remotely from module provider 122, module 101 could perform step 317 and step 318 in FIG. 3b instead of module provider 122 performing the actions. In this case, digital signature 319 in step 318 could comprise a digital signature generated using the CU private key 112. CA 118 would record a table matching module identities 110 with CU IDs 109e for CU 113 associated with the module identities 110. CA 118 could verify the digital signature 319 using the CU public key 111, using an exemplary verifying step similar to that depicted in FIG. 4b below. After successful verification, CA 118 could send module 101 via the network 107 a certificate 122a for the module identity with the module public key 172.

FIG. 4a

FIG. 4a is a flow chart illustrating exemplary steps for creating a digital signature using a private key, parameters, and data input, in accordance with exemplary embodiments. As discussed above, digital signatures can be useful for verifying the identity of a node communicating over a network, such as network 107 in FIG. 1a. Step 318 in FIG. 3b includes creating a digital signature 319, and FIG. 4a illustrates an exemplary embodiment of the portion of step 318 for creating digital signature 319, which can comprise signing process 318a. In a signing process 318a, a digital signature 319 can be output from a digital signature algorithm 141d, which could comprise an RSA based DSA 167 or an ECC based ECDSA 158, and other possibilities exist as well. When using a DSA 167 or ECDSA 158 algorithm in non-deterministic mode for a signing process 318a, a value of "k" or "r", which could comprise a random number 251a, can be associated with the digital signature 319.

When using a DSA 167 or ECDSA 158 in deterministic mode, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a random number 251a (such as value "k" or "r") can be optionally omitted. In exemplary embodiments, module 101 and CU 113 can utilize deterministic ECDSA 158, such that the requirement for random number 251a derived and subsequently transmitted along with the digital signature 319 can be omitted. However, due to interoperability and standards supported by remote hosts and nodes, such as potentially server 105, the use of a random number 251a can be required. Random number 251a can be generated by CU 113 using steps 251 depicted and described in connection with FIG. 2b above, where a CU 113 can utilize a noise amplification memory 113a.

In order to output a digital signature 319, a signing process 318a can input module public key 172, cryptographic parameters 126a, and module provider private key 121 into digital signature algorithm 141d. Note that module public key 172 comprises the data input in signing process 318, such that the module public key 172 a signature for module public key 172 can be created using a private key and the signature can be subsequently verified using a public key. If a non-deterministic version of the signature algorithm is being used, then a random number 251a can also be input into digital signature algorithm 141d, as depicted in FIG. 4a. Although the signing process 318a is depicted for the signature portion of step 318, the singing process 318a could be utilized for other processes or steps requiring a digital signature in the present invention. For example, a CU configuration unit 104 can create a digital signature 309 in a step 308 of FIG. 3a, and in this case a private key for unit 104 (instead of module private key 121) and the CU public key 111 (instead of module public key 172) would be input into the digital signature algorithm 141d. Other possibilities for generating a digital signature exist as well without departing from the scope of the present invention.

For embodiments where a digital signature algorithm 141d is utilized by a CU 113 in a non-deterministic mode, similar to the exemplary signing process 318a in FIG. 4a, then a record of every value of "k" or "r" utilized by CU 113 could preferably be recorded in table 188 (shown in FIG. 1e) when used with a given module private key 173 or CU private key 112. In other words, before every signature operation, CU 118 could first verify that an associated input value of "k" or "r" has not been previously utilized with private key by querying table 188. If the value of "k" or "r" has been utilized previously with the private key, the CU 113 can reject performing a signature operation and request a different input value of "k" or "r". If the value of "k" or "r" has not been utilized previously with the private key, the CU 113 can record the value of "k" or "r" in table 188 and subsequently generate a digital signature using exemplary inputs such as those shown in FIG. 4a. If table 188 is flushed or contains errors for operating digital signature algorithm 141d in non-deterministic mode, then CU 113 can expire module private key 173 and process a new module private key 173 using the steps in FIG. 3b and receive a new certificate 122a using a new module public key identity 170.

251a, can also be associated with the digital signature 319 and used in generating the digital signature 319 in a prior signing process 318a above.

When using a DSA 167 or ECDSA 158 in deterministic mode, such as specified in IETF RFC 6979, then the requirement for a random number 251a (such as value "k" or "r") can be optionally omitted. In exemplary embodiments, module 101 and CU 113, plus other elements in FIG. 1a such as module provider 122, CA 118, and M2M service provider network 108 can support deterministic ECDSA 158 for both signing processes 318a and verifying processes 320a, such that the requirement for random number 251a can be omitted. However, due to interoperability and standards supported by remote hosts and nodes, such as potentially server 105, the use of a random number 251a can be required.

In order to output a digital signature 319, a verifying process 320a can input module public key 172 (which can comprise the data input for step 320, but other data besides a public key can be verified in the verifying process 320a), cryptographic parameters 126a, and module provider public key 120 into digital signature algorithm 141d. If a non-deterministic version of the signature algorithm is being used, then the random number 251a can also be input into digital signature algorithm 141d, as depicted in FIG. 4b. The random number 251a along with the module public key 172 (which can comprise the data input) could be received via network 107. The output of digital signature 319 calculated in a verifying process 320a can subsequently be compared with a digital signature 319 received via network 107. If the received digital signature 319 and the calculated digital signature 319 in a verifying process 320a do not match, then an error can be return to the party submitting the data input and the data input also rejected from being used in subsequent steps.

Although the verifying process 320a is depicted for the verifying portion of step 320, the verifying process 320 could be utilized for other processes or steps requiring a digital signature in the present invention. For example, a CA 118 could receive a digital signature 309 in a step 310 in FIG. 3a, and CA 118 could verify the CU public key 111 was submitted by the CU configuration unit 104 by using the verifying process 320a. In this case, CA 118 would use the CU configuration unit public key in order to verify the CA public key 111 was submitted by CU configuration unit 104 and not an imposter. Other possibilities for verifying a digital signature exist as well without departing from the scope of the present invention.

FIG. 4b

FIG. 4b is a flow chart illustrating exemplary steps for verifying a digital signature using a public key, parameters, and data input, in accordance with exemplary embodiments. As discussed above, digital signatures can be useful for verifying the identity of a node communicating over a network, such as network 107 in FIG. 1a. Step 320 in FIG. 3b includes verifying a digital signature 319, and FIG. 4b illustrates an exemplary embodiment of the portion of step 320 for verifying digital signature 319, which can comprise verifying process 320a. In a verifying process 320a, a digital signature 319 can be output from a digital signature algorithm 141d, which could comprise an RSA based DSA 167 or an ECC based ECDSA 158, and other possibilities exist as well. When using a DSA 167 or ECDSA 158 algorithm in non-deterministic mode for a verifying process 318a, a value of "k" or "r", which could comprise a random number

FIG. 5

FIG. 5 is a graphical illustration of hardware, firmware, and software components for a module, where a cryptographic unit can be integrated with a processor, in accordance with exemplary embodiments. Although CU 113 and noise amplifying memory 113a are illustrated in FIG. 1c and FIG. 1e as being located in a removable storage unit 109, CU 113 and noise amplifying memory 113a could be combined with other hardware on a module 101 such that a removable storage unit 109 would not be required. FIG. 5 illustrates an embodiment where the methods and systems contemplated in the present invention can also be utilized by a module without using a storage unit 109. In other words, a module 101 can omit removable components such as a storage unit 109 while using a cryptographic unit 113 and noise amplifying memory 113a in order to internally generate and utilize PKI keys. Applications without storage unit 109 may be desirable for (i) industrial uses where module 101 preferably remains hermetically sealed, (ii) high-security uses where potential tampering via eliminating removable components such as a storage unit 109 may be preferred, and other possible applications of the configuration depicted in FIG. 5 are possible as well without departing from the scope of the present invention.

Many of the components for a module 101 in FIG. 5 can comprise the components for a module 101 depicted and described in connection with FIG. 1b, with the additional elements shown in FIG. 5 and described herein. For example, a data bus 101d in FIG. 5 can comprise the data bus 101d described in FIG. 1b, ROM 101c in FIG. 5 can comprise ROM 101c from FIG. 1b with the additional elements depicted as inserted within ROM 101c in FIG. 5 of module provider public key 120, certificate authority public key 131, certificate 122a. ROM 101c in FIG. 5 could operate as a nonvolatile flash memory. Shared memory 109h could operate in RAM 101e, such that the shared memory configuration process 201 in FIG. 2c could be performed each time module 101 boots from an unpowered state. A module 101 can include a processor 101b, and the processor can include cryptographic unit 113, a cryptographic unit private key 112, cryptographic algorithms 141, a module private key 173, protected memory 109g, and a table 188. Other descriptions for processor 101b from FIG. 1b can be applicable for processor 101b in FIG. 5 as well.

Cryptographic unit 113 within processor 101b can include the components and functions for a cryptographic unit 113 depicted and described in connection with FIG. 1c, with the primary difference being cryptographic unit 113 can operate within processor 101b instead of storage unit 109. Cryptographic unit 113 within processor 101b could omit an interface controller 109c, for example. Further, the bus elements depicted in FIG. 1e such as bus 109d can be replaced by an internal bus within processor 101b. Note that RAM 113e within CU 113 in FIG. 1e can also be utilized when CU 113 operates in processor 101b. CU 113 may normally require internal RAM 113e for securely using cryptographic algorithms 141 inside processor 101b, where the internal RAM 113e can be separate from RAM 101e for processor 101b to prevent general applications and software operating on module 101 from accessing the RAM 113e in CU 113 in processor 101b in FIG. 5. Although not depicted in FIG. 5, processor 101b can also include a cryptographic unit identity 109e such that external parties like module provider 122 and certificate authority 118 can identify the cryptographic unit 113 operating in processor 101b. CU 113 in processor 101b can also be referred to as a "trusted environment" or "protected area" within processor 101b, such that access to CU 113 by software, applications, or firmware on module 101 can be restricted.

As illustrated in FIG. 5, processor 101b can also include protected memory 109g. Exemplary data recorded in nonvolatile protected memory 109g depicted in FIG. 1e can be suitable for a processor 101b since the amount of nonvolatile memory required to hold the data can be readily available within current and future processors 101b for a module 101. In an exemplary embodiment, protected memory 109g can require less than 500 KB of memory, which can be readily available on many models of processors for 101b. Processor 101b can record a cryptographic unit private key 112, which can either be derived by CU 113 or loaded by the manufacturer of processor 101b. CU private key 112 in FIG. 5 can be associated with CU public key 111 recorded in a certificate 122b. CU private key 112 can be used by CU 113 in processor 101b for asymmetric ciphering algorithms 141a and digital signature algorithms 141d.

Processor 101b in FIG. 5 can record a module private key 173, where the module private key 173 was derived using steps from FIG. 3b, including a step 250 depicted and described in connection with FIG. 2b. In other words, processor 101b can record and utilize module private key 173 without the module private key 173 (i) being transferred into module 101 or (ii) ever recorded by another entity, thereby increasing the security of module private key 173. Processor 101b can also include table 188, which can be utilized for accessing noise amplifying memory 113a, such as tracking (i) the location and frequency of noise amplifying operations 193, and (ii) samples of noise amplifying memory 113a to utilize for input into hash algorithm 141c in order to generate a noise amplifying memory hash value 198, and (iii) a record of values "k" or "r" used with digital signature algorithms 141d.

As depicted in FIG. 5, a module 101 can include a noise amplifying memory 113a, and the noise amplifying memory 113a could be connected to bus 101d via a noise memory interface 109p. Noise memory interface 109p in FIG. 5 could operate as described above for a noise memory interface 109p in FIG. 1e, with the difference that noise memory interface can access bus 101d. In other words, noise memory interface 109p in FIG. 5 can operate in a manner to intentionally increase memory noise 194 and bit errors recorded in noise amplifying memory 113a. Noise memory interface 109p in FIG. 5 could translate memory addresses received on bus 101d to physical addresses within memory 113a. Although not depicted in FIG. 5, module 101 and processor 101b could utilize a separate bus such as an internal bus 109q to connect noise memory interface 109p to processor 101b, such that other elements in module 101 could not access noise amplifying memory 113a.

Other possibilities and configurations are possible as well, without departing from the scope of the present invention, for integrating or configuring a cryptographic unit 113, noise amplifying memory 113a, and/or noise memory interface 109p with a module 101 and without a storage unit 109. In another exemplary embodiment, noise amplifying memory 113a and noise memory interface 109p could be integrated into processor 101b and connected to CU 113 with in internal bus 109q. Although not depicted in FIG. 5, in another embodiment CU 113, noise amplifying memory 113a, noise memory interface 109p, and protected memory 109g could be integrated into a single unit connected to bus 109d, such that CU 113 operates outside of processor 101b but does not operate inside a storage unit 109. In this case, the single unit could be a separate integrated circuit that is soldered onto a motherboard of module 101 during manufacturing of module 101. In another embodiment, CU 113, noise amplifying memory 113a, and noise memory interface 109p could be integrated with ROM 101c in module 101, where ROM 101c can operate as a "flash RAM" (allowing multiple reads and writes through bus 109d). In this case, a memory interface such as system 200 could operate within ROM 101c, such that module 101 and CU 113 could communicate through a shared memory 109h operating in ROM 101c.

FIG. 6

FIG. 6 is a graphical illustration of hardware, firmware, and software components for a module, where a cryptographic unit can be integrated a universal integrated circuit card (UICC), in accordance with exemplary embodiments.

For embodiments where module 101 connects with a wireless network 102 including wireless WAN networks such as a public land mobile network operated by a mobile network operator, then module 101 may include a UICC, which is often commonly referred to as a SIM card. Primary features of a UICC or SIM card is that it can record the network access credentials for a module 101 to access a wireless network 102, where the wireless network 102 has provided the credentials. As of 2015 the base credentials commonly in a SIM card are often referred to as an identity comprising an International Mobile Network Identity (IMSI) and a shared secret key K or Ki.

The use of a UICC 109u in the present invention could be in any of a mini, micro, nano, or embedded form format, where the embedded format is typically not removable and soldered onto a circuit board inside module 101. A module 101 could also include a UICC or equivalent functionality when connected to other networks besides a wireless network 102 as well, including wired networks. Module 101 could be manufactured with a slot for which to insert a UICC, such as the equivalent of a first set of electrical pins 109a (not shown) within module 101 to interface with a second set of electrical pins 109a (not shown) for a physical interface 101z within UICC 109u. In another embodiments, a UICC 109u that includes an eUICC 113u can comprise an embedded format that is soldered onto a circuit board in module 101. Module 101 in FIG. 6 could also include a storage unit 109y, which could comprise a regular, removable nonvolatile flash memory storage unit without a CU 113 operating inside the storage unit 109y. Storage unit 109y could comprise an SD card or a micro SD card such as commonly available at electronics retailers in 2015, and other possibilities exist as well for a storage unit 109 without departing from the scope of the present invention. Storage unit 109y could also comprise a solid state drive (SSD) intended to provide functionality equivalent to traditional spinning hard disk drive.

FIG. 6 illustrates an embodiment where the methods and systems contemplated in the present invention can also be utilized by a module 101 that includes a UICC. In other words, a module 101 a UICC 109u can operate as a storage unit 109 (with exemplary components for a storage unit 109 depicted in FIG. 1e), and a separate storage unit 109y without a CU 113 operating inside separate storage unit 109y could also be utilized by module 101. A UICC 109u can include components such as a cryptographic unit 113. Cryptographic unit 113 operating inside UICC 109u can include exemplary components such as an eUICC 113u, a noise amplifying memory 113a, and a noise memory controller 109p in order to internally generate PKI keys in a reasonably secure manner. For embodiments where a UICC 109u is utilized, then the physical interface and electrical pins 109a between UICC 109u and module 101 could comprise an ISO 7816 compatible interface 101z. The interface 101z could be an ISO/IEC 7816-2 interface supporting the transfer of data between UICC 109u and module 101. In exemplary embodiments, UICC 109u could also include an Embedded Universal Integrated Circuit Card (eUICC) 113u, where the function of eUICC 113u could support (A) operations outlined by the GSMA in "Remote Provisioning Architecture for Embedded UICC, Technical Specification, Version 1.0" dated Dec. 17, 2013, which is hereby incorporated by reference in its entirety, and addition to (B) the functionality of an eUICC 113u contemplated herein. However, the inclusion of an eUICC 113u functionality within UICC 109u is not required and eUICC 113u could optionally be omitted from operating within a UICC 109u.

Applications where an eUICC 113u can be included in cryptographic unit 113 can include deployments or installations where a module provider 122 can prefer to change a wireless network 102 that a module 101 connects with, as illustrated in FIG. 1a, without physically changing the SIM card or UICC. Wireless networks 102 over licensed radio spectrum and supporting applications such as mobile phones has historically required the distribution and installation of SIM cards in devices in order to connect with the wireless network. An eUICC 113u can allow a device to connect "natively" (i.e. not in a roaming configuration) with a wireless network 102, such that costs can be minimized and the UICC 109u in which the eUICC 113u operates does not need to be changed in order to connect natively with a new wireless network 102. In other words, during the operational lifetime of an eUICC 113u in UICC 109u, an eUICC 113u could record multiple different keys K, where different keys K could be associated with different wireless networks 102. A module provider 122 could have thousands of modules 101 or more deployed with monitored units 119, and manually changing out a SIM card may not be economical. But, with an eUICC 113u as specified by the GSMA standard cited above and related standards, a module provider 122 can change the credentials used by a UICC 109u operating in a module 101 for connecting with a wireless network 102 remotely and without manually changing a SIM card or UICC.

Applications with a UICC 109u may be desirable for (i) industrial uses where module 101 preferably remains hermetically sealed, (ii) high-security uses where potential tampering via eliminating removable components such as a storage unit 109 may be preferred, or (iii) module provider 122 may not know which wireless network 102 may be best suited for a module 101 before deployment or distribution to an end-user, and other possible applications of the configuration depicted in FIG. 6 are possible as well without departing from the scope of the present invention. In an exemplary embodiment illustrated in FIG. 6, UICC 109u can also include a cryptographic unit 113 and a differential fault protection unit 601, in addition to the physical interface 101z discussed above. In addition, although a differential fault protection unit 601 is depicted with a UICC 109u in FIG. 6, a differential fault protection unit 601 could be used within other embodiments depicted above, such as with a storage unit 109 in FIG. 1e, a module 101 in FIG. 1b and FIG. 5, and other possibilities exist as well.

Cryptographic unit 113 operating in a UICC 109u can include an eUICC 113u, a noise amplifying memory 113a, protected memory 109g, a read only memory 113c, a noise memory controller 109p, an internal bus 109d, a processor 113b, and RAM 113e. As contemplated herein, UICC 109u can comprise an embodiment of storage unit 109, and consequently the various exemplary components within UICC 109u can operate in a manner described in previous figures above, such as in connection with FIG. 1c and FIG. 1e, etc. Although not depicted in FIG. 6, a UICC 109u or CU 113 could also include a cryptographic unit identity 109e, such that CU 113 or UICC 109u could be uniquely identified separately from module 101 operating with a module identity 110. Although depicted as a separate element within UICC 109u, CU 113 could optionally be combined with a UICC 109u such that exemplary components within CU 113 could operate within UICC 109u and in this case the UICC 109u can also perform the functions of CU 113. Other possibilities exist as well for the location of components within an exemplary UICC 109u depicted in FIG. 6, such as (i) noise amplification memory 113a being located inside UICC 109*u* but outside CU 113, (ii) eUICC 113*u* also being located outside of CU 113 but elsewhere within UICC 109*u*, and/or (iii) differential fault protection unit 601 being located in CU 113.

Processor 113*b* within UICC 109*u* can comprise am embedded processor with capabilities similar to processor 131*b* depicted and described in connection with FIG. 1*e*, where processor 131*b* could internally manage the function and operation of UICC 109*u* by the execution of program instructions such as machine code. CU 113 operating inside UICC 109*u* could also include an internal data bus 109*d*, thereby allowing the internal components of CU 113 within UICC 109*u* as depicted to communicate with each other. Although internal data bus 109*d* is depicted within CU 113, internal data bus 109*d* could also connect components in UICC 109*u* such as physical interface 101*v* and differential fault protection unit 601. CU 113 operating within UICC 109*u* can include other elements depicted and described in previous figures, without departing from the scope of the present invention. For example, CU 113 could include a clock 160*b* which could be driven by a clock 160 (shown in FIG. 1*c*) within module 101, where physical interface 101*v* includes a clock input electrical connection. In addition UICC 109*u* could include an interface driver 109*b* to manage the communication with module 101 through physical interface 101*v*.

UICC 109*u* can include an eUICC 113*u*. An eUICC 113*u* can provide the equivalent functionality as a physical UICC, with the exception that over time an eUICC 113*u* can record data and provide functionality such that UICC 109*u* can operate a different physical UICC cards without a user or module provider 122 physically changing the UICC 109*u*. Definitions for a physical UICC are included in ETSI TR 102 216 and ETSI TS 102 221 V11.0.0, and other examples for the use of a physical UICC in mobile phones and M2M modules exist as well. An eUICC 113*u* in FIG. 6 can support exemplary requirements for an eUICC outlined in ETSI TS 103 383 v12.1, entitled "Smart Cards; Embedded UICC; Requirements Specification," which is herein incorporated by reference in its entirety. In other words, an eUICC 113*u* can operate as a "virtualized" UICC in a reasonably secure manner, such that data operations and input/output to UICC 109*u* related to authentication and ciphering of data between module 101 and wireless network 102 can be provided by an eUICC 113*u*.

An eUICC 113*u* can include an eUICC profile 113*g*, a set of cryptographic algorithms 141, a key K, a random number 251*a*, and a derived key 129*b*. Derived key 129*b* can operate as a symmetric key 127 as described above in FIG. 1*c*, or a derived key 129*b* in eUICC 113*u* could be optionally omitted. The combination of cryptographic algorithms 141, module private key 173, and a random number 251*a* can be used in several possible ways to (i) securely receive various encrypted eUICC profiles 113*g* over time, and (ii) decrypt the profiles and read different keys K in plaintext form. Exemplary embodiments include (A) module private key 173 recorded in ROM 113*c* could be input into the cryptographic algorithms 141 operating in eUICC 113*u*, such as using module private key 173 for the process of decrypting eUICC profile 113*g*. Or, (B) module private key 173 could be input into a key derivation function 141*e* along with other data to generate derived key 129*b*. Derived key 129*b* can be used to decrypt eUICC profile 113*g*, where eUICC profile 113*g* was received from an eUICC subscription manager (not shown) and also encrypted with the same value for derived key 129*b*.

In an exemplary embodiment, eUICC 113*u* can use a CU private key 112 instead of a module private key 173 in order to read a key K from an eUICC profile 113*g*, but in either case the private keys can be internally derived with a high level of security using a noise amplifying memory 113*a* and the steps depicted for using the noise amplifying memory in FIGS. 3*a* and 3*b*, including the option of using a noise memory interface 101*p*. Note that industry standards for an eUICC 113*u* can require access to a random number 251*a* for using cryptographic algorithms 141 in eUICC 113*u*, and embodiments in the present invention support the generation of random number 251*a* such as through the exemplary steps 251 in FIG. 2*b* above.

As contemplated herein, an eUICC profile, such as the exemplary eUICC profile 113*g* can be similar to profiles for an eUICC contemplated in ETSI specification TS 103 383 v12.2.0 and related standards. The profile 113*g* could be received by module 101 in an encrypted format, such as ciphered with a symmetric ciphering algorithm 141*b* and a symmetric key 127, where the symmetric key 127 could comprise a derived key 129*b*. Or, the symmetric key 127 could be sent to eUICC 113*u* as data ciphered with (i) an asymmetric ciphering algorithm 141*a* and (ii) either module public key 172 or CU public key 111. eUICC profile 113*g* could be subsequently decrypted and recorded within an eUICC 113*u* operating in a UICC 109*u*. Profile 113*g* could include network access credentials for module 101 to access wireless network 102, such as an IMSI value and a key K. eUICC 113*u* can decrypt profile 113*g* using cryptographic algorithms 141 and key 173 or key 112 in order to read key K, and module 101 can subsequently access wireless network 102 using key K.

Further, the secure operation of an eUICC 113*u* can require any of (i) securely recording private key 112, (ii) internally deriving private keys such as the exemplary module private key 173, (iii) creating symmetric keys 127 such as the exemplary derived key 129*b*, and (iv) the ability to generate a random number 251*a*. In an exemplary embodiment, private key 112 within eUICC 109*u* can be securely internally derived using steps 300. In another embodiment, private key 173 could be subsequently changed after UICC 113*u* receives a signal 208 by using steps 250, 316, and 317 in FIG. 3*b*, where CU 113 derives a new private key 173 for use by an eUICC 113*u* after receiving the signal 208. Derived keys 129*b* can depend on private keys such as key 112 and key 173. Random number 251*a* can be calculated or derived using a step 251 in FIG. 2*b*.

Other possibilities exist as well for the operation and function of an eUICC 113*u* operating within a UICC 109*u*. Although the various industry standards for an eUICC 113*u* continue to evolve, a standard eUICC 113*u* for the foreseeable future is expected to continue relying on the use of private keys for receiving and decrypting profiles 113*g*. An eUICC 113*u* operating within CU 113 can use either a module private key 173 or a CU private key 112 in order to decrypt a profile 113*g*, where exemplary uses and sources of module private key 173 and CU private key 112 are depicted and described in connection with FIGS. 1*a*, 1*c*, 1*e*, 2*b*, 3*a*, and 3*b* in the present invention.

Differential fault protection unit 601 can include components and logic for increasing the resistance of UICC 109*u* or storage unit 109 to attack by fault analysis or differential fault analysis, as well as increasing resistance to side channel attacks. An potential attacker of the cryptographic system within CU 113 could attempt several different means, which can vary depending on if (i) the attacker has physical access to CU 113 in the form of holding storage unit 109 or UICC 109*u*, (ii) the attacker has physical access to a module 101 which contains CU 113, or (iii) the attacker accesses module 101 remotely over an network such as network 107 illustrated in FIG. 1*a*. A differential fault protection unit 601 can assist in resisting attacks in multiple ways.

Differential fault protection unit 601 can intentionally add both (i) a fixed delay in transmitting responses from CU 113 to module 101, such as an exemplary 500 milliseconds, plus (ii) a random delay of approximately +/−300 milliseconds. The random component could be distributed according to a normal distribution, a uniform distribution, or a pareto distribution, and other distributions are possible as well. In exemplary embodiments, differential fault protection unit (DFPU) 601 would change both the fixed delay and random delay components frequently over time, such as with every output from CU 113. A fixed component can intentionally reduce the frequency that CU 113 would respond to input such as signal 208 in FIG. 2*c*, in the case that CU 113 receives multiple requests in a relatively short period of time or within a relatively short count of clock cycles from a clock 160*b*. In other words, DFPU 601 can slow or temporarily halt input requests if the frequency of the requests exceeds a threshold value, and in this manner the speed of potential side-channel attacks could be slowed. In this manner, a DFPU 601 can also increase the fixed delay if the frequency of input is higher than a specified tolerance level. Other possibilities exist as well for the values of a fixed and random delay to add for a CU 113 to respond to input in a DFPU 601 without departing from the scope of the present invention.

Differential fault protection unit 601 can also include an error check on data output from CU 113. In an exemplary embodiment, differential fault protection unit 601 can control CU 113 such that all input and output with CU 113 from external sources, such as via electrical pins 109*a*, first passes through DFPU 601. In an exemplary embodiment, DFPU 601 can request CU 113 to perform all operations twice, whenever input from module 101 is received. For example, if module 101 requests a digital signature 319 from CU 113 using CU private key 112 recorded in CU 113, DFPU 601 can (i) submit the request to CU 113 a first time and record a first result in memory such as memory 113*e* or memory 109*g*, then (ii) submit the request to CU 113 a second time and record the second result in memory, and then (iii) compare the first result with the second result, and then (iv) output the first result through electrical pins 109*a* only if the first result and the second result are equal. In this manner, DFPU 601 can make storage unit 109 or CU 113 resistant to attacks via the intentional introduction of errors from changing the physical operating environment of CU 113 outside of normal operating specifications for CU 113. Various potential attacks resisted in this manner through DFPU 601 include exposing CU 113 to (i) an input voltage with higher, lower, or higher variability than specified, (ii) temperature or cycles of temperature higher or lower than specified, and/or (iii) ionizing radiation or similar exposure to high levels of radio-frequency interference.

FIG. 7*a*

FIG. 7*a* is an illustration of a certificate for a module public key, in accordance with exemplary embodiments. Public and private keys in system 100 can utilize PKI techniques other than RSA, such as a module public key 172 based on elliptic curve cryptography (ECC) illustrated in FIG. 7*a*. One benefit of using ECC is that an equivalent level of security can be obtained for a much smaller key length. Also, energy may be conserved using ECC algorithms 154 compared to RSA algorithms 153. Smaller key lengths save bandwidth, memory, processing resources, and power, which are all valuable for a module 101 to conserve a battery 101*k* and usage of radio-frequency spectrum. For example, an ECC key length of 283 bits can provide security similar to an RSA key length of approximately 2048 bits. Module public key 172 can comprise an ECC key in an X.509 certificate, as illustrated in FIG. 7*a*. The values to determine an elliptic curve defining equation could be stored in parameters 126*a*, and the defining equation could also optionally be disclosed.

Certificate 122*a* could include a signature 125, where signature 125 can be signed using ECC signature techniques, such as the Elliptic Curve Digital Signature Algorithm (ECDSA) 158 with a secure hash such as SHA256 156. In order to generate signature 125, the private key associated with either CA 118 or module provider 122 may also be an ECC-based private key. Note that the public key 172 in a certificate 122*a* could use a different asymmetric ciphering algorithm 141*a* than the algorithm used for signing, such that the public key 172 can be an ECC key, while the signature 125 could be generated with RSA algorithm 153 and/or key. Certificate 122*a* may also include parameters 126*a*, where parameters 126*a* can specify an elliptic curve utilized with the module public key 172. Parameters 126*a* could also include the start and end times 133 for the validity of either public key 172 or certificate 122*a*. Other parameters 126*a* can be utilized in a certificate 122*a* as well, and parameters 126*a* may specify values that are not included or external to a certificate 122*a*.

Certificate 122*a* illustrated in FIG. 7*a* also illustrates an exemplary embodiment of the present invention. Over the lifetime of a module 101, which could be a decade or longer, multiple module public keys 172 may be utilized. The potential use of multiple different module public keys 172 include (i) the expiration of a certificate 122*a* (including expiration of a public key associated with a certificate authority used in signature 125), (ii) a need to change an elliptic curve specified in a parameters 126*a*, (iii) adding a new public/private key pair for connection with a different wireless network 102, (iv) as increasing a key length utilized in a public/private key pair, (v) the transfer of ownership or control of module 101, and/or (vi) module 101 connecting to a new server that utilizes a different asymmetric ciphering algorithm (i.e. RSA instead of ECC). Other possibilities exist as well for reasons a module to derive a new module public key 172. Note that the multiple module public keys 172 may also be utilized concurrently, such that (i) a first module public key 172 in a first certificate 122*a* can be utilized with a first server 105, and (ii) a second module public key 172 (possibly derived using a different set of parameters 126*a* including using a different elliptic curve) can be utilized with a second server 105 and/or wireless network 102.

In either case of (i) module 101 using multiple module public keys 172 concurrently, or (ii) module 101 using different module public keys 172 in sequence, a certificate 122*a* can preferably include a module public key identity 170 to specify the module public key 172 utilized in a certificate 122*a*. As illustrated in FIG. 7*a*, the module public key identity 170 could be included in the "Common Name" (CN) field, and the module identity 110 can be included in the "Organizational Unit" (OU) field. Alternatively, the module public key identity 170 and module identity 110 can be appended together and used in the CN field. In this manner and according to preferred exemplary embodiments, a module public key identity 170 is utilized with both a module identity 110 and a module public key 172 within a certificate 122a. Also, as noted previously herein, the use of a certificate 122a may optionally be omitted, such that module 101 and server 105 share public keys without using certificates 122a. The module identity 110, or a value associated with the module identity 110 can also be included in certificate 122a, such as the "Common Name" (CN) field of a X.509 certificate 122a, as illustrated in FIG. 7a. A signature portion of a certificate 122a or 122b below can also include a value for "r" or "k" used with a non-deterministic use of a digital signature algorithm 141d, such as depicted and described in connection with FIGS. 4a and 4b.

Note that the use of a certificate 122a is not required for the format of a public or shared key, and the public keys could optionally omit a signature from a certificate authority 118. In this case, the public keys such as module public key 172 could be recorded in the format of a string, without the additional fields illustrated in FIG. 7a. Other possibilities exist as well without departing from the scope of the present invention.

FIG. 7b

FIG. 7b is an illustration of a certificate for cryptographic unit public key, in accordance with exemplary embodiments. A cryptographic unit 113 using a CU identity 109e can include a CU private key 112, where the CU private key 112 can be associated with a CU public key 111. Various entities within system 100 can utilize a certificate for a CU 113 with CU public key 111, such as module provider 122. For example, module provider 122 or an end user for module 101 may receive a shipment of a storage unit 109, with CU 113 inside the storage units. Module provider 122 or end user could verify the CU identity 109e of CU 113 using a CU certificate 122b. Module provider 122 or an end user could (i) create a challenge or nonce for the CU 113 operating in storage unit 109 to sign, (ii) receive a digital signature from the CU 113, where the CU 113 used the CU private key 112 and a digital signature algorithm 141d such as shown in FIG. 4a, and (iii) subsequently verify the digital signature using a CU public key 111 recorded in a certificate 122b. In this manner, module provider 122, and end user, or other nodes in a system 100 could verify the identity of CU 113 by trusting the certificate authority 118 which signed the certificate 122b.

Other examples exist as well for the benefits and applications of a CU certificate 122b without departing from the scope of the present invention. In other exemplary embodiments, CU 113 can derive module PKI keys 174 and subsequently send the module public key 172 and module identity 110 along with a digital signature 319, where the digital signature 319 was processed using the CU private key. Parties receiving the module public key 172 could verify the module public key 172 is authentic by verifying the digital signature 319 using the CU public key 111 recorded in a CU certificate 122b. In other words, a CU certificate 122b can also be used for the cases where (A) a module certificate 122a does not yet exist or may not be accessible and (B) a party receiving the module public key 172 with a module identity 110 needs to verify the module public key 172 is authentic.

A cryptographic unit certificate 122b can include an expiration time 133. In exemplary embodiments, the expiration time 133 for CU certificate 122b can be longer than the expiration time 133 for a module public key 172. A reason is the CU private key 112 may "underpin" or support the subsequent derivation of multiple module public keys 172 over time, and thus a longer expiration time for CU certificate 122b can be preferred in some exemplary embodiments. As depicted in FIG. 7a and FIG. 7b, a CU public key 111 can have a longer key length than module public key 172 since the expiration time 133 of CU public key 111 can be longer than module public key 172. As depicted in FIG. 7b, the CU identity 109e can be used in the Organizational Unit field (OU) of a certificate, and a sequence number 702 can be used for the common name (CN) field. The sequence number 702 can track different keys used by CU 113 with CU ID 109e, such as a first public key used for a first asymmetric algorithm 141a (such as RSA 153) could have a first sequence number, a second public key used for a second asymmetric algorithm 141a (such as ECC 154) could have a second sequence number, a third public key used for a first digital signature algorithm 141d could have a third sequence number, etc. Other possibilities exist as well for the use of CN, ON, CU ID 109e, and sequence numbers fields or data within a certificate without departing from the scope of the invention.

As depicted in FIG. 7b, CU certificate 122b can include (i) CU public key 111 and (ii) a set of parameters 126b. CU certificated 122b can also include a digital signature 184 from CA 118, where CA 118 used a CA private key 132 to create the digital signature 184. In this manner, parties reading the CU certificate 122b could verify the data by comparing digital signature 184 in the certificate 122b with an independently calculated value for digital signature 184 and verifying the two values match. For the cases where a non-deterministic use of digital signature algorithms 141d is utilized, then CU certificate 122b could also include values of "k" or "r", and these values are not reused for a given private key in exemplary embodiments.

Conclusion

Various exemplary embodiments have been described above. Those skilled in the art will understand, however, that changes and modifications may be made to those examples without departing from the scope of the claims.

What is claimed is:
1. A cryptographic system, comprising:
one or more servers having one or more server private keys stored thereon for generating server digital signatures, wherein the one or more server private keys are associated with one or more respective server public keys for verifying the server digital signatures;
wherein the one or more servers are configured for:
generating a challenge for a computing device, wherein the computing device is in communication with the cryptographic system over a wireless network, and wherein the computing device comprises an embedded universal integrated circuit card (eUICC) having a first private key stored thereon for generating device digital signatures, wherein the first private key is associated with a first public key for verifying the device digital signatures;
sending the challenge and a first server public key to the computing device;
receiving, from the computing device, the first public key and a first digital signature for at least the challenge;
verifying the first digital signature for at least the challenge using the first public key;

sending, to the computing device, a signal via the wireless network, wherein the signal comprises data associated with a second public key stored on the eUICC, and wherein the second public key is associated with a second private key stored on the eUICC;

receiving, from the computing device, the second public key and a second digital signature for at least the second public key; and verifying the second digital signature for at least the second public key using the first public key;

wherein the one or more servers are further configured for: sending, to the computing device, an encrypted profile for the eUICC, wherein the encrypted profile is ciphered with a first symmetric ciphering key; and wherein the second private key is to be used by the eUICC to derive a second symmetric ciphering key, and wherein the second symmetric ciphering key is to be used by the eUICC to decrypt the encrypted profile received by the computing device from the cryptographic system.

2. The cryptographic system according to claim 1, wherein the first symmetric ciphering key comprises a number with a length of 128 bits for a symmetric ciphering algorithm.

3. The cryptographic system according to claim 1, wherein the second private key and the second public key are temporary keys.

4. The cryptographic system according to claim 1, wherein the cryptographic system comprises a module provider, a certificate authority, and a service provider network, and wherein the computing device comprises at least one of a mobile phone, a laptop computer, or a tracking device.

5. A method for performing cryptographic operations, the method comprising:

generating, by a cryptographic system, a challenge for a computing device, wherein the computing device is in communication with the cryptographic system over a wireless network, wherein the cryptographic system comprises one or more servers, the one or more servers having one or more server private keys stored thereon for generating server digital signatures, wherein the one or more server private keys are associated with one or more respective server public keys for verifying the server digital signatures, and the computing device comprises an embedded universal integrated circuit card (eUICC) having a first private key stored thereon for generating device digital signatures, wherein the first private key is associated with a first public key for verifying the device digital signatures;

sending, by the cryptographic system, the challenge and a first server public key to the computing device;

receiving, by the cryptographic system and from the computing device, the first public key and a first digital signature for at least the challenge;

verifying, by the cryptographic system, the first digital signature for at least the challenge using the first public key;

sending, by the cryptographic system and to the computing device, a signal via the wireless network, wherein the signal comprises data associated with a second public key stored on the eUICC, wherein the second public key is associated with a second private key stored on the eUICC;

receiving, by the cryptographic system and from the computing device, the second public key and a second digital signature for at least the second public key;

verifying, by the cryptographic system, the second digital signature for at least the second public key using the first public key; and sending, by the cryptographic system and to the computing device, an encrypted profile for the eUICC, wherein the encrypted profile is ciphered with a first symmetric ciphering key;

wherein the second private key is to be used by the eUICC to derive a second symmetric ciphering key, and wherein the second symmetric ciphering key is to be used by the eUICC to decrypt the encrypted profile received by the computing device from the cryptographic system.

6. The method according to claim 5, wherein the first symmetric ciphering key comprises a number with a length of 128 bits for a symmetric ciphering algorithm.

7. The method according to claim 5, wherein the second private key and the second public key are temporary keys.

8. The method according to claim 5, wherein the cryptographic system comprises a module provider, a certificate authority, and a service provider network, and wherein the computing device comprises at least one of a mobile phone, a laptop computer, or a tracking device.

9. One or more non-transitory computer-readable mediums of a cryptographic system having processor-executable instructions stored thereon, wherein the processor-executable instructions, when executed, facilitate:

generating a challenge for a computing device, wherein the computing device is in communication with the cryptographic system over a wireless network, and wherein the cryptographic system has one or more server private keys stored thereon for generating server digital signatures, wherein the one or more server private keys are associated with one or more respective server public keys for verifying the server digital signatures, and wherein the computing device comprises an embedded universal integrated circuit card (eUICC) having a first private key stored thereon for generating device digital signatures, wherein the first private key is associated with a first public key for verifying the device digital signatures;

sending the challenge and a first server public key to the computing device;

receiving, from the computing device, the first public key and a first digital signature for at least the challenge;

verifying the first digital signature for at least the challenge using the first public key;

sending, to the computing device, a signal via the wireless network, wherein the signal comprises data associated with a second public key stored on the eUICC, wherein the second public key is associated with a second private key stored on the eUICC;

receiving, from the computing device, the second public key and a second digital signature for at least the second public key;

verifying the second digital signature for at least the second public key using the first public key; and sending, to the computing device, an encrypted profile for the eUICC, wherein the encrypted profile is ciphered with a symmetric ciphering key;

wherein the second private key is to be used by the eUICC to derive the symmetric ciphering key, and wherein the symmetric ciphering key is to be used by the eUICC to decrypt the encrypted profile received by the computing device from the cryptographic system.

10. A computing device for securely deriving keys and performing cryptographic operations, the computing device comprising:
- an embedded universal integrated circuit card (eUICC) having a first private key stored thereon for generating digital signatures, wherein the first private key is associated with a first public key for verifying the digital signatures; and
- a communication interface for communication with a cryptographic system over a wireless network, wherein the cryptographic system comprises one or more servers;
- wherein the eUICC and the communication interface are configured to facilitate:
  - receiving, by the computing device, a challenge from the cryptographic system;
  - generating, by the eUICC, using the first private key, a first digital signature for at least the challenge;
  - sending, by the computing device and to the cryptographic system, the first digital signature;
  - receiving, by the computing device, a signal sent from the cryptographic system via the wireless network, wherein the signal comprises data associated with a second public key stored on the eUICC, wherein the second public key is associated with a second private key stored on the eUICC;
  - generating, by the eUICC, using the first private key, a second digital signature for at least the second public key; and
  - sending, by the computing device and to the cryptographic system, the second digital signature and the second public key;
- wherein the eUICC and the communication interface are further configured to facilitate:
  - receiving, by the computing device and from the cryptographic system, an encrypted profile for the eUICC, wherein the encrypted profile is ciphered with a symmetric ciphering key;
  - deriving, by the eUICC, the symmetric ciphering key using the second private key; and
  - decrypting, by the eUICC, the encrypted profile using the symmetric ciphering key.

11. The computing device according to claim 10, wherein the symmetric ciphering key comprises a number with a length of 128 bits for a symmetric ciphering algorithm.

12. The computing device according to claim 10, wherein the eUICC and the communication interface are further configured to facilitate:
- receiving, by the eUICC, a nonce from a user;
- wherein the second digital signature is generated for at least the second public key and the nonce.

13. The computing device according to claim 10, wherein the cryptographic system comprises a module provider, a certificate authority, and a service provider network, and wherein the computing device comprises at least one of a mobile phone, a laptop computer, or a tracking device, and wherein the eUICC corresponds to a trusted execution environment (TEE).

14. The computing device according to claim 10, wherein the eUICC is configured to internally derive the first private key and the first public key, and to not communicate the first private key to any other entity.

* * * * *